US010887619B2

(12) United States Patent
Ikai et al.

(10) Patent No.: US 10,887,619 B2
(45) Date of Patent: Jan. 5, 2021

(54) MOVING IMAGE DECODING DEVICE, MOVING IMAGE CODING DEVICE, AND PREDICTION IMAGE GENERATION DEVICE

(71) Applicant: SHARP KABUSHIKI KAISHA, Sakai (JP)

(72) Inventors: Tomohiro Ikai, Sakai (JP); Tomoyuki Yamamoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 16/074,857

(22) PCT Filed: Dec. 22, 2016

(86) PCT No.: PCT/JP2016/088529
§ 371 (c)(1),
(2) Date: Aug. 2, 2018

(87) PCT Pub. No.: WO2017/134957
PCT Pub. Date: Aug. 10, 2017

(65) Prior Publication Data
US 2019/0045214 A1   Feb. 7, 2019

(30) Foreign Application Priority Data
Feb. 3, 2016   (JP) ................................. 2016-019354

(51) Int. Cl.
*H04N 19/176*   (2014.01)
*H04N 19/52*   (2014.01)
(Continued)

(52) U.S. Cl.
CPC ......... *H04N 19/573* (2014.11); *H04N 19/105* (2014.11); *H04N 19/157* (2014.11);
(Continued)

(58) Field of Classification Search
CPC ..................................................... H04N 19/573
See application file for complete search history.

(56) References Cited

U.S. PATENT DOCUMENTS

| 10,575,022 B2* | 2/2020 | Lin ......................... H03M 7/40 |
| 2009/0168886 A1* | 7/2009 | Ikeda .................. H04N 19/172 |
| | | 375/240.16 |

(Continued)

OTHER PUBLICATIONS

Alshina, Elena et al.: "Bi-directional optical flow", JCTVC-C204. Joint Collaborative Team on Video Coding(JCT-VC) of ITU-T SG16 WP3 and ISO/IEC JTC1/SC29/WG11 (Oct. 3, 2010).

(Continued)

*Primary Examiner* — Irfan Habib
(74) *Attorney, Agent, or Firm* — ScienBiziP, P.C.

(57) ABSTRACT

A prediction image generation apparatus for generating a prediction image by performing motion compensation on multiple reference images, the prediction image generation apparatus includes a prediction image generation unit configured to generate the prediction image with reference to a first reference image, a second reference image and a gradient correction term. A motion compensation unit having a motion compensation function using a bi-prediction gradient change (Bi-directional optical flow, BIO) prediction derives the gradient correction term with reference to each pixel value of a horizontal gradient image and a vertical gradient image. An inter-frame-distance weight derivation unit included a gradient correction bi-prediction derivation unit included in the motion compensation unit determines each weight coefficient to be multiplied by the value of the each pixel, depending on a first picture interval and a second picture interval, the first picture interval being a picture interval between a target image to be predicted and the first (Continued)

reference image, the second picture interval being a picture interval between the target image and the second reference image.

1 Claim, 34 Drawing Sheets

(51) Int. Cl.
H04N 19/157 (2014.01)
H04N 19/573 (2014.01)
H04N 19/105 (2014.01)
H04N 19/196 (2014.01)

(52) U.S. Cl.
CPC ......... *H04N 19/176* (2014.11); *H04N 19/196* (2014.11); *H04N 19/52* (2014.11)

(56) References Cited

U.S. PATENT DOCUMENTS

| | | | | |
|---|---|---|---|---|
| 2009/0238269 A1* | 9/2009 | Pandit | .................. | H04N 19/176 |
| | | | | 375/240.12 |
| 2010/0220784 A1* | 9/2010 | Tanimoto | ............. | H04N 19/597 |
| | | | | 375/240.12 |
| 2011/0206123 A1* | 8/2011 | Panchal | ............... | H04N 19/577 |
| | | | | 375/240.15 |
| 2011/0285815 A1* | 11/2011 | Kervec | ................ | H04N 19/577 |
| | | | | 348/43 |
| 2012/0081578 A1* | 4/2012 | Cote | ..................... | G06T 3/4015 |
| | | | | 348/231.99 |
| 2012/0189056 A1* | 7/2012 | Li | ........................ | H04N 19/463 |
| | | | | 375/240.15 |
| 2012/0189058 A1* | 7/2012 | Chen | .................... | H04N 19/109 |
| | | | | 375/240.15 |
| 2012/0328005 A1* | 12/2012 | Yu | ........................ | H04N 19/137 |
| | | | | 375/240.03 |
| 2013/0259122 A1* | 10/2013 | Sugio | ..................... | H04N 13/00 |
| | | | | 375/240.08 |
| 2015/0350671 A1* | 12/2015 | Alshin | ................. | H04N 19/187 |
| | | | | 375/240.15 |
| 2016/0080758 A1* | 3/2016 | Kadono | ............... | H04N 19/114 |
| | | | | 375/240.12 |

OTHER PUBLICATIONS

Video/JVET, "Algorithm Description of Joint Exploration Test Model 1 (JEM 1)", International Organization for Standardization Organisation Internationale de Normalisation, ISO/IEC JTC1/SC29/WG11 Coding of Moving Pictures and Audio, Oct. 2015, Geneva, CH.

Elena Alshina et al., "CE1: Samsung's test for bi-directional optical flow", Document: JCTVC-D329, Joint Collaborative Team on Video Coding of ITU-T SG16 WP3 and ISO/IEC JTC1/SC29/WG11, 4th Meeting: Daegu, KR, Jan. 20-28, 2011.

Elena Alshina et al., "Bi-directional optical flow", Document: JCTVC-C204, Joint Collaborative Team on Video Coding of ITU-T SG16 WP3 and ISO/IEC JTC1/SC29/WG11, 3th Meeting: Guangzhou, CN, Oct. 7-15, 2010.

* cited by examiner

FIG. 1A SEQUENCE LAYER 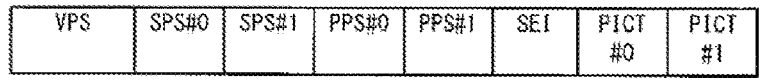
FIG. 1B PICTURE LAYER 
FIG. 1C SLICE LAYER 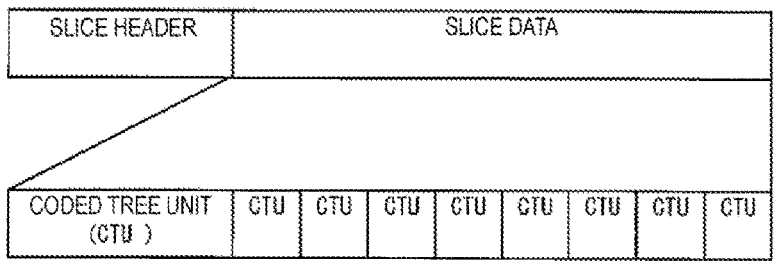
FIG. 1D SLICE DATA LAYER 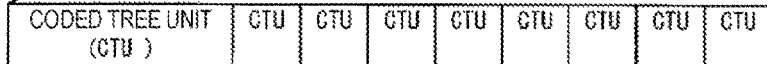
FIG. 1E CODING TREE LAYER 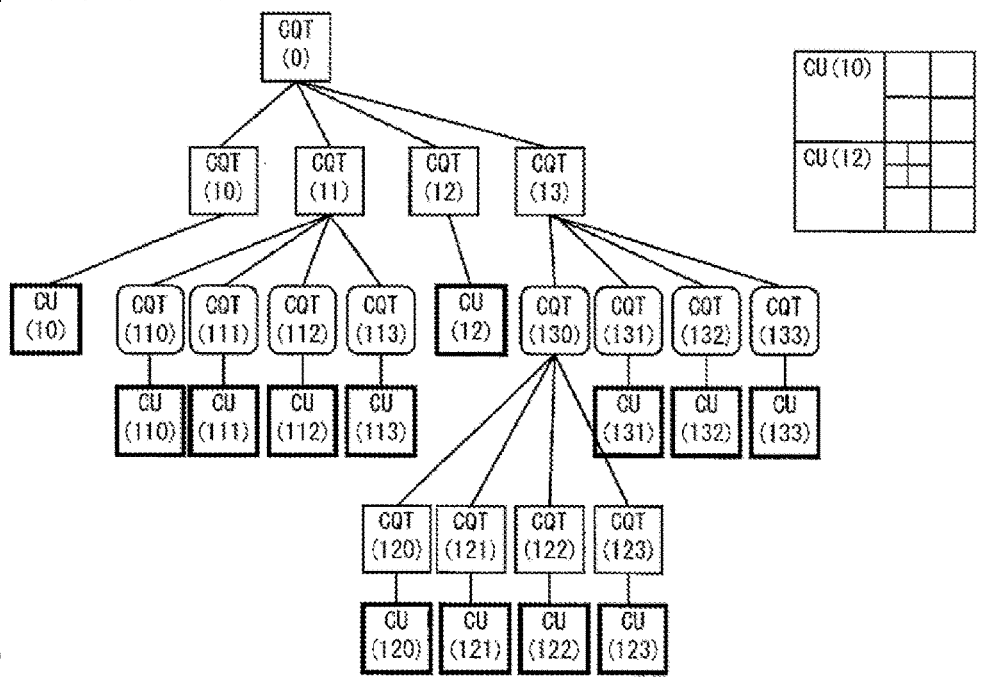
FIG. 1F CODED UNIT LAYER 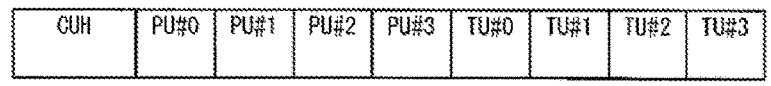

2Nx2N

2NxN

2NxnU

2NxnD

Nx2N nLx2N nRx2N

NxN

FIG. 17A $$I(x,y,t) = I(x + \Delta x, y + \Delta y, t + \Delta t) \quad \text{EQUATION 1}$$

FIG. 17B $$I(x + \Delta x, y + \Delta y, t + \Delta t) = I(x,y,t) + \frac{\partial I}{\partial x}\Delta x + \frac{\partial I}{\partial y}\Delta y + \frac{\partial I}{\partial t}\Delta t$$

EQUATION 2

FIG. 17C $$\frac{\partial I}{\partial x}\Delta x + \frac{\partial I}{\partial y}\Delta y + \frac{\partial I}{\partial t}\Delta t = 0 \quad \text{EQUATION 3}$$

FIG. 17D $$\frac{\partial I}{\partial x}\frac{\Delta x}{\Delta t} + \frac{\partial I}{\partial y}\frac{\Delta y}{\Delta t} + \frac{\partial I}{\partial t}\frac{\Delta t}{\Delta t} = 0 \quad \text{EQUATION 4}$$

FIG. 17E $$\frac{\partial I}{\partial x}V_x + \frac{\partial I}{\partial y}V_y + \frac{\partial I}{\partial t} = 0 \quad \text{EQUATION 5}$$

FIG. 19A

```
mcFilter[NPHASES][NTAPS] =
{
    {  0,  0,   0, 64,  0,   0,  0,  0 },
    { -1,  4, -10, 58, 17,  -5,  1,  0 },
    { -1,  4, -11, 40, 40, -11,  4, -1 },
    {  0,  1,  -5, 17, 58, -10,  4, -1 },
};
```

FIG. 19B

```
gradFilter[NPHASES][NTAPS] =
{
    { 0,  8, -39,  -3, 46, -17,  5, 0 },
    { 0,  4, -17, -36, 60, -15,  4, 0 },
    { 0, -1,   4, -57, 57,  -4,  1, 0 },
    { 0, -4,  15, -60, 36,  17, -4, 0 },
};
```

FIG. 20A $$\Sigma |t1 + t2*u + t3*v|^2 => \min \quad \text{EQUATION 6}$$

⇩

$$\begin{pmatrix} t2^2 & t2t3 \\ t2t3 & t3^2 \end{pmatrix} \begin{pmatrix} u \\ v \end{pmatrix} = -\begin{pmatrix} t1t2 \\ t1t3 \end{pmatrix} \quad \text{EQUATION 7}$$

⇩

$$\begin{pmatrix} s1 & s2 \\ s4 & s5 \end{pmatrix} \begin{pmatrix} u \\ v \end{pmatrix} = \begin{pmatrix} s3 \\ s6 \end{pmatrix} \quad \text{EQUATION 8}$$

⇩

$$\begin{pmatrix} u \\ v \end{pmatrix} = \frac{1}{s1s5-s2s4} \begin{pmatrix} s5 & -s2 \\ -s4 & s1 \end{pmatrix} \begin{pmatrix} s3 \\ s6 \end{pmatrix} = \frac{1}{s1s5-s2s4} \begin{pmatrix} s3s5-s2s6 \\ s1s6-s3s4 \end{pmatrix} = \frac{1}{\det} \begin{pmatrix} \det 1 \\ \det 2 \end{pmatrix} \quad \text{EQUATION 9}$$

⇩

```
u = (det1/det), v = (det2/det)
det  = s1s5-s2s4
det1 = s3s5-s2s6
det2 = s1s6-s3s4
```

FIG. 27A
filter1, GRAD_ACCU=4

| 0 | 8  | -39 | -3  | 46 | -17 | 5  | 0 |
|---|----|-----|-----|----|-----|----|---|
| 0 | 4  | -17 | -36 | 60 | -15 | 4  | 0 |
| 0 | -1 | 4   | -57 | 57 | -4  | 1  | 0 |
| 0 | -1 | 15  | -60 | 36 | 17  | -4 | 0 |

FIG. 27B
filter2, GRAD_ACCU=5

| 8  | -23 | -73 | 1   | 72 | 17 | -7 | 5  |
|----|-----|-----|-----|----|----|----|----|
| 4  | -9  | -66 | -29 | 69 | 34 | -7 | 4  |
| -1 | 2   | -50 | -53 | 53 | 50 | -2 | 1  |
| -1 | 13  | -31 | -69 | 29 | 66 | 9  | -4 |

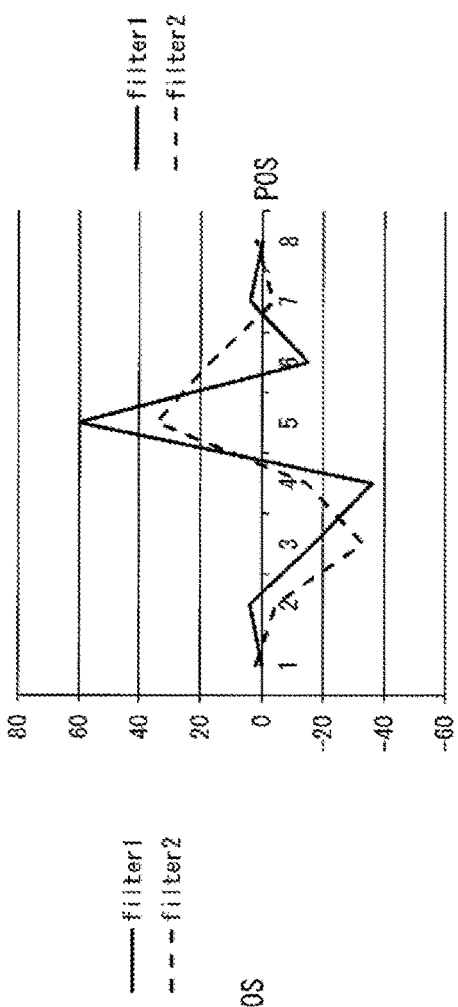
FIG. 28A nFrac=0
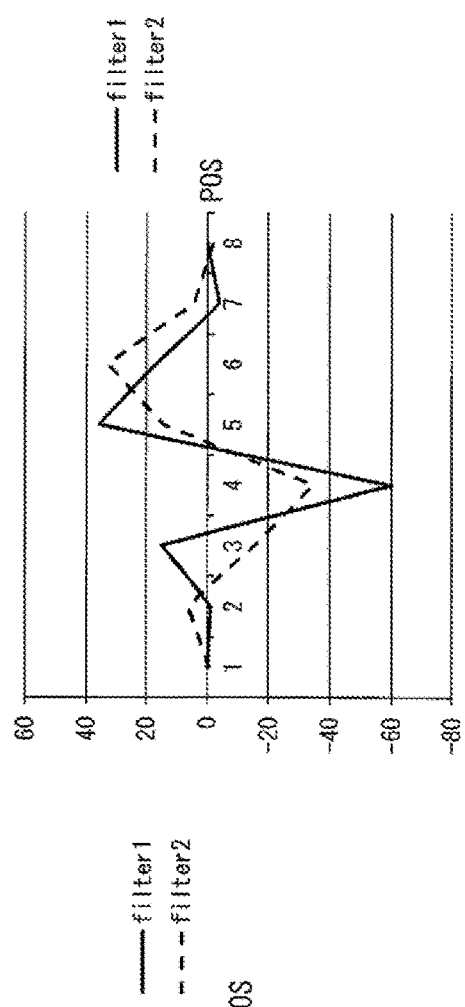
FIG. 28B nFrac=1
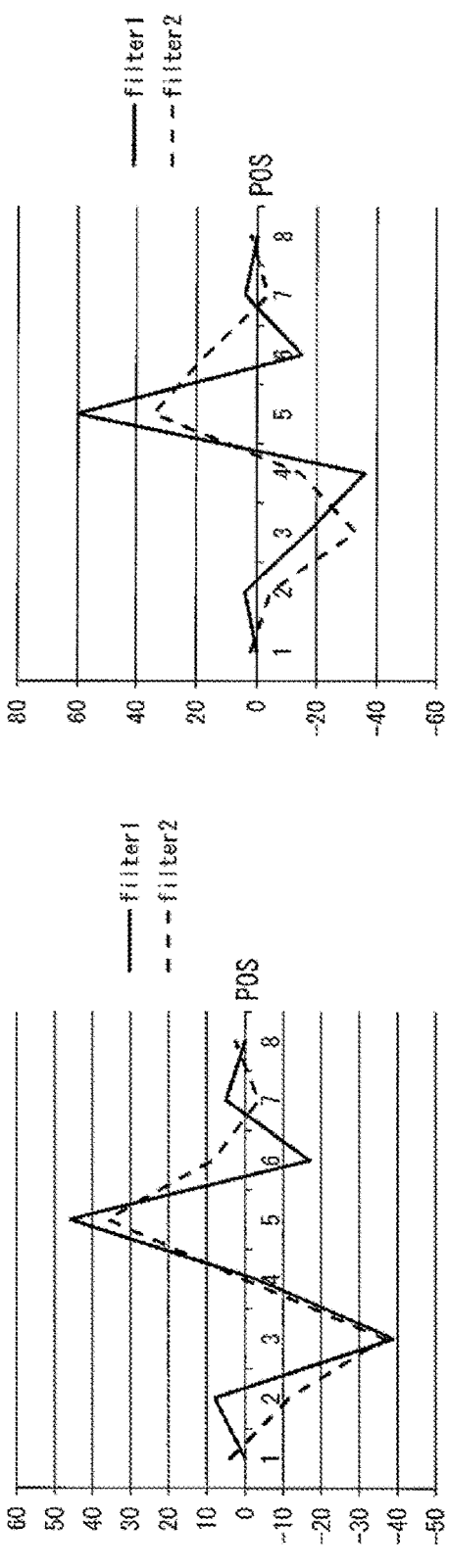
FIG. 28C nFrac=2
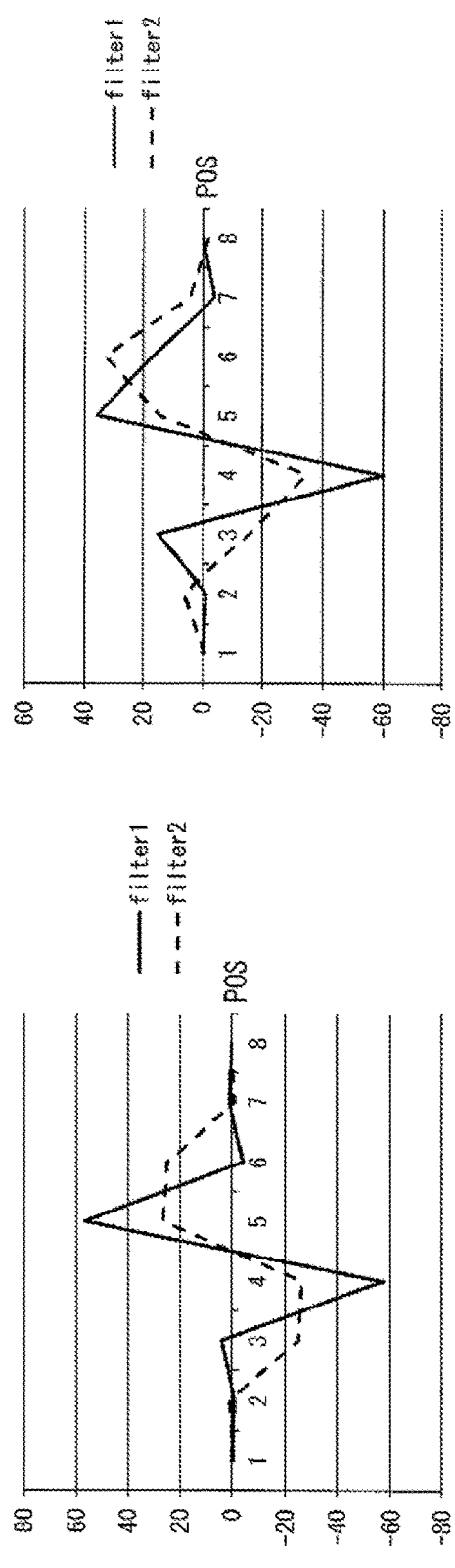
FIG. 28D nFrac=3

|  | ADAPTABLE MV RANGE | CORRECRTION PIXEL UNIT | VECTOR ACCURACY |
|---|---|---|---|
| BIO | NARROW (TO ABOUT 2/3 PIXELS) | HIGH RESOLUTION (ABOUT 1 × 1 PIXEL) | HIGH (1/64 PIXELS OR THE LIKE) |
| FRUC | WIDE (TO ABOUT 4 PIXELS) | LOW RESOLUTION (ABOUT 8 × 8 PIXELS) | PROCESSING AMOUNT INCREASES IN HIGH ACCURACY (TO 1/8 PEL) |

FIG. 32

MOVING IMAGE DECODING DEVICE, MOVING IMAGE CODING DEVICE, AND PREDICTION IMAGE GENERATION DEVICE

TECHNICAL FIELD

An aspect of the disclosure relates to a moving image decoding device, moving image coding device, and a prediction image generation apparatus

BACKGROUND ART

In order to efficiently transmit or record a moving image, there have been used a moving image coding device which generates coded data by coding a moving image, and a moving image decoding device which generates a decoded image by decoding the coded data.

Specific examples of a moving image coding scheme include schemes proposed in H.264/MPEG-4. AVC or High-Efficiency Video Coding (HEVC).

In such a moving image coding scheme, images (pictures) constituting a moving image are managed by a hierarchical structure including slices obtained by diving the images, units of coding (also referred to as Coding Units) obtained by dividing the slices, and prediction units (PUs) and transform units (TUs) which are blocks obtained by dividing the coding units, and each block is coded/decoded.

In such a moving image coding scheme, generally, an input image is coded/decoded to obtain a local decoded image, based on which local decoded image a prediction image is generated, the prediction image is subtracted from the input image (original image) to obtain a prediction residual (also referred to as a "difference image" or a "residual image"), and the prediction residual is coded. Examples of a method for generating a prediction image include inter-prediction, and intra-prediction.

In addition, non-PTL 1 discloses a recent technique of coding and decoding of videos.

CITATION LIST

Non Patent Literature

NPL 1: Video/JVET, "Algorithm Description of Joint Exploration TestModel 1 (JEM 1)", INTERNATIONAL ORGANIZATION FOR STANDARDIZATION ORGANISATION INTERNATIONALE DE NORMALISATION ISO/IEC JTC1/SC29/WG11 CODING OF MOVING PICTURES AND AUDIO, ISO/IEC JTC1/SC29/WG11/N15790, October 2015, Geneva, CH.

SUMMARY

Technical Problem

Recent moving image coding and decoding techniques adopt a technique in which a prediction image is derived through bi-prediction motion compensation based on a target image and two reference images in a motion compensation process upon generating a prediction image. As a technique of improving the accuracy of the prediction image derived through the motion compensation, BIO, which uses gradient information to perform correction, is known as in non-PTL 1; however, this technique has a room for improvement in accuracy.

An embodiment of the disclosure provides an image decoding device that can improve the accuracy of a prediction image derived by motion compensation.

Solution to Problem

To solve the above-described problems, a prediction image generation device according to one aspect of the disclosure is a prediction image generation apparatus for generating a prediction image by performing motion compensation on multiple reference images, the prediction image generation apparatus including a prediction image generation unit configured to generate the prediction image with reference to a first reference image, a second reference image and a gradient correction term, wherein the prediction image generation unit derives a first weight coefficient to be multiplied by a pixel value of each pixel of the first reference image, and a second weight coefficient to be multiplied by a pixel value of each pixel of the second reference image in accordance with a picture interval between a target image to be predicted and the first reference image and a picture interval between the target image and the second reference image.

To solve the above-described problems, a prediction image generation device according to one aspect of the disclosure is a prediction image generation apparatus for generating a prediction image by performing motion compensation on multiple reference images, the prediction image generation apparatus including a prediction image generation unit configured to generate the prediction image with reference to a first reference image, a second reference image and a gradient correction term, wherein the prediction image generation unit derives the gradient correction term with reference to a value of each pixel of: a first gradient image indicating a gradient along a first direction of the first reference image; a second gradient image indicating a gradient along a second direction of the first reference image; a third gradient image indicating a gradient along the first direction of the second reference image; and a fourth gradient image indicating a gradient along the second direction of the second reference image, and each weight coefficient to be multiplied by the value of the each pixel of the first to fourth gradient images is determined in accordance with a first picture interval and a second picture interval, the first picture interval being a picture interval between a target image to be predicted and the first reference image, the second picture interval being a picture interval between the target image and the second reference image.

To solve the above-described problems, a prediction image generation device according to one aspect of the disclosure is a prediction image generation apparatus for generating a prediction image by performing motion compensation on multiple reference images, the prediction image generation apparatus including a prediction image generation unit configured to generate the prediction image with reference to a first reference image, a second reference image and a gradient correction term, wherein the prediction image generation unit derives the gradient correction term with reference to a value of each pixel of: a first gradient image indicating a gradient along a first direction of the first reference image; a second gradient image indicating a gradient along a second direction of the first reference image; a third gradient image indicating a gradient along the first direction of the second reference image; and a fourth gradient image indicating a gradient along the second direction of the second reference image, in a case that a prescribed flag indicates a first value, each of weight coefficients to be multiplied by the value of the each pixel of the first to fourth gradient images is determined in accordance with a first picture interval and a second picture interval, the first picture interval being a picture interval between a target image to be predicted and the first reference image, the second picture interval being a picture interval between the target image and the second reference image, and in a case that the prescribed flag indicates a second value, the weight coefficients to be multiplied by the values of the respective pixels of the first to fourth gradient images are the same value.

To solve the above-described problems, a prediction image generation device according to one aspect of the disclosure is a prediction image generation apparatus for generating a prediction image by performing motion compensation on multiple reference images, the prediction image generation apparatus including a prediction image generation unit configured to generate the prediction image with reference to a first reference image, a second reference image and a gradient correction term, wherein the prediction image generation unit derives the gradient correction term with reference to a value of each pixel of: first gradient image indicating a gradient along a first direction of the first reference image; a second gradient image indicating a gradient along a second direction of the first reference image; a third gradient image indicating a gradient along the first direction of the second reference image; and a fourth gradient image indicating a gradient along the second direction of the second reference image, and each weight coefficient to be multiplied by the value of the each pixel of the first to fourth gradient images is determined for each block.

To solve the above-described problems, a prediction image generation device according to one aspect of the disclosure is a prediction image generation apparatus for generating a prediction image by performing motion compensation on multiple reference images, the prediction image generation apparatus including a prediction image generation unit configured to generate the prediction image with reference to a first reference image, a second reference image and a gradient correction term, wherein the prediction image generation unit derives the gradient correction term with reference to a value of each pixel of: a first gradient image indicating a gradient along a first direction of the first reference image; a second gradient image indicating a gradient along a second direction of the first reference image; a third gradient image indicating a gradient along the first direction of the second reference image; and a fourth gradient image indicating a gradient along the second direction of the second reference image, and the prediction image generation unit includes a first switching unit configured to switch a gradient filter used for deriving each gradient image.

To solve the above-described problems, a prediction image generation device according to one aspect of the disclosure is a prediction image generation apparatus for generating a prediction image by performing motion compensation on multiple reference images, the prediction image generation apparatus including a prediction image generation unit configured to generate the prediction image with reference to a first reference image, a second reference image and a gradient correction term, wherein the prediction image generation unit derives the gradient correction term with reference to a value of each pixel of: a first gradient image indicating a gradient along a first direction of the first reference image; a second gradient image indicating a gradient along a second direction of the first reference image; a third gradient image indicating a gradient along the first direction of the second reference image, and a fourth gradient image indicating a gradient along the second direction of the second reference image; and the prediction image generation unit includes a clip unit configured to perform clip processing on each weight coefficient to be multiplied by the value of the each pixel of the first to fourth gradient images.

To solve the above-described problems, a prediction image generation device according to one aspect of the disclosure is a prediction image generation apparatus for generating a prediction image by performing motion compensation on multiple reference images, the prediction image generation apparatus including: a prediction image generation unit configured to generate the prediction image with reference to a first reference image, a second reference image and a gradient correction term, wherein the prediction image generation unit derives the gradient correction term with reference to a value of each pixel of: a first gradient image indicating a gradient along a first direction of the first reference image; a second gradient image indicating a gradient along a second direction of the first reference image; a third gradient image indicating a gradient along the first direction of the second reference image; and a fourth gradient image indicating a gradient along the second direction of the second reference image, each weight coefficient to be multiplied by the value of the each pixel of the first to fourth gradient images is determined by using intermediate parameters determined with reference to at least one of the first gradient image to the fourth gradient image and a regularization term to be added to the intermediate parameters, and the prediction image generation unit includes a second switching unit configured to switch the regularization term.

To solve the above-described problems, a prediction image generation device according to one aspect of the disclosure is a prediction image generation apparatus for generating a prediction image by performing motion compensation on multiple reference images, the prediction image generation apparatus including a prediction vector calculation unit, and a prediction image generation unit configured to generate the prediction image with reference to a first reference image, a second reference image and a gradient correction term, wherein the prediction vector calculation unit is configured to derive a motion vector by using a prediction mode selected from among one or more prediction modes including a matching prediction mode, and the prediction image generation unit switches, in a case of correcting a motion compensation image derived by the motion vector obtained in the matching prediction mode, accuracy of the motion vector used for derivation of the motion compensation image, depending on whether a BIO prediction is applied.

Advantageous Effects of Invention

According to the configuration, it is possible to increase the accuracy of a prediction image derived by motion compensation.

BRIEF DESCRIPTION OF DRAWINGS

FIGS. 1A to 1F are diagrams illustrating a hierarchical structure of data of a coded stream according to the present embodiment.

FIGS. 2A to 2H respectively illustrate partition shapes in cases that the PU partition mode is 2N×2N, 2N×N, 2N×nU, 2N×nD, N×2N, nL×2N, nR×2N, and N×N.

FIGS. 17A to 17E are drawings illustrating an example of a flow in which the concept of gradient change is derived.

FIG. 19A illustrates a specific example of a motion compensation filter mcFilter, and FIG. 19B illustrates a specific example of a gradient compensation filter.

FIGS. 20A and 20B are drawings for describing a method of deriving a correction weight vector by using a least-squares method.

FIG. 27A illustrates an example of the high-resolution filter set, and FIG. 27B illustrates an example of the low-resolution filter set.

FIGS. 28A to 28D are graphs of a high-resolution filter set and a low-resolution filter set illustrated in FIGS. 27A and 27B for each value of yFrac.

FIG. 32 illustrates comparison between prediction accuracies of the BIO prediction mode and the matching mode.

FIG. 33A illustrates the transmission device equipped with the image coding device, and FIG. 33B illustrates the reception device equipped with the image decoding device.

FIG. 34A illustrates the recording device equipped with the image coding device, and FIG. 34B illustrates the reproducing device equipped with the image decoding device.

DESCRIPTION OF EMBODIMENTS

First Embodiment

Hereinafter, embodiments of the disclosure are described in detail with reference to the drawings.

Figure 14:
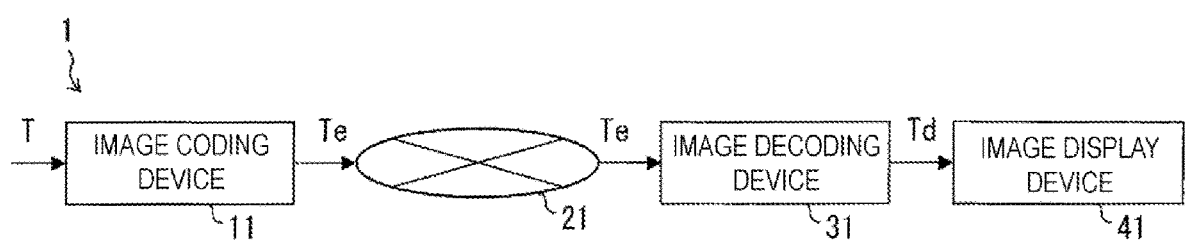
FIG. 14 is a schematic diagram illustrating a configuration of an image transmission system according to an embodiment of the present invention.

FIG. 14 is a schematic diagram illustrating a configuration of an image transmission system 1 according to the present embodiment.

The image transmission system 1 is a system in which a code obtained by coding a coding target image is transmitted and the image obtained by decoding the transmitted code is displayed. The image transmission system 1 is configured to include an image coding device 11 (moving image coding device), a network 21, an image decoding device 31 (moving image decoding device), and an image display device 41.

Signals T representing an image of a single layer or multiple layers are input to the image coding device 11. A layer is a concept used to distinguish multiple pictures in a case that a certain time period is constituted by one or more pictures. For example, scalable coding applies in a case that the same picture is coded in multiple layers which are different in an image quality or resolution, and view scalable coding applies in a case that pictures different in a viewpoint are coded in multiple layers. In a case that prediction is performed between pictures of multiple layers (inter-layer prediction, inter-view prediction), the coding efficiency is highly improved. In a case also that prediction is not performed (simulcast), the coded data can be collected.

The image coding device 11 and the image decoding device 31 may adopt a single layer image, or may perform an arbitrary combination of the scalable coding and the view scalable coding.

The network 21 transmits a coded stream Te generated by the image coding device 11 to the image decoding device 31.

The network 21 includes the Internet, a Wide Area Network (WAN), or a Local Area Network (LAN), or a combination thereof. The network 21 is not necessarily limited to a bidirectional communication network, but may be a unidirectional or bidirectional communication network transmitting broadcast waves such as digital terrestrial broadcasting and satellite broadcasting. The network 21 may be substituted by a storage medium in which the coded stream Te is recorded such as a Digital Versatile Disc (DVD) and a Blue-ray Disc (BD).

The image decoding device 31 decodes each coded stream Te transmitted by the network 21, and generates one or multiple decoded layer images Td (decoded viewpoint images Td).

The image display device 41 displays all or some of one or multiple decoded layer images Td generated by the image decoding device 31. For example, in the view scalable coding, in the case of displaying all, a three-dimensional image (stereoscopic image) or free-viewpoint image is displayed, and in the case of displaying some, a two-dimensional image is displayed. The image display device 41 includes a display device, for example, a liquid crystal display and an organic Electro-luminescence (EL) display. In spatial scalable coding and SNR scalable coding, the image decoding device 31 and the image display device 41 display an enhancement layer image which is higher in an image quality in a case of having high processing capability, and display a base layer image for which processing capability and display capability are required not so much high as the enhancement layer in a case of having only lower processing capability.

<Structure of Coded Stream Te>

Before describing in detail the image coding device 11 and the image decoding device 31 according to the present embodiment, a description is given of a data structure of the coded stream Te which is generated by the image coding device 11 and decoded by the image decoding device 31.

FIGS. 1A to 1F are diagrams illustrating a hierarchical structure of data in the coded stream Te. The coded stream Te exemplarily contains a sequence and multiple pictures constituting the sequence. FIGS. 1A to 1F are diagrams respectively illustrating a sequence layer specifying a sequence SEQ, a picture layer specifying a picture PICT, a slice layer specifying a slice S, a slice data layer specifying slice data, a coded tree layer specifying a coded tree unit included in the slice data, and a coded unit layer specifying a Coding Unit (CU) included in the coding tree.

(Sequence Layer)

The sequence layer specifies a set of data to which the image decoding device 31 refers in order to decode the sequence SEQ to be processed (hereinafter, also referred to as a target sequence). The sequence SEQ contains, as illustrated in FIG. 1A, a Video Parameter Set, a Sequence Parameter Set (SPS), a Picture Parameter Set (PPS), a picture PICT, and Supplemental Enhancement Information (SEI). Here, a value following "#" indicates a layer ID. FIGS. 1A to 1F illustrate an example in which there is coded data of #0 and #1, that is, a layer 0 and a layer 1, but types of layer and the number of layers are not limited thereto.

The video parameter set VPS specifies, for a moving image configured with multiple layers, set of coding parameters common to multiple moving images and a set of coding parameters associated with multiple layers and individual layers contained in the moving image.

The sequence parameter set SPS specifies a set of coding parameters to which the image decoding device 31 refers in order to decode the target sequence. For example, a width and height of a picture are specified. There may be multiple SPSs. In this case, any of multiple SPSs is selected from the PPS.

The picture parameter set PPS specifies a set of coding parameters to which the image decoding device 31 refers in order to decode pictures in the target sequence. For example, the PPS includes a reference value (pic_init_qp_minus26) of a quantization width (quantization step) used to decode the picture and a flag indicating that a weighted prediction is applied (weighted_pred_flag). There may be multiple PPSs. In this case, any of multiple PPSs is selected from the pictures in the target sequence.

(Picture Layer)

The picture layer specifies a set of data to which the image decoding device 31 refers in order to decode a picture PICT to be processed (hereinafter, also referred to as a target picture). The picture PICT contains slices S0 to SNS−1 (NS represents the total number of slices contained in the picture PICT) as illustrated in FIG. 1B.

Hereinafter, the slices S0 to SNS−1 may be expressed with their suffixes omitted in a case of being not necessary to be distinguished from each other. The same holds for other data with a suffix which is contained in the coded stream Te described below.

(Slice Layer)

The slice layer specifies a set of data to which the image decoding device 31 refers in order to decode a slice S to be processed (also referred to as a target slice). The slice S contains a slice header SH and slice data SDATA, as illustrated in FIG. 1C.

The slice header SH contains a coding parameter group to which the image decoding device 31 refers in order to determine a method of decoding a target slice. Slice type specifying information specifying a slice type (slice_type) is an example of the coding parameter contained in the slice header SH.

Examples of the slice type specifiable by the slice type specifying information include (1) I slice that is coded using intra prediction only, (2) P slice that is coded using unidirectional prediction or intra-prediction, and (3) B slice that is coded using uni-prediction, bi-prediction, or intra prediction.

The slice header SH may include reference to the picture parameter set PPS (pic_parameter_set_id) which is contained in the above sequence layer.

(Slice Data Layer)

The slice data layer specifies a set of data to which the image decoding device 31 refers in order to decode slice data SDATA to be processed. The slice data SDATA contains a Coded Tree Block (CTB) as illustrated in FIG. 1D. The CTB is a block having a fixed size (e.g., 64×64) constituting a slice, and may be also referred to as a Largest Cording Unit (LCU) or a Coded Tree Unit (CTU).

(Coding Tree Layer)

The coded tree layer specifies a set of data to which the image decoding device 31 refers in order to decode a coded tree block to be processed as illustrated in FIG. 1E. The coded tree block is partitioned by recursive quadtree partitioning. A node of a tree structure obtained by the recursive quadtree partitioning is called a coding tree. An intermediate node of the quadtree is a Coded Quad Tree (CQT) and the coded tree block itself is specified as a top CQT. The CQT contains a split flag (split_flag), and is partitioned into four CQTs in a case that split_flag is 1. In a case that split_flag is 0, the CQT is not partitioned and has one Coded Unit (CU) as a node. The coded unit CU is a terminal node of the coded tree layer and is not partitioned any further in this layer. The coding unit CU is a basic unit for coding processing.

In a case that a size of the coded tree block CTB is 64×64 pixel, a size of the coded unit may be any of 64×64 pixel, 32×32 pixel, 16×16 pixel, and 8×8 pixel.

(Coded Unit Layer)

The coded unit layer specifies a set of data to which the image decoding device 31 refers in order to decode a coded unit to be processed, as illustrated in FIG. 1F. Specifically, the coding unit includes a coding tree, a prediction tree, a transform tree, and a CU header CUF. The coding tree specifies a split flag, a division pattern, a prediction mode, and the like.

The prediction tree specifies prediction information (reference picture index, motion vector, and the like) of each of prediction blocks which are obtained by partitioning the coded unit into one or multiple pieces. In other words, the prediction block/blocks is/are one or multiple non-overlapping areas which constitute the coding unit. The prediction tree includes one or multiple prediction blocks which are obtained by the above partitioning. Hereinafter, a unit of prediction obtained by further partitioning the prediction block is called a "sub-block". The sub-block (prediction block) is configured with one or multiples pixel. In a case that a size of the prediction block is equal to a size of the sub-block, the number of sub-blocks in the prediction block is one. In a case that a size of the prediction block is larger than a size of the sub-block, the prediction block is partitioned into the sub-blocks. For example, in a case that a size of the prediction block is 8×8 and a size of the sub-block is 4×4, the prediction block is partitioned horizontally into two and vertically into two to be partitioned into four sub-blocks.

Prediction processing is performed for each of these prediction blocks (sub-blocks). Hereinafter, the prediction block as a unit of prediction is also referred to as a prediction unit (PU).

A type of partition for the prediction tree is roughly classified into two for a case of the intra prediction and a case of the inter prediction. The intra prediction is prediction within an identical picture, and the inter prediction is prediction processing performed between pictures different from each other (e.g., between display times, between layer images).

In the case of the intra prediction, a partition method includes methods using 2N×2N (the same size as the coding unit) and N×N.

In the case of the inter prediction, a partition method includes coding in a PU partition mode (part_mode) in the coded data, and includes methods using 2N×2N (the same size as the coding unit), 2N×N, 2N×nU, 2N×nD, N×2N, nL×2N, nR×2N, and N×N. Note that 2N×nU indicates that a 2N×2N coding unit are partitioned into two areas, 2N×0.5N and 2N×1.5N, in this order from the upside. 2N×nD indicates that a 2N×2N coding unit is partitioned into two areas, 2N×1.5N and 2N×0.5N, in this order from the upside. nL×2N indicates that a 2N×2N coding unit is partitioned into two areas, 0.5N×2N and 1.5N×2N, in this order from the left. nR×2N indicates that a 2N×2N coding unit is partitioned into two areas, 1.5N×2N and 0.5N×1.5N, in this order from the left. The number of partitions is any of 1, 2, or 4, and thus, the number of PUs included in the CU is 1 to 4. These PUs are expressed as PU0, PU1, PU2, and PU3 in this order.

Each of FIGS. 2A to 2H specifically illustrates a boundary location of PU partitioning in the CU for each partition type.

Figure 2A:
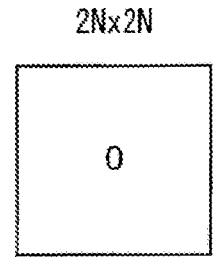
FIGS. 2A to 2H are diagrams illustrating patterns for a PU partition mode.

FIG. 2A illustrates a PU partition mode for 2N×2N in which the CU is not partitioned.

Figure 2B:
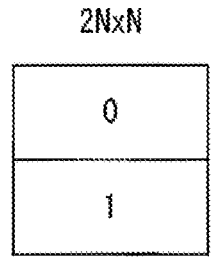
Figure 2C:
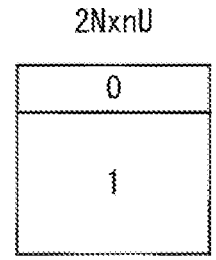
Figure 2D:
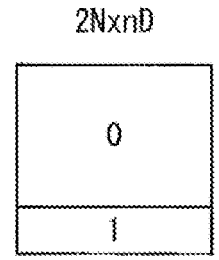

FIGS. 2B, 2C and 2D illustrate respectively partition shapes in cases that the PU partition modes are 2N×N, 2N×nU, and 2N×nD. Hereinafter, the partitions in the cases that the PU partition modes are 2N×N, 2N×nU, and 2N×nD are collectively referred to as a horizontally-long partition.

Figure 2E:
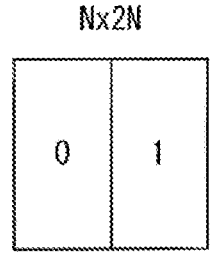
Figure 2F:
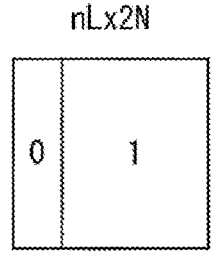
Figure 2G:
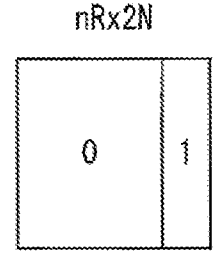

FIGS. 2E, 2F and 2G illustrate respectively partition shapes in the cases that the PU partition modes are N×2N, nL×2N, and nR×2N. Hereinafter, the partitions in the case that the PU partition modes are N×2N, nL×2N, and nR×2N are collectively referred to as a vertically-long partition.

The horizontally-long partition and the vertically-long partition are collectively referred to as a rectangular partition.

Figure 2H:
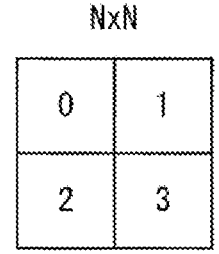

FIG. 2H illustrates a partition shape in a case that the PU partition mode is N×N. The PU partition modes in FIGS. 2A and 2H are also referred to as square partitioning based on their partition shapes. The PU partition modes in FIGS. 2B to 2G are also referred to as non-square partitioning.

In FIGS. 2A to 2H, the number assigned to each area indicates an identification number of the area, and the areas are processed in an order of the identification number. To be more specific, the identification number represents a scan order for partitioning.

In FIGS. 2A to 2H, assume that an upper left corner is a base point (origin) of the CU.

In the transform tree, the coding unit is partitioned into one or multiple transform blocks, and a location and size of each transform block is specified. In other words, the transform block/blocks is/are one or multiple non-overlapping areas which constitute the coding unit. The transform tree includes one or multiple transform blocks which are obtained by the above partitioning.

Partitioning in the transform tree includes that performed by allocating an area having the same size as the coding unit as a transform block, and that performed by the recursive quadtree partitioning similar to the partitioning of the tree block described above.

Transform processing is performed for each of these transform blocks. Hereinafter, the transform block as a unit of transform is also referred to as a transform unit (TU).

(Prediction Parameter)

A prediction image in a prediction unit is derived according to a prediction parameter associated with the prediction unit. The prediction parameter includes a prediction parameter for intra prediction or a prediction parameter for inter prediction. Hereinafter, the prediction parameter for inter prediction (inter-prediction parameter) is described. The inter-prediction parameter includes prediction list utilization flags predFlagL0 and predFlagL1, reference picture indices refIdxL0 and refIdxL1, and vectors mvL0 and mvL1. The prediction list utilization flags predFlagL0 and predFlagL1 are flags respectively indicating whether or not reference picture lists called L0 list and L1 list are used, and in a case that a value of each thereof is 1, the corresponding reference picture list is used. Here, assume that in a case that an expression "a flag indicating whether or not XX" is used herein, "1" corresponds to a case of XX and "0" corresponds to a case of not XX, and "1" represents true and "0" represents false in logical NOT, logical AND or the like (the same applies hereinafter). However, other values may be used as a true value or a false value in actual device or methods. A case that two reference picture lists are used, that is, a case of predFlagL0=1 and predFlagL1=1, corresponds to bi-prediction, and a case that one reference picture list is used, that is, a case of (predFlagL0, predFlagL1)=(1, 0) or (predFlagL0, predFlagL1)=(0, 1), corresponds to uni-prediction. Information on the prediction list utilization flag can be expressed by an inter-prediction flag inter_pred_idc described below. In general, a prediction image generation unit 308 (prediction image generation unit) and prediction parameter memory 307 which are described below use the prediction list utilization flag, and in a case that information concerning which reference picture list is used or not is decoded from the coded data, the inter-prediction flag inter_pred_ide is used.

Examples of a syntax element for deriving the inter-prediction parameter included in the coded data include a partition mode part_mode, a merge flag merge_flag, a merge index merge_idx, an inter-prediction flag inter_pred_idc, a reference picture index refIdxLX, a prediction vector index mvp_LX_idx, and a difference vector mvdLX, for example.

(Example of Reference Picture List)

Figure 3:
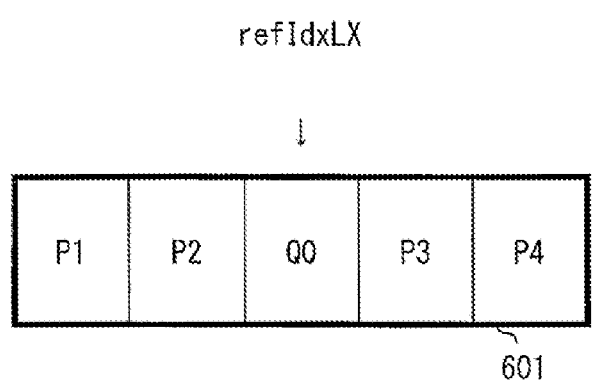
FIG. 3 is a conceptual diagram illustrating an example of a reference picture list.
Figure 5:
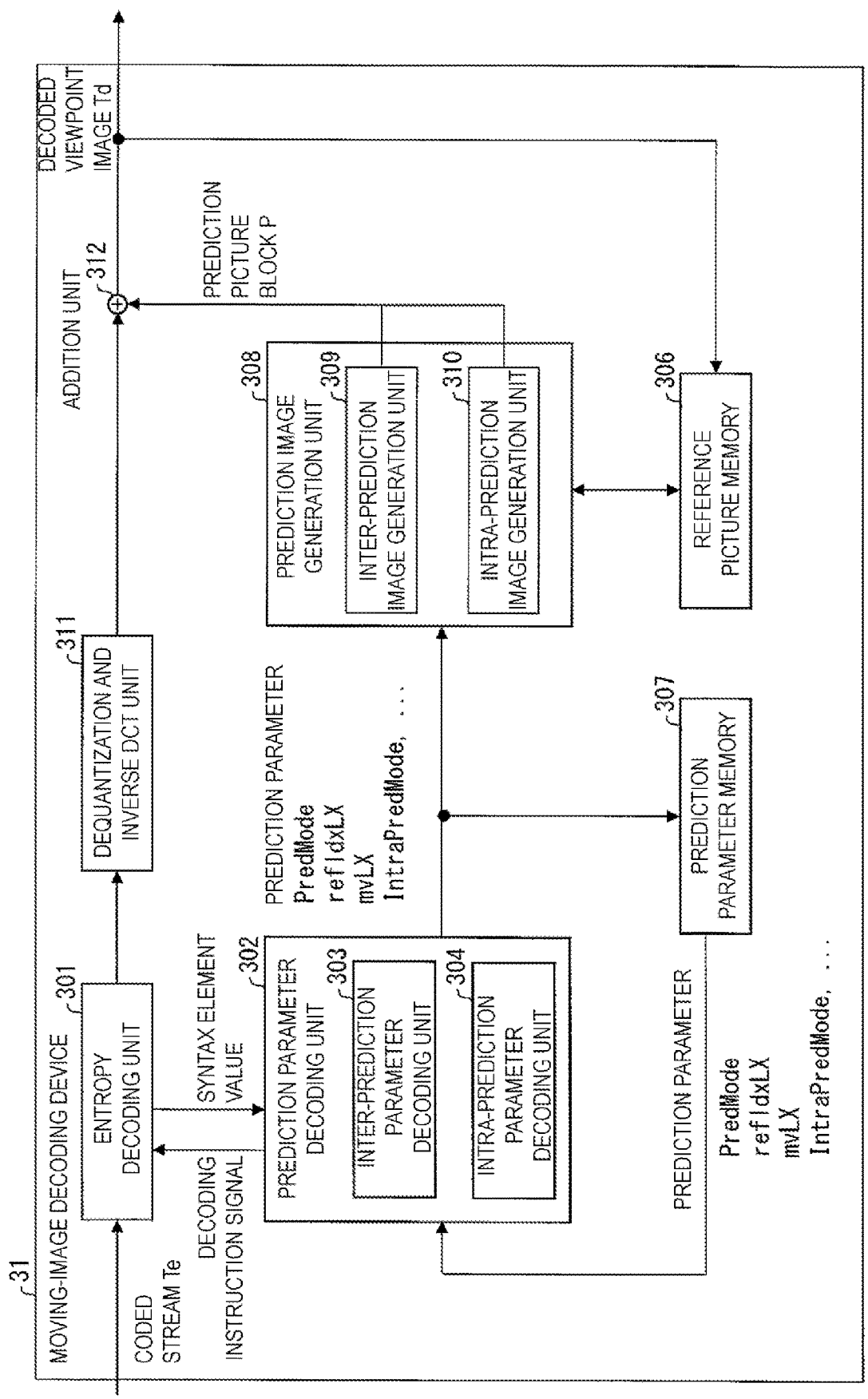
FIG. 5 is a schematic diagram illustrating a configuration of an image decoding device according to the present embodiment.

Next, a description is given of an example of the reference picture list. The reference picture list is a row constituted by the reference pictures (reference images) stored in a reference picture memory 306 (FIG. 5). FIG. 3 is a conceptual diagram illustrating an example of the reference picture list. In a reference picture list 601, each of five rectangles horizontally aligned represents a reference picture. Signs P1, P2, Q0, P3, and P4 indicated from a left end to the right are signs representing corresponding reference pictures. The character "P" of P1 or the like represents a viewpoint P, and the character "Q" of Q0 represents a viewpoint Q different from the viewpoint P. A suffix of P or Q indicates a picture order count POC. A downward arrow immediately under "refIdxLX" represents that the reference picture index refIdxLX is an index for referring to a reference picture Q0 in the reference picture memory 306.

(Example of Reference Pictures)

Figure 4:
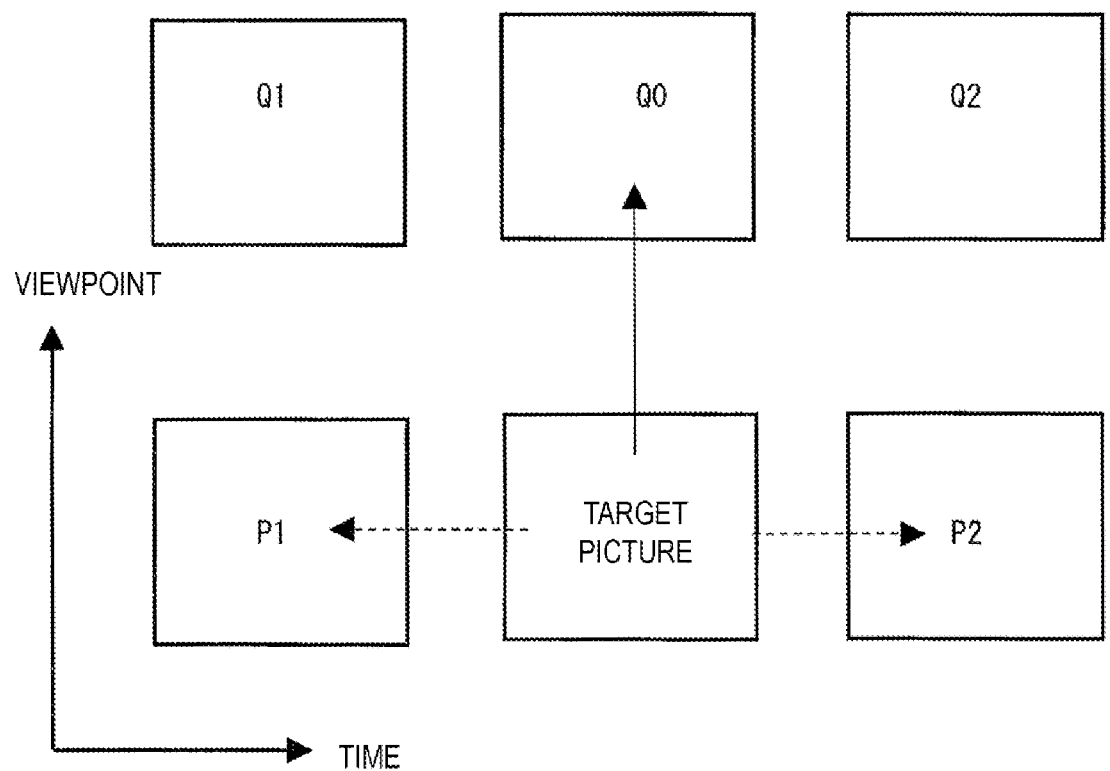
FIG. 4 is a conceptual diagram illustrating an example of reference pictures.

Next, a description is given of an example of the reference pictures which is used to derive a vector. FIG. 4 is a conceptual diagram illustrating an example of the reference pictures. In FIG. 4, a horizontal axis represents a display time and a vertical axis represents a viewpoint. Two rows and three columns of rectangles (six in total) illustrated in FIG. 4 represent pictures. The rectangle on a lower row and the second column from the left among six rectangles represents a decoding target picture (target picture) and the other five rectangles represent the reference pictures. The reference picture Q0 indicated by an upward arrow from the target picture is a picture the same as the target picture in a display time but different in a viewpoint. The reference picture Q0 is used in displacement prediction in which the target picture is used as a reference. The reference picture P1 indicated by a leftward arrow from target picture is the same as the target picture in a viewpoint and is a previous picture. The reference picture P2 indicated by a rightward arrow from the target picture is the same as the target picture in a viewpoint and is a future picture. The reference picture P1 or P2 is used in motion prediction in which the target picture is used as a reference.

(Inter-Prediction Flag and Prediction List Utilization Flag)

A relationship between the inter-prediction flag and the prediction list utilization flags predFlagL0 and predFlagL1 is mutually transformable as below. Therefore, the prediction list utilization flag may be used as the inter-prediction parameter or inter-prediction flag may be used instead. In the following description, in determination using the prediction list utilization flag, the inter-prediction flag may be alternatively used. In contrast, in determination using the inter-prediction flag, the prediction list utilization flag may be alternatively used.

Inter-prediction flag=(predFlag$L$1<<1)+predFlag$L$0 predFlagL0=inter-prediction flag & 1
predFlagL1=inter-prediction flag>>1 where ">>" represents right shift and "<<" represents left shift.

(Merge Prediction and AMVP Prediction)

A prediction parameter decoding (coding) method includes a merge prediction (merge) mode and an Adaptive Motion Vector Prediction (AMVP) mode, and a merge flag merge_flag is a flag identifying these modes. In both the merge prediction mode and the AMVP mode, a prediction parameter for an already processed block is used to derive a prediction parameter for a target PU. The merge prediction mode is a mode in which a prediction list utilization flag predFlagLX (or inter-prediction flag inter_pred_idc), a reference picture index refIdxLX, and a motion vector mvLX are not included in the coded data, and the prediction parameter already derived for a neighboring PU is used as it is. The AMVP mode is a mode in which the inter-prediction flag inter_pred_idc, the reference picture index refIdxLX, and the motion vector mvLX are included in the coded data. The motion vector mvLX is coded as a prediction vector index mvp_LX_idx identifying the prediction vector mvpLX and as a difference vector mvdLX.

The inter-prediction flag inter_pred_ide is data indicating types and the number of the reference pictures, and has a value PRED_L0, PRED_L1, or PRED_Bi. PRED_L0 and PRED_L1 indicate that the reference pictures stored in the reference picture lists called L0 list and L1 list, respectively, are used, and indicate that one reference picture is used (uni-prediction). The predictions using L0 list and L1 list are called L0 prediction and L1 prediction, respectively. PRED_Bi indicates that two reference pictures are used (bi-prediction), and indicates that two reference pictures stored in L0 list and L1 list are used. The prediction vector index mvp_LX_idx is an index indicating a prediction vector, and the reference picture index refIdxLX is an index indicating a reference picture stored in the reference picture list. "LX" is a description method used in a case that the L0 prediction and the L1 prediction are not distinguished from each other, and a parameter for L0 list and a parameter for L1 list are distinguished by replacing "LX" with "L0" or "L1". For example, refIdxL0 is a reference picture index used for the L0 prediction, refIdxL1 is a reference picture index used for the L1 prediction, and refIdx (refIdxLX) is an expression used in a case that refIdxL0 and refIdxL1 are not distinguished from each other.

The merge index merge_idx is an index indicating that whether any prediction parameter is used as a prediction parameter for the decoding target block, among prediction parameter candidates (merge candidate) derived from the block on which the processing is completed.

The "target block" may be a prediction block higher by one hierarchy than multiple prediction blocks, or may be a coded unit including the multiple prediction blocks.

(Motion Vector and Displacement Vector)

The motion vector mvLX can be also separated into a motion vector in a narrow sense (narrow-sense motion vector) indicating a displacement amount between the blocks on two pictures which are different in times, and a displacement vector (disparity vector, parallax vector) indicating a displacement amount between two blocks which are the same in a time. In the following description, the motion vector and the displacement vector are not distinguished from each other, and merely referred to as the motion vector mvLX. The prediction vector and difference vector for the motion vector mvLX are called respectively a prediction vector mvpLX and a difference vector mvdLX. Whether the motion vector mvLX or the difference vector mvdLX is a motion vector or a displacement vector is identified using the reference picture index refIdxLX associated with the vector.

(Configuration of Image Decoding Device)

Next, a description is given of a configuration of an image decoding device 31 according to the present embodiment. FIG. 5 is a schematic diagram illustrating the configuration of the image decoding device 31 according to the present embodiment. The image decoding device 31 is configured to include an entropy decoding unit 301, a prediction parameter decoding unit 302, a reference picture memory (reference image storage unit, frame memory) 306, a prediction parameter memory (prediction parameter storage unit, frame memory) 307, a prediction image generation unit 308, a dequantization and inverse DCT unit 311, and an addition unit 312 and a residual storing unit 313 (residual recording unit).

The prediction parameter decoding unit 302 is configured to include an inter-prediction parameter decoding unit 303 and an intra-prediction parameter decoding unit 304. The prediction image generation unit 308 is configured to include an inter-prediction image generation unit 309 and an intra-prediction image generation unit 310.

The entropy decoding unit 301 performs entropy decoding on the coded stream Te input from outside to demultiplex and decode individual codes (syntax elements). Examples of the demultiplexed codes include the prediction information for generating the prediction image and residual information for generating the difference image.

The entropy decoding unit 301 outputs some of the demultiplexed codes to the prediction parameter decoding unit 302. Some of the demultiplexed codes are, for example, a prediction mode PredMode, partition mode part_mode, merge flag merge_flag, merge index merge_idx, inter-prediction flag inter pred_idc, reference picture index refIdxLX, prediction vector index mvp_LX_idx, and difference vector mvdLX. Control on which code is to be decoded is based on an instruction from the prediction parameter decoding unit 302. The entropy decoding unit 301 outputs quantized coefficients to the dequantization and inverse DCT unit 311. The quantized coefficients are coefficients obtained by performing Discrete Cosine Transform (DCT) on the residual signal and quantization in the coding processing.

The inter-prediction parameter decoding unit 303 refers to the prediction parameter stored in the prediction parameter memory 307, based on the code input from the entropy decoding unit 301 to decode the inter-prediction parameter.

The inter-prediction parameter decoding unit 303 outputs the decoded inter-prediction parameter to the prediction image generation unit 308 and stores the parameter in the prediction parameter memory 307. The inter-prediction parameter decoding unit 303 is described in detail later.

The intra-prediction parameter decoding unit 304 refers to the prediction parameter stored in the prediction parameter memory 307, based on the code input from the entropy decoding unit 301 to decode the intra-prediction parameter. The intra-prediction parameter is a parameter used for processing to predict the picture block within one picture, for example, an intra-prediction mode IntraPredMode. The intra-prediction parameter decoding unit 304 outputs the decoded intra-prediction parameter to the prediction image generation unit 308 and stores the parameter in the prediction parameter memory 307.

The intra-prediction parameter decoding unit 304 may derive an intra-prediction mode different in luminance and color difference. In this case, the intra-prediction parameter decoding unit 304 decodes a luminance prediction mode IntraPredModeY as a prediction parameter for luminance, and a color difference prediction mode IntraPredModeC as a prediction parameter for color difference. The luminance prediction mode IntraPredModeY includes 35 modes, which correspond to planar prediction (0), DC prediction (1), and angular predictions (2 to 34). The color difference prediction mode IntraPredModeC uses any of the planar prediction (0), the DC prediction (1), the angular predictions (2 to 34), and LM mode (35). The intra-prediction parameter decoding unit 304 decodes a flag indicating whether or not IntraPredModeC is the same mode as the luminance mode, may assign IntraPredModeC equal to IntraPredModeY in a case that the flag indicates the same mode as the luminance mode, and may decode the planar prediction (0), the DC prediction (1), the angular predictions (2 to 34), and the LM mode (35) as I IntraPredModeC in a case that the flag indicates a mode different from the luminance mode.

The reference picture memory 306 stores a block (reference picture block) of the reference pictures generated by the addition unit 312 in a predefined location for each decoding target picture and block.

The prediction parameter memory 307 stores the prediction parameters in a predefined location for each decoding target picture and block. To be more specific, the prediction parameter memory 307 stores the inter-prediction parameter decoded by the inter-prediction parameter decoding unit 303, the intra-prediction parameter decoded by the intra-prediction parameter decoding unit 304, and the prediction mode predMode demultiplexed by the entropy decoding unit 301. Examples of the stored inter-prediction parameter include the prediction list utilization flag predFlagLX (inter-prediction flag inter_pred_idc), the reference picture index refIdxLX, and the motion vector mvLX.

Input to the prediction image generation unit 308 are the prediction mode predMode which is input from the entropy decoding unit 301 and the prediction parameters from the prediction parameter decoding unit 302. The prediction image generation unit 308 reads out the reference picture from the reference picture memory 306. The prediction image generation unit 308 uses the input prediction parameters and the read out reference picture to generate a prediction picture block P (prediction image) in the prediction mode indicated by the prediction mode predMode.

Here, in a case that the prediction mode predMode indicates the inter-prediction mode, the inter-prediction image generation unit 309 uses the inter-prediction parameter input from the inter-prediction parameter decoding unit 303 and the read out reference picture to generate prediction picture block P by the inter-prediction. The prediction picture block P corresponds to the prediction unit PU. The PU corresponds to a part of a picture configured with multiple pixels as a unit for the prediction processing, that is, a decoding target block on which the prediction processing is performed in one time, as described above.

The inter-prediction image generation unit 309 reads out from the reference picture memory 306 a reference picture block at a location which is indicated by the motion vector mvLX with reference to the decoding target block from the reference picture indicated by the reference picture index refIdxLX with respect to the reference picture list having the prediction list utilization flag predFlagLX of 1 (L0 list or L1 list). The inter-prediction image generation unit 309 performs prediction on the read out reference picture block to generate the prediction picture block P. The inter-prediction image generation unit 309 outputs the generated prediction picture block P to the addition unit 312.

In a case that the prediction mode predMode indicates the intra-prediction mode, the intra-prediction image generation unit 310 uses the intra-prediction parameter input from the intra-prediction parameter decoding unit 304 and the read out reference picture to perform the intra-prediction. To be more specific, the intra-prediction image generation unit 310 reads out from the reference picture memory 306 the reference picture block in a predefined range from the decoding target block in the already decoded blocks of the decoding target picture. The predefined range is, for example, any of left, upper left, upper, and upper right neighboring blocks in a case that the decoding target block sequentially moves in an order of a so-called raster scan, and depends on the intra-prediction mode. The order of the raster scan is an order of sequentially moving from a left end to a right end of each row from an upper end to a bottom end in each picture.

The intra-prediction image generation unit 310 performs prediction on the read out reference picture block in the prediction mode indicated by the intra-prediction mode IntraPredMode to generate the prediction picture block. The intra-prediction image generation unit 310 outputs the generated prediction picture block P to the addition unit 312.

In a case that the intra-prediction parameter decoding unit 304 derives the intra-prediction mode different in luminance and color difference, the intra-prediction image generation unit 310 generates a luminance prediction picture block by any of the planar prediction (0), the DC prediction (1), and the angular predictions (2 to 34) depending on the luminance prediction mode IntraPredModeY, and generates a color difference prediction picture block by any of the planar prediction (0), the DC prediction (1), the angular predictions (2 to 344), and the LM mode (35) depending on the color difference prediction mode IntraPredModeC.

The dequantization and inverse DCT unit 311 dequantizes the quantized coefficients input from the entropy decoding unit 301 to find DCT coefficients. The dequantization and inverse DCT unit 311 performs Inverse Discrete Cosine Transform (inverse DCT) on the found DCT coefficients to compute a decoded residual signal. The dequantization and inverse DCT unit 311 outputs the computed decoded residual signal to the addition unit 312 and the residual storage unit 313.

The addition unit 312 adds the prediction picture blocks P input from the inter-prediction image generation unit 309 and intra-prediction image generation unit 310 and a signal value of the decoded residual signal input from the dequantization and inverse DCT unit 311 for each pixel to generate a reference picture block. The addition unit 312 stores the generated reference picture block in the reference picture memory 306, and outputs, to outside, a decoded layer image Td in which the generated reference picture blocks are integrated for each picture.

(Configuration of Inter-Prediction Parameter Decoding Unit)

Next, a description is given of a configuration of the inter-prediction parameter decoding unit 303.

Figure 6:
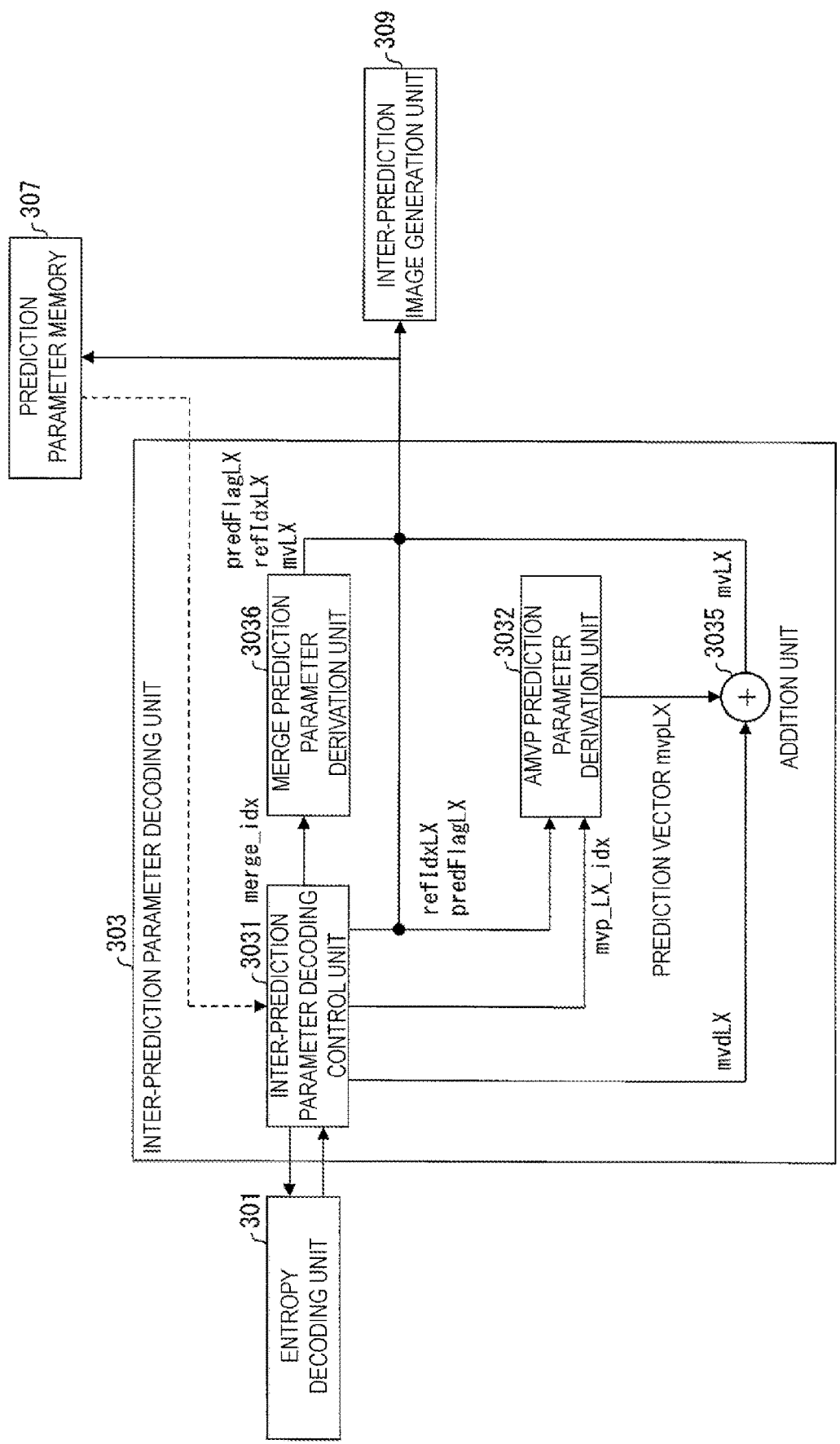
FIG. 6 is a schematic diagram illustrating a configuration of an inter-prediction parameter decoding unit according to the present embodiment.

FIG. 6 is a schematic diagram illustrating a configuration of the inter-prediction parameter decoding unit 303 according to the present embodiment. The inter-prediction parameter decoding unit 303 is configured to include an inter-prediction parameter decoding control unit 3031, an AMVP prediction parameter derivation unit 3032, an addition unit 3035, and a merge prediction parameter derivation unit 3036.

The inter-prediction parameter decoding control unit 3031 instructs the entropy decoding unit 301 to decode the code (syntax element) associated with the inter-prediction to extract the code (syntax element) included in the coded data, for example, the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

The inter-prediction parameter decoding control unit 3031 first extracts the merge flag. An expression that the inter-prediction parameter decoding control unit 3031 extracts a certain syntax element means instructing the entropy decoding unit 301 to decode a code of a certain syntax element to read the syntax element from the coded data. Here, in a case that the merge flag indicates a value of 1, that is, the merge prediction mode, the inter-prediction parameter decoding control unit 3031 extracts the merge index merge_idx as a prediction parameter related to the merge prediction. The inter-prediction parameter decoding control unit 3031 outputs the extracted merge index merge_idx to the merge prediction parameter derivation unit 3036.

In a case that the merge flag merge_flag is 0, that is, indicates the AMVP prediction mode, the inter-prediction parameter decoding control unit 3031 uses the entropy decoding unit 301 to extract the AMVP prediction parameter from the coded data. Examples of the AMVP prediction parameter include the inter-prediction flag inter_pred_idc, the reference picture index refIdxLX, the prediction vector index mvp_LX_idx, and the difference vector mvdLX. The inter-prediction parameter decoding control unit 3031 outputs the prediction list utilization flag predFlagLX derived from the extracted inter-prediction flag inter_pred_idc and the reference picture index refIdxLX to the AMVP prediction parameter derivation unit 3032 and the prediction image generation unit 308 (FIG. 5), and stores the predFlagLX and refIdxLX in the prediction parameter memory 307 (FIG. 5). The inter-prediction parameter decoding control unit 3031 outputs the extracted prediction vector index mvp_LX_idx to the AMVP prediction parameter derivation unit 3032. The inter-prediction parameter decoding control unit 3031 outputs the extracted difference vector mvdLX to the addition unit 3035.

Figure 7:
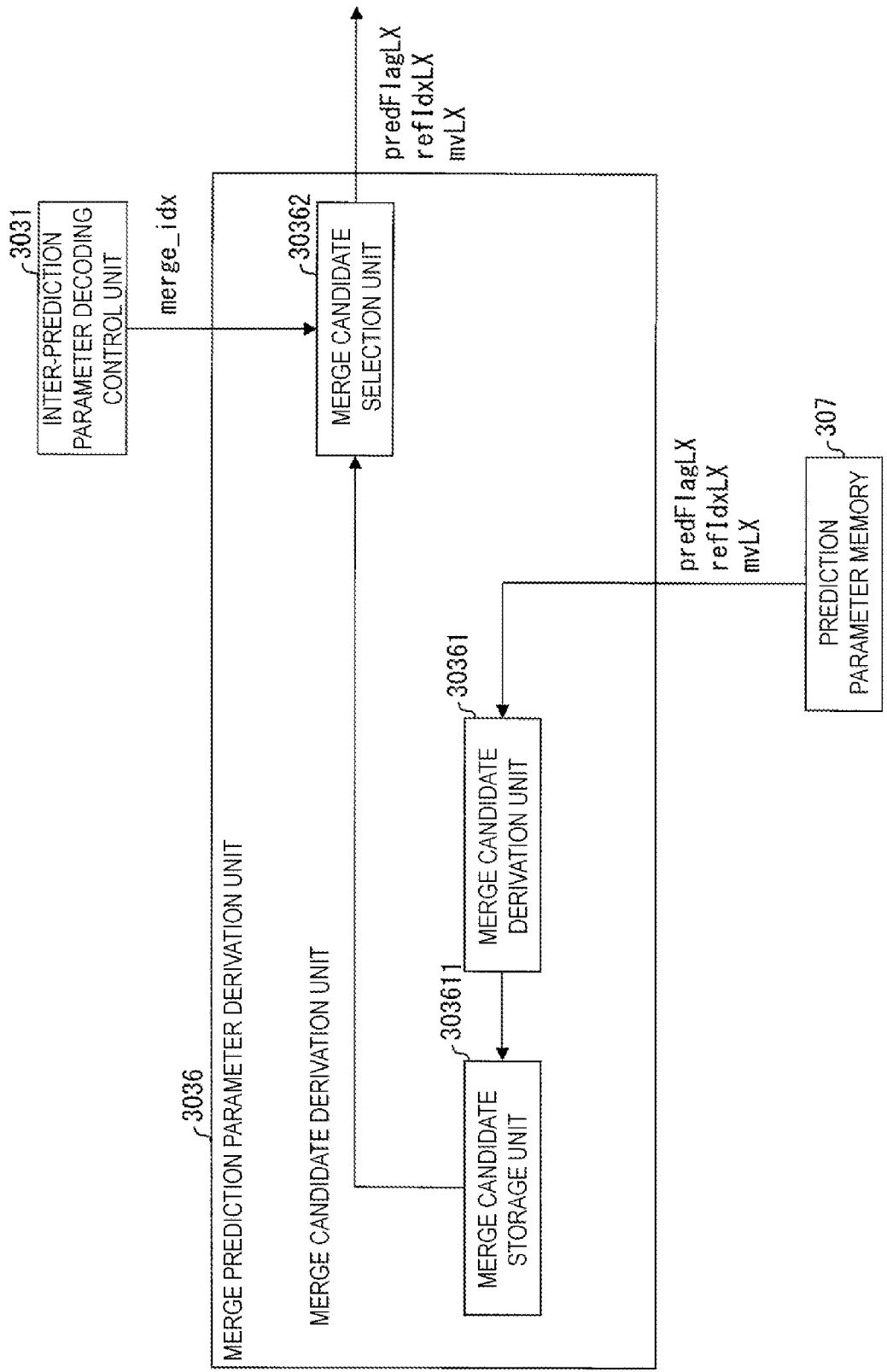
FIG. 7 is a schematic diagram illustrating a configuration of a merge prediction parameter derivation unit according to the present embodiment.

FIG. 7 is a schematic diagram illustrating a configuration of the merge prediction parameter derivation unit 3036 according to the present embodiment. The merge prediction parameter derivation unit 3036 includes a merge candidate derivation unit 30361 and a merge candidate selection unit 30362. The merge candidate storage unit 303611 stores therein merge candidates input from the merge candidate derivation unit 30361. The merge candidate is configured to include the prediction list utilization flag predFlagLX, the motion vector mvLX, and the reference picture index refIdxLX. The merge candidate stored in the merge candidate storage unit 303611 is assigned with an index according to a prescribed rule.

The merge candidate derivation unit 30361 uses, without change, a motion vector and reference picture index refIdxLX of a neighboring block on which the decode processing has been already applied to derive the merge candidates. Affine prediction may be used as another way to derive the merge candidates. This method is described below in detail. The merge candidate derivation unit 30361 may use the affine prediction for spatial merge candidate derivation processing, temporal merging (inter-frame merge) candidate derivation processing, combined merge candidate derivation processing, and zero merge candidate derivation processing which are described below. The affine prediction is performed in units of sub-blocks, and the prediction parameter is stored in the prediction parameter memory 307 for each sub-block. Alternatively, the affine prediction may be performed in units of pixels.

(Spatial Merge Candidate Derivation Processing)

In the spatial merge candidate derivation processing, the merge candidate derivation unit 30361 reads out the prediction parameters (prediction list utilization flag predFlagLX, motion vector mvLX, reference picture index refIdxLX) stored by the prediction parameter memory 307 according to a prescribed rule to derive the read out prediction parameters as merge candidates.

The read out prediction parameters are prediction parameters related to each of blocks in a predefined range from the decoding target block (e.g., all or some of blocks in contact with a lower left end, upper left end, and upper right end of the decoding target block). The merge candidates derived by the merge candidate derivation unit 30361 are stored in the merge candidate storage unit 303611.

(Temporal Merge Candidate Derivation Processing)

In the temporal merging derivation processing, the merge candidate derivation unit 30361 reads out, as merge candidates, prediction parameters for a block in a reference image including coordinates on the lower right of the decoding target block from the prediction parameter memory 307. As a method of specifying the reference image, the reference picture index refIdxLX specified in the slice header may be used, or a minimum one of the reference picture indices refIdxLX of the block neighboring to the decoding target block may be used, for example. The merge candidates derived by the merge candidate derivation unit 30361 are stored in the merge candidate storage unit 303611.

(Combined Merge Candidate Derivation Processing)

In the combined merging derivation processing, the merge candidate derivation unit 30361 uses vectors and reference picture indices of two different derived merge candidates which are already derived and stored in the merge candidate storage unit 303611 as vectors for L0 and L1, respectively, to combine, and thus derives a combined merge candidate. The merge candidate derived by the merge candidate derivation unit 30361 is stored in the merge candidate storage unit 303611.

(Zero Merge Candidate Derivation Processing)

In the zero merge candidate derivation processing, the merge candidate derivation unit 30361 derives a merge candidate including a reference picture index refIdxLX of 0 and both an X component and Y component of 0 of a motion vector mvLX. The merge candidate derived by the merge candidate derivation unit 30361 is stored in the merge candidate storage unit 303611.

The merge candidate selection unit 30362 selects, as an inter-prediction parameter for the target PU, a merge candidate assigned with an index corresponding to the merge index merge_idx input from the inter-prediction parameter decoding control unit 3031, among the merge candidates stored in the merge candidate storage unit 303611. The merge candidate selection unit 30362 stores the selected merge candidate in the prediction parameter memory 307 and outputs the candidate to the prediction image generation unit 308 (FIG. 5).

Figure 8:
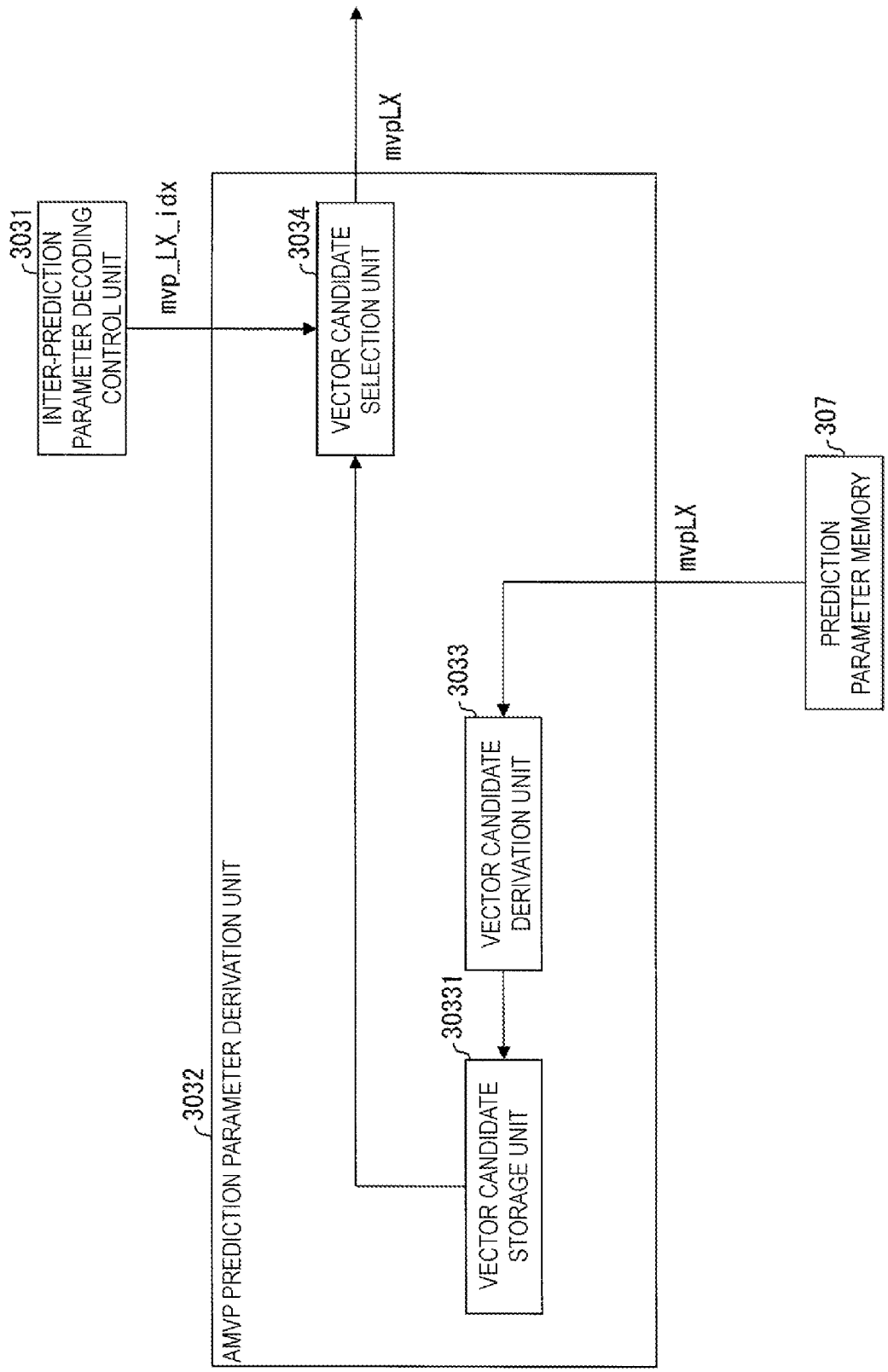
FIG. 8 is a schematic diagram illustrating a configuration of an AMVP prediction parameter derivation unit according to the present embodiment.

FIG. 8 is a schematic diagram illustrating a configuration of the AMVP prediction parameter derivation unit 3032 according to the present embodiment. The AMVP prediction parameter derivation unit 3032 includes a vector candidate derivation unit 3033 (vector compute unit) and a vector candidate selection unit 3034. The vector candidate derivation unit 3033 reads out the vector (motion vector or displacement vector) stored in the prediction parameter memory 307 as a prediction vector mvpLX, based on the reference picture index refIdx. The read out vector is a vector related to each of blocks in a predefined range from the decoding target block (e.g., all or some of blocks in contact with a lower left end, upper left end, and upper right end of the decoding target block).

The vector candidate selection unit 3034 selects, as a prediction vector mvpLX, a vector candidate indicated by the prediction vector index mvp_LX_idx input from the inter-prediction parameter decoding control unit 3031, among the vector candidates read out by the vector candidate derivation unit 3033. The vector candidate selection unit 3034 outputs the selected prediction vector mvpLX to the addition unit 3035.

The AMVP prediction parameter derivation unit 3032 includes the vector candidate derivation unit 3033 and the vector candidate selection unit 3034. A vector candidate storage 30331 stores therein the vector candidate input from the vector candidates derivation unit 3033. The vector candidates are configured to include the prediction vector mvpLX. The vector candidates stored in the vector candidate storage unit 30331 is assigned with an index according to a prescribed rule.

The vector candidate derivation unit 3033 uses the affine prediction to derive the vector candidates. The vector candidate derivation unit 3033 may use the affine prediction for spatial vector candidate derivation processing, temporal vector (inter-frame vector) candidate derivation processing, combined vector candidate derivation processing, and zero vector candidate derivation processing which are described below. The affine prediction is performed in units of sub-blocks, and the prediction parameter is stored in the prediction parameter memory 307 for each sub-block. Alternatively, the affine prediction may be performed in units of pixels.

Figure 9:
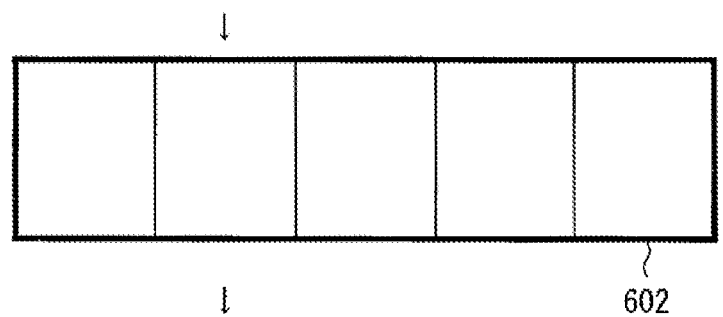
FIG. 9 is a conceptual diagram illustrating an example of vector candidates.

FIG. 9 is a conceptual diagram illustrating an example of the vector candidates. A prediction vector list 602 illustrated in FIG. 9 is a list constituted by multiple vector candidates derived by the vector candidate derivation unit 3033. In the prediction vector list 602, each of five rectangles horizontally aligned represents a region indicating a prediction vector. A downward arrow immediately under "mvp_LX_idx" located at the second rectangle from the left end, and mvpLX under the arrow indicate that the prediction vector index mvp_LX_idx is an index referring to the vector mvpLX in the prediction parameter memory 307.

The vector candidates are generated based on vectors related to blocks referred to by the vector candidate selection unit 3034. Each block referred to by the vector candidate selection unit 3034 may be a block on which the decode processing is completed, the block being in a predefined range from the decoding target block (e.g., neighboring block). The neighboring block includes a block spatially neighboring to the decoding target block such as a left block and an upper block, and a block temporally neighboring to the decoding target block such a block which is the same in a location as the decoding target block but different in a display time.

The addition unit 3035 adds the prediction vector mvpLX input from the AMVP prediction parameter derivation unit 3032 and the difference vector mvdLX input from the inter-prediction parameter decoding control unit 3031 to derive a motion vector mvLX. The addition unit 3035 outputs the computed motion vector mvLX to the prediction image generation unit 308 (FIG. 5).

Figure 10:
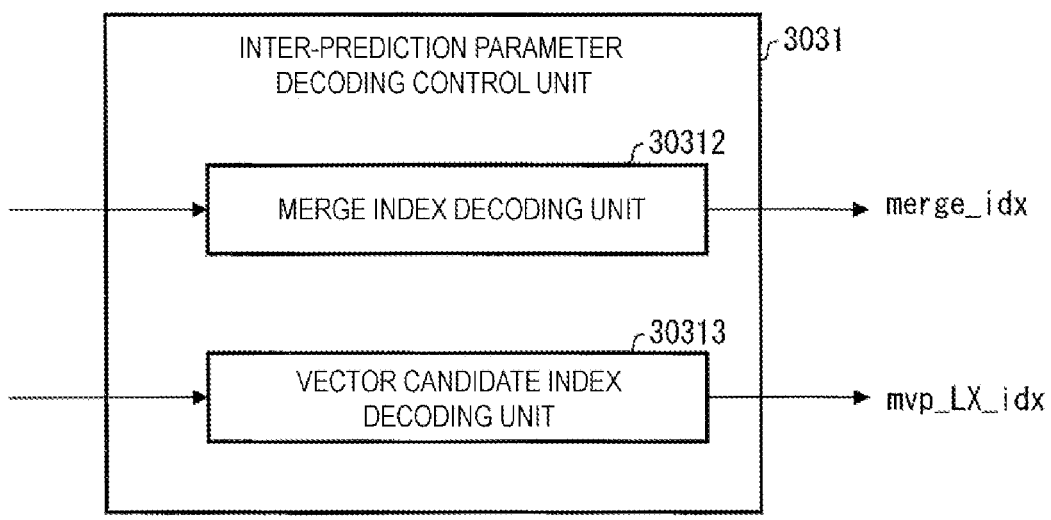
FIG. 10 is a schematic diagram illustrating a configuration of an inter-prediction parameter decoding control unit according to the present embodiment.

FIG. 10 is a schematic diagram illustrating a configuration of the inter-prediction parameter decoding control unit 3031 according to the present embodiment. The inter-prediction parameter decoding control unit 3031 is configured to include an addition prediction flag decoding unit 30311, a merge index decoding unit 30312, a vector candidate index decoding unit 30313, and a not illustrated partition mode decoding unit, merge flag decoding unit, inter-prediction flag decoding unit, reference picture index decoding unit, vector difference decoding unit, and the like. The partition mode decoding unit, the merge flag decoding unit, the merge index decoding unit, the inter-prediction flag decoding unit, the reference picture index decoding unit, the vector candidate index decoding unit 30313, and the vector difference decoding unit decode respectively the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

(Inter-Prediction Image Generation Unit 309)

Figure 11:
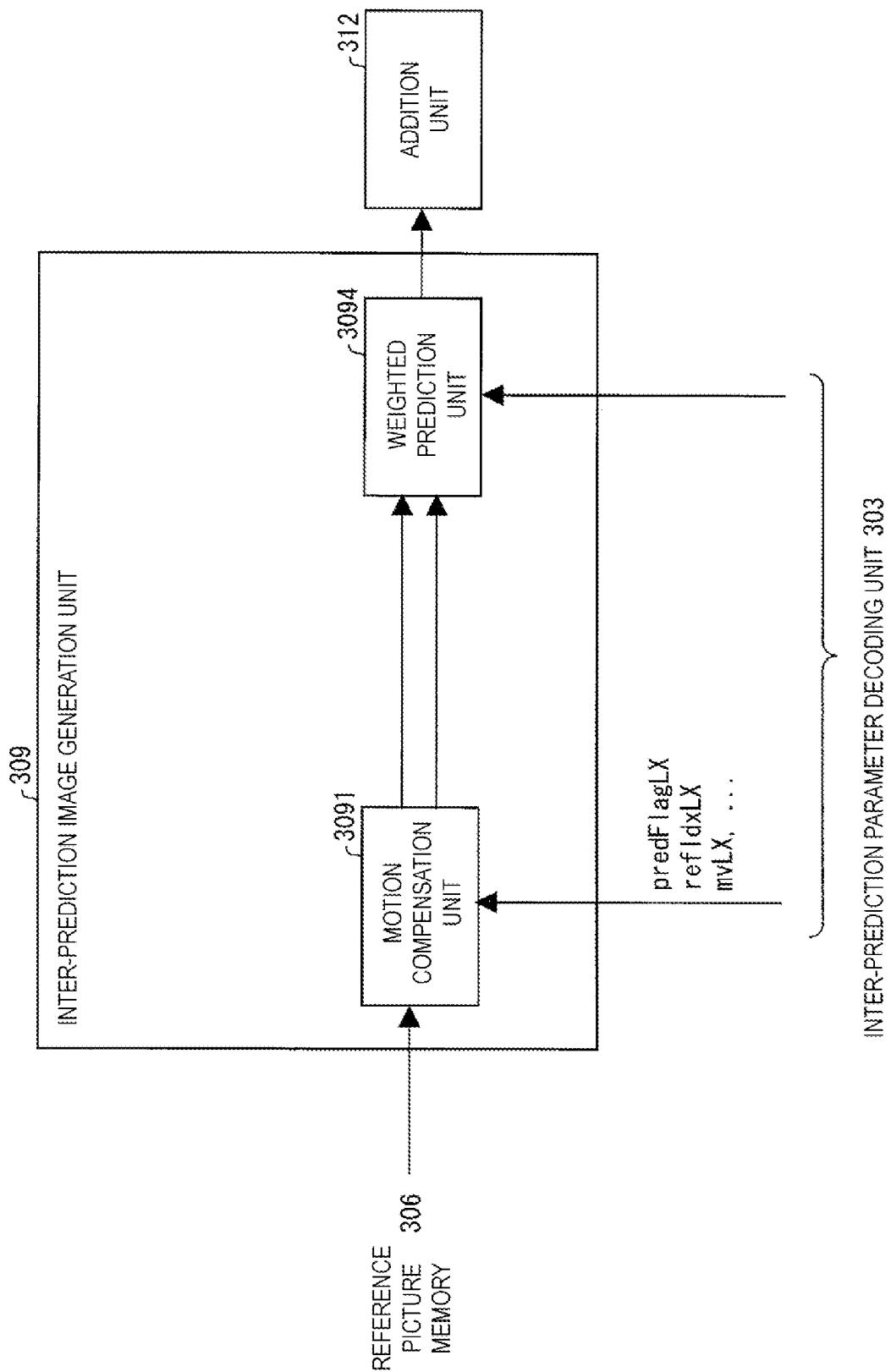
FIG. 11 is a schematic diagram illustrating a configuration of an inter-prediction image generation unit according to the present embodiment.

FIG. 11 is a schematic diagram illustrating a configuration of the inter-prediction image generation unit 309 according to the present embodiment. The inter-prediction image generation unit 309 is configured to include a motion compensation unit 3091 (prediction image generation device) and a weighted prediction unit 3094.

(Motion Compensation Unit)

The motion compensation unit 3091 reads out from the reference picture memory 306 a block which is displaced by a motion vector mvLX from a starting point as a location of the decoding target block for the reference picture specified by the reference picture index refIdxLX, based on the prediction list utilization flag predFlagLX, reference picture index refIdxLX, and motion vector mvLX that are input from the inter-prediction parameter decoding unit 303 to generate a motion compensation image. Here, in a case that the motion vector mvLX is not an integer vector, a motion compensation image is generated by filtering called a motion compensation filter for generating a pixel at decimal position. The motion compensation filter includes a vertical motion compensation filter mcFilterVer and a horizontal motion compensation filter mcFilterHor. Hereinafter, an L0 prediction motion compensation image is called predSamplesL0 and an L1 prediction motion compensation image is called predSamplesL1. These images are called predSamplesLX when not distinguished. Note that a configuration example of the motion compensation unit 3091 will be described below.

(Weighted Prediction)

The weighted prediction unit 3094 multiplies an input motion disparity image predSamplesLX by weight coefficients to generate a prediction picture block P (prediction image). In a case that one of reference list utilization flags (predFlagL0 or predFlagL1) is 1 (that is, in a case of the uni-prediction) and the weighted prediction is not used, processing by the following equation is performed to conform the input motion disparity image predSamplesLX (LX is L0 or L1) to the number of pixel bits.

$$predSamples[x][y]=Clip3(0,(1<<bitDepth)-1,(predSamplesLX[x][y]+offset1)>>shift1)$$

where shift1=14−bitDepth, offset1=1<<(shift1−1).

In a case that both of the reference list utilization flags (predFlagL0 and predFlagL1) are 1 (that is, in a case of the bi-prediction) and the weighted prediction is not used, processing by the following equation is performed to average the input motion disparity images predSamplesL0 and predSamplesL1 to be conformed to the number of pixel bits.

$$predSamples[x][y]=Clip3(0,(1<<bitDepth)-1,(predSamplesL0[x][y]+predSamplesL1[x][y]+offset2)>>shift2)$$

where shift2=15−bitDepth, offset2=1<<(shift2−1).

Furthermore, in a case of the uni-prediction and that the weighted prediction is performed, the weighted prediction unit 3094 derives a weighted prediction coefficient w0 and an offset o0 from the coded data and performs processing by the following equation.

$$predSamples[x][y]=Clip3(0,(1<<bitDepth)-1,((predSamplesLX[x][y]*w0+2 \log 2WD-1)>>\log 2WD)+o0)$$

where log 2WD represents a variable indicating a prescribed shift amount.

Further, in a case of the bi-prediction and that the weighted prediction is performed, the weighted prediction unit 3094 derives weighted prediction coefficients w0, w1, o0, and o1 from the coded data and performs processing by the following equation.

$$predSamples[x][y]=Clip3(0,(1<<bitDepth)-1,(predSamplesL0[x][y]*w0+predSamplesL1[x][y]*w1+((o0+o1+1)<<\log 2WD))>>(\log 2WD+1))$$

(Switching of Prediction Mode in Motion Compensation Unit with Gradient Change Prediction)

Figure 16:
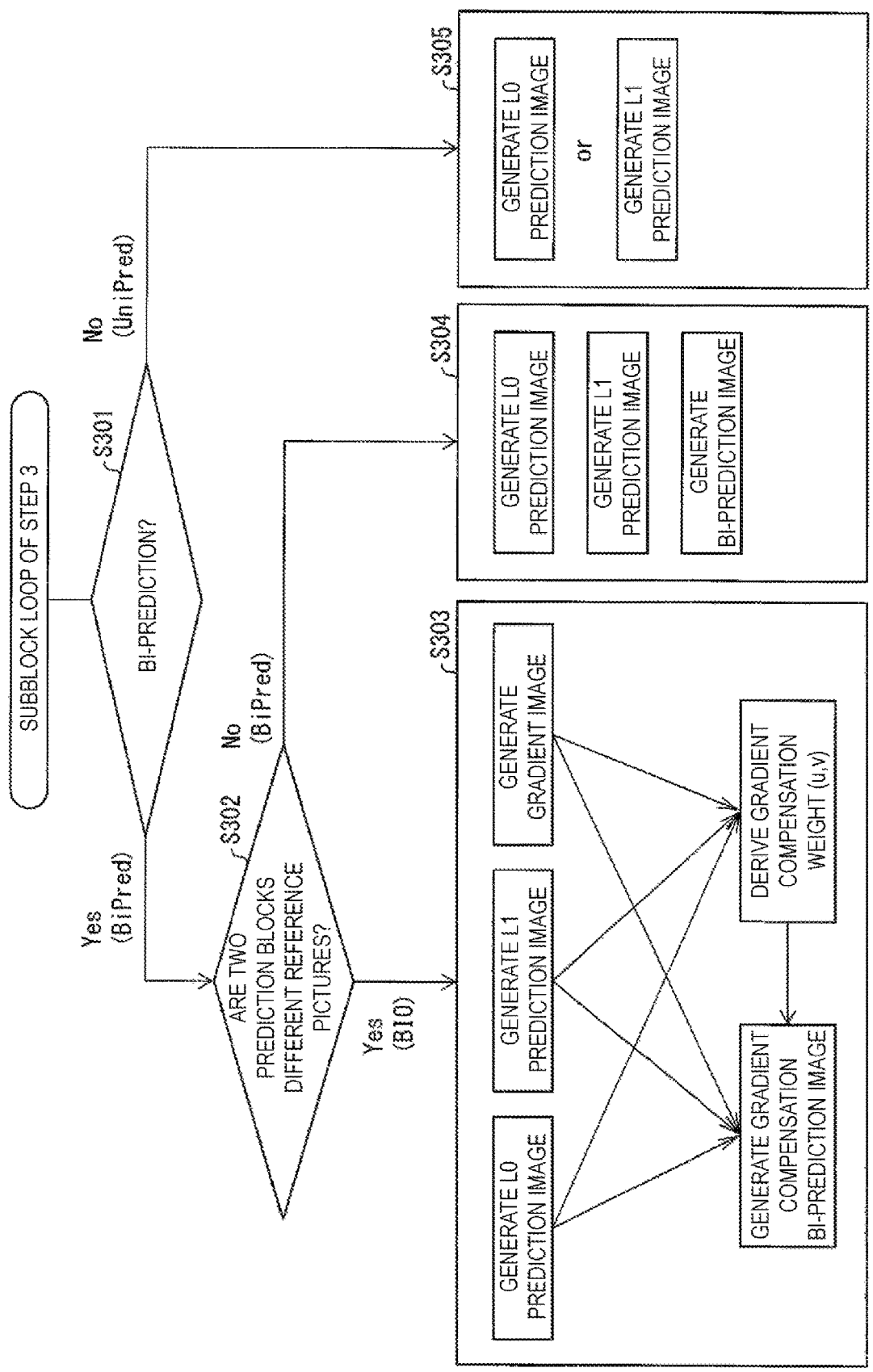
FIG. 16 is a flowchart for describing a flow of processing in which a motion compensation unit 3091 having a motion compensation function using a BIO prediction derives a prediction picture.

FIG. 16 is a flowchart for describing the flow of processing in which the motion compensation unit 3091 having a motion compensation function using a gradient change (BIO) prediction derives a prediction picture. FIG. 16 illustrates the flow of the processing in which the inter-prediction parameter decoding unit 303 determines whether the motion compensation unit 3091 applies the BIO prediction to derive a prediction picture in STEP 3 described below.

In a case that the inter-prediction parameter decoding unit 303 determines not being in the bi-prediction mode (No at S301, i.e., in uni-prediction UniPred), the processing advances to S305 and the motion compensation unit 3091 performs a uni-direction motion compensation. In a case that the inter-prediction parameter decoding unit 303 determines, on the other hand, being in the bi-prediction mode (Yes at S301, BiPred), the inter-prediction parameter decoding unit 303 then performs determination illustrated in S302.

For an L0 reference image refImgL0 and an L1 reference image refImgL1 acquired from the picture memory 306 (in FIG. 16, described as "two prediction blocks") are different reference images from each other (Yes at S302), the processing advances to S303 and the motion compensation unit 3091 performs the motion compensation using the BIO prediction described below. On the other hand, for the L0 reference image refImgL0 and the L1 reference image refImgL1 acquired from the picture memory 306 are the same reference image (No at S302), the processing advances to S304 and the motion compensation unit 3091 performs a bidirectional motion compensation not applying the BIO prediction.

(Basic Concept of Gradient Change)

The gradient change (Optical Flow) will be described below with reference to FIGS. 17A to 17E. FIGS. 17A to 17E are drawings illustrating an example of the flow in which the concept of gradient change is derived.

Assume that a pixel value I (x, y, t) does not change even in a case that the pixel value I (x, y, t) moves only Δx and Δy in a time interval Δt, in other words, only the position of the pixel changes while the pixel value does not change, Equation 1 in FIG. 17A is satisfied.

Change of the pixel value in a certain point can be decomposed into gradient change and time change as expressed by Equation 2 in FIG. 17B. Here, the gradient change can be expressed as the sum of the partial differentiation of the pixel value I in the x direction and the partial differentiation of the pixel value I in the y direction, and the time change can be expressed as the partial differentiation of the pixel value I in the t direction.

Equation 3 in FIG. 17C is derived from the above-described Equations 1 and 2. Furthermore, Equation 4 in FIG. 17D is derived by dividing both sides of Equation 3 by the time interval $\Delta t$.

Here, assume that change ($\Delta x/\Delta t$) of the position in the x direction (e.g., horizontal direction) per time and change ($\Delta y/\Delta t$) of the position in the y direction (e.g., vertical direction) per time are denoted by Vx and Vy, respectively, Equation 4 of FIG. 17D can be expressed as an equation in the Equation 5.

Equation 5 means that, in a case of assuming that only the position changes without changing the pixel value, a value obtained by adding a result of multiplication of a change amount of the pixel value I in the x direction by Vx, a result of multiplication of a change amount of the pixel value I in the y direction by Vy, and a time change amount of the pixel value I is always zero. That is, under the assumption that a pixel value does not change, a relationship is established in which gradient change and time change are canceled (balanced). The equation of gradient change indicates that the time change of the pixel value I can be predicted by the products of the change amount of the pixel value I in the x direction and the change Vx (=$\Delta x/\Delta t$) of the position, and the change amount of the pixel value I in the y direction and the change Vy (=$\Delta x/\Delta t$) of the position. In the following description for processing, the change amount of the pixel value I in the x direction is referred to as horizontal gradient values lx0 and lx1, the change amount of the pixel value I in the y direction is referred to as vertical gradient values ly0 and ly1, and the change of position (Vx, Vy) is referred to as a correction vector (u, v).

(Bio Prediction)

Here, the motion compensation using the BIO prediction will be described with reference to drawings from FIG. 15 to FIG. 20B. The motion compensation unit 3091 includes a mode for performing the motion compensation by an applied Bi-directional optical flow (bi-prediction gradient change: BIO) prediction that applies a gradient correction term to the bi-prediction (BiPred) to perform the motion correction.

Specifically, the motion compensation unit 3091 derives each pixel value Pred of a prediction image (target image to be predicted) by using the following prediction equation:

Pred={(P0+P1)+shiftOffset}>>shiftPred    (Equation A1).

Note that, P0 is a pixel value of a motion compensation image P0, and P1 is a pixel value of a motion compensation image P1. shiftOffset is a constant value for performing round control at the time of the shift, and shiftPred is a shift value.

Furthermore, the motion compensation unit 3091 derives the pixel values Pred of the prediction image by using the following prediction equation:

Pred={(P0+P1)+modBIO+shiftOffset}=>>shiftPred    (Equation A2).

Note that modBIO the gradient correction term derived by modBIO={((lx0−lx1)*u+(ly0−ly1)*v)>>1}<<shift-Pred    (Equation A3).

In Equation A3, each of lx0 (first gradient image), ly0 (second gradient image), lx1 (third gradient image), and ly1 (fourth gradient image) is a gradient image. Each of the gradient images lx0 and lx1 indicates the gradient along the horizontal direction (x-direction, first direction), and each of the gradient, images ly0 and ly1 indicates the gradient along the vertical direction (y-direction, second direction). Moreover, u and v are weight coefficients that are multiplied by the pixel values of lx0 and lx1, and ly0 and ly1, respectively.

(Outline of Processing of BIO Prediction)

Figure 15:
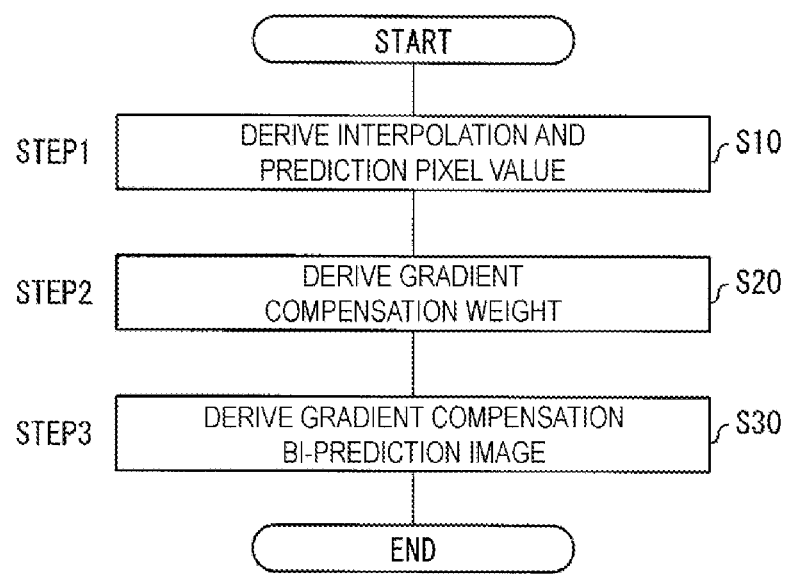
FIG. 15 is a flowchart illustrating a prediction mode switching example in the image decoding device with motion compensation using BIO prediction.

First, a flow of processing will be described with reference to FIG. 15, in which the motion compensation unit 3091 generates a prediction image (inter-prediction image) with reference to the motion compensation image P0 (first reference image), the motion compensation image P1 (second reference image), and the gradient correction term. FIG. 15 is a flowchart illustrating the flow of processing in the motion compensation using the BIO prediction.

As illustrated in FIG. 15, in the motion compensation using the BIO prediction, the motion compensation unit 3091 performs following three processes STEPs 1 to 3 to derive the prediction image.

STEP 1: Interpolation/Derive Prediction Pixel Value

The motion compensation images P0 and P1, and the gradient images lx0, lx1, ly0, and ly1 are derived. The motion compensation unit 3091 generates the motion compensation image P0, based on the L0 reference image refImgL0 (first reference image), and generates the motion compensation image P1, based on the L reference image refImgL1 (second reference image). Furthermore, the motion compensation unit 3091 derives an L0 horizontal gradient image lx0 and an L0 vertical gradient image ly0, based on the L0 reference image refImgL0 (first reference image), and derives an L1 vertical gradient image lx1 and an L1 vertical gradient image ly1, based on the L1 reference image refImgL1. Note that refImgL0, refImgL1, P0, P1, lx0, lx1, ly0, and ly1 may indicate the reference images refImgL01 [x][y] and refImgL1 [x][y] that are two-dimensional information, and the motion compensation images P0[x][y] and P1[x][y], and the gradient images lx0[x][y], lx1 [x][y], ly0[x][y], and ly1 [x][y] (x and y are integers in prescribed ranges), respectively, and may indicate the reference image values refImgL0 and refImgL1, the motion compensation image values P0 and P1, and the gradient values lx0, lx1, ly0, and ly1, respectively.

STEP 2: Derive Gradient Correction Weight

Next, the motion compensation unit 3091 derives a correction weight vector (Vx, Vy) (in the following, also expressed as (Vx, Vy) under the assumption of Vx=u and Vy=v). The motion compensation unit 3091 may derive the correction weight vector (Vx, Vy) by using Equation 5 in FIG. 17E, and may derive the correction weight vector by using a least-squares method as described below.

In a case of deriving the correction weight vector (Vx, Vy) by using Equation 5 in FIG. 17E, the motion compensation unit 3091 is only necessary to derive Vx and Vy that fulfill a condition of minimizing a square of the left side of Equation 5 in FIG. 17E, by using the gradient changes dI/dx (i.e., lx) and dI/dy (i.e., ly), and the time changes dI/dt in multiple points.

Figure 18:
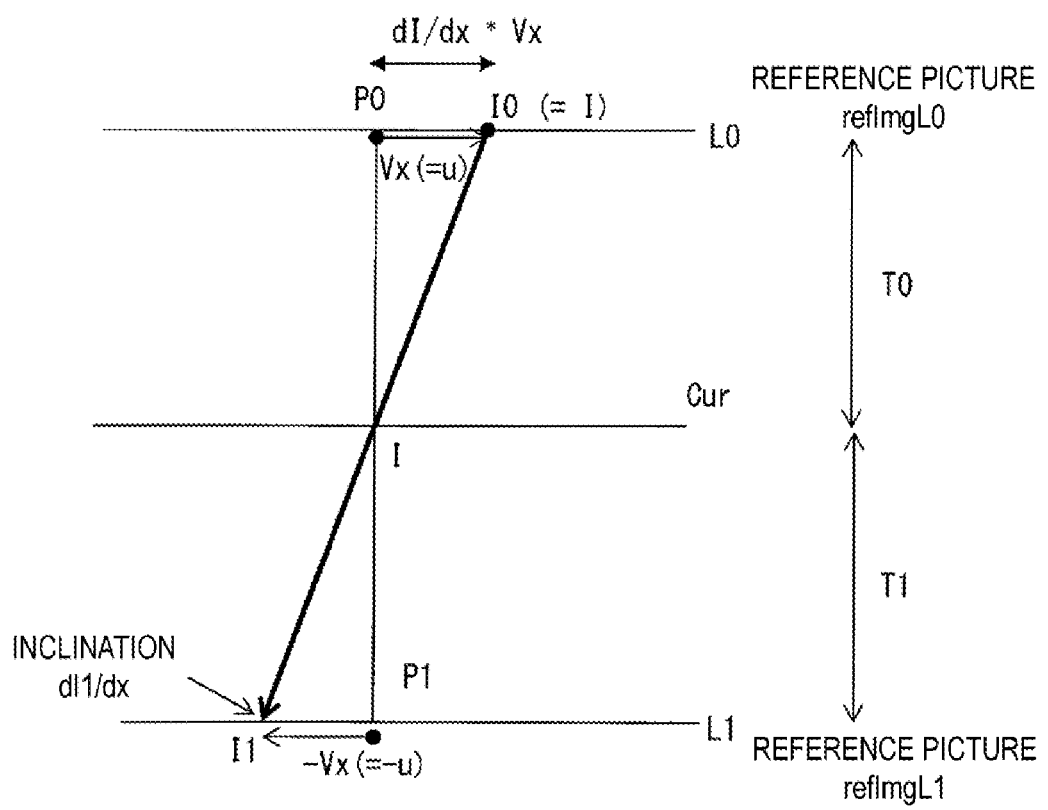
FIG. 18 is a drawing for describing a method of deriving a correction weight vector depending on a target image and a reference image.

As illustrated in FIG. 18, the pixel value I of the point I on the target image Cur, the pixel value I0 of the point I0 (lx0, ly0) on the L0 reference image refImgL0, and the pixel value I1 of the point I1 (lx1, ly1) on the L1 reference image refImgL1 correspond to one another. Note that only x component of the point I0 and x component of the point I1 are illustrated in FIG. 18, but the same can apply to y component of the point I0 and y component of the point I1. In a case that assumption of gradient change (only a position changes without changing a pixel value) is satisfied in a target domain, the following equation is satisfied: I=I0=I1.

When paying an attention to the gradient that is an amount of change of a spatial pixel value, the pixel value I0 of a certain point on the L0 reference image refImgL0 can be predicted by using a pixel value P0, the gradient on P0, and a distance between I0 and P0, and from the equation; I0=P0+gradient×distance. Here, the gradient is expressed as (Ix0, Iy0), and the distance between I0 and P0 is expressed (Vx, Vy). Similarly, the pixel value I1 of a certain point on the L0 reference image refImgL0 can be derived by using the pixel value P1 of another point, the gradient on P1, and a distance between I1 and P1, and from the equation: I1=P0+gradient (Ix1, Iy1)*distance (−Vx, −Vy). Furthermore, for the pixel value of a subject point I in the target image Cur, a prediction value can be accurately derived from the average value or the weighted average value of the derived pixel value I0 and pixel value I1. From assumption that the pixel value I0 is equal to the pixel value I1, deriving a parameter (Vx, Vy) minimizing the difference between I0 and I1 allows the derivation of distance (Vx, Vy)=correction weight vector (u, v).

More specifically, the pixel value I0 of the point I0 (Ix0, Iy0) on the L0 reference image refImgL0 can be obtained by using the pixel value P0 of a certain motion compensation image P0 on the L0 reference image refImgL0, the pixel values Ix0 and Iy0 of the gradient image, and the correction weight vector (u, v) (u corresponds to Vx in FIG. 18, and v corresponds to Vy not illustrated), and from the following equation:

$$I0=P0+\{Ix0*u+Iy0*v\} \quad \text{(Equation A4)}.$$

Similarly, the pixel value I1 of the point I1 (Ix1, Iy1) on the L1 reference image refImgL1 can be obtained by using the pixel value P1 of a certain motion compensation image P1 on the L1 reference image refImgL1, the pixel values Ix1 and Iy1 of the gradient image, and the correction weight vector (u, v), and from the following equation:

$$I1=P1-\{Ix1*u+Iy1*v\} \quad \text{(Equation A5)}.$$

The motion compensation unit 3091 predicts the pixel value I of the point I on the target image Cur that is an image to be predicted, as the average of the pixel value I0 of the point I0 on the L0 reference image refImgL0 and the pixel value I1 of the point I1 on the L1 reference image refImgL1;

$$I = (I0 + I1) \gg 1 \quad \text{(Equation A6)}$$
$$= \{P0 + P1 + (Ix0 - Ix1)*u + (Iy0 - Iy1)*v\} \gg 1$$

(which correspond to Equation 1 in FIG. 17A). Here, the x component u and the y component v of the correction weight vector which are unknown values can be derived as follows under assumption that the pixel value does not change.

To derive the correction weight vector (u, v), the motion compensation unit 3091 derives u and v which minimize the value obtained from the following equation, under assumption that the pixel value I0 of the point I0 on the L0 reference image refImgL0 and the pixel value I1 of the point I1 on the L1 reference image refImgL1 do not change:

$$\Sigma|I0-I1|^2=\Sigma|(P0-P1)+(Ix0+Ix1)*u+(Iy0+Iy1)*v|^2 \quad \text{(Equation A7)}$$

Here, Σ corresponds to an operation calculating P0, P1, Ix0, Iy0, Iy0, and Iy1 for the target pixel (x, y) and points (x+dx, y+dy) (e.g., dx=−2 . . . 2, dy=−2 . . . 2) around the target pixel, and then adding such calculated values. Assume that (P0−P1)=t1 (Ix0+Ix1)=t2, and (Iy0+Iy1)=t3 for Equation A7, u and v minimizing the value obtained by Equation A7 also give the minimum value of the values obtained by the following equation:

$$\Sigma|I0-I1|^2=\Sigma|t1+t2*u+t3*v|^2 \quad \text{(Equation A8)}.$$

STEP 3: Derive a Gradient Correction Bi-Prediction Image

Next, the motion compensation unit 3091 substitutes for Equation A3 the correction weight vector (u, v) derived in STEP 2 to derive the gradient correction term modBIO, and derives the pixel value Pred of the prediction image by using the following equation;

$$\text{Pred}=P0+P1+\{(Ix0-Ix1)*u+(Iy0-Iy1)*v\}\gg 1 \quad \text{(Equation A9)}.$$

Note that the gradient correction term modBIO may be weakened to one half, and the following equation may be used:

$$\text{Pred}=(P0+P1+\{(Ix0-Ix1)*u+(Iy0-Iy1)*v\}\gg 1)\gg 1 \quad \text{(Equation A10)}.$$

Subsequently, processing in each of above-described STEPs will be described in detail.

Here, description is given of a case in which the motion compensation unit 3091 derives (generates) the motion compensation image and the gradient image as an example, but another constitution in which the motion compensation unit 3091 derives, instead of the images, the pixel values included in the images may be applied. In other words, the motion compensation unit 3091 may derive the pixel value of the motion compensation image and the pixel value of the gradient image. That is, each STEP is an independent operation in each pixel, and thus the same result can be obtained in both cases of performing respective STEPs on image-by-image basis for a certain block, and performing respective STEPs on pixel-by-pixel basis for a certain block and repeating this process for the image of the certain block. Specifically, the processing in each STEP may derive the motion compensation images P0[ ][ ] and P1[ ][ ] corresponding to a certain prediction block, and the gradient images Ix0[ ][ ], Iy0[ ][ ], Ix1[ ][ ] and Iy1[ ][ ], and after that, derive the gradient correction term (image), and derive the prediction image Pred[ ][ ]. The processing in each STEP may derive the motion compensation pixel values P0 and P1 corresponding to a certain point, and the gradient image values Ix0, Iy0, Ix1, and Iy1, and after that, derive the gradient correction term, and perform processing for deriving the prediction pixel value Pred to each point of a certain prediction block.

Figure 21:
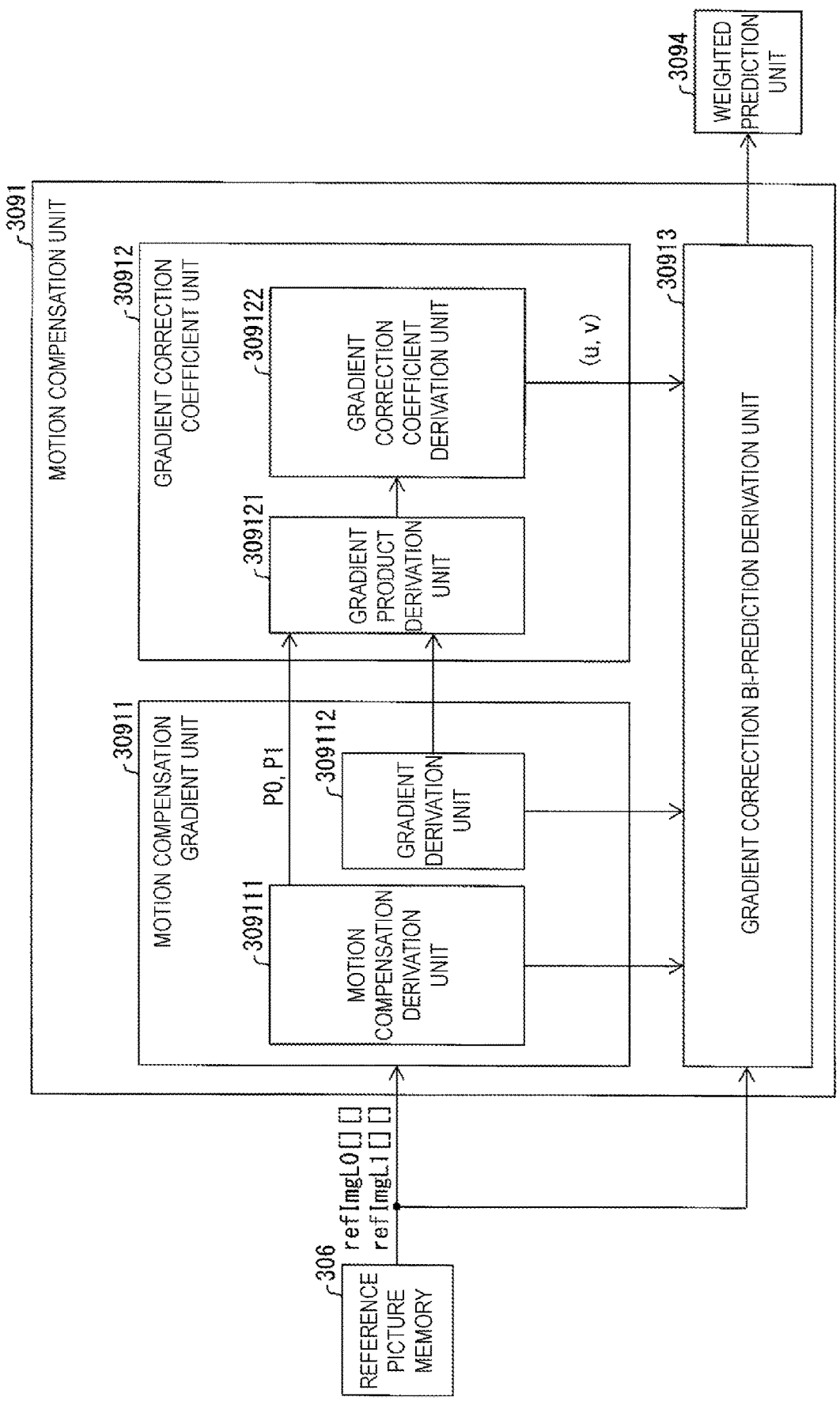
FIG. 21 is a block diagram illustrating an example of the configuration of the motion compensation unit.

Hereinafter, the details of each STEP will be described with reference to FIG. 21 illustrating the configuration of the motion compensation unit 3091.

(Details of STEP 1)

The motion compensation unit 3091 (motion compensation derivation unit 309111) derives the motion compensation images P0 and P1 (also referred to as basic motion compensation images), based on the L0 reference image refImgL0 and the L reference image refImgL1. Furthermore, the motion compensation unit 3091 (gradient derivation unit 309112) derives the horizontal gradient images Ix0 and Ix1 and the vertical gradient images Iy0 and Iy1 for the derived motion compensation images P0 and P1.

The motion compensation derivation unit 30911 applies a vertical motion compensation filter (mcFilterVer) to the reference image, and after that, applies a horizontal motion compensation filter (mcFilterHor) to the resultant reference image, to thereby derive the motion compensation images P0 and P1.

The integer position (xInt, yInt) and phase (xFrac, yFrac) of the reference image in the block coordinates (x, y) of upper left block coordinates (xPb, yPb) are as follows:

$xInt=xPb+(mvLX[0]>>2)+x$ $xFrac=mvLX[0]\&3$ $yInt=yPb+(mvLX[1]>>2)+y$ $yFrac=mvLX[1]\&3$ (Equation A11)

Here, the accuracy of motion vector is assumed to be ¼ pel accuracy, but the accuracy of motion vector is not limited to this and may be ⅛, 1/16, 1/64, or the like. In a case that the accuracy of motion vector is 1/M pel accuracy, the following equations may be used, which are obtained by using, in (Equation A11), log 2 (M) as the shift value for deriving the integer positions xInt and yInt, and M−1 as the value used for the logical sum (&) for deriving the phases xFrac and yFrac.

$xInt=xPb+(mvLX[0]>>(\log 2(M)))+x$ $xFrac=mvLX[0]\&(M-1)$ $yInt=yPb+(mvLX[1]>>(\log 2(M)))+y$ $yFrac=mvLX[1]\&(M-1)$ In a case that a bit depth of a filter factor is MC_ACCU, the bit depth of the filtered image is bitDepthY+MC_ACCU that is a value obtained by adding MC_ACCU to the bit depth bitDepthY of the reference image. To return the bit depth of the filtered image to the bit depth of the reference image, a shift to the right by only MC_ACCU is needed as a shift to the right for adjusting a dynamic range. In a case that two filters operate in series, it is suitable that a middle bit depth INTERNAL_BIT_DEPTH higher than bitDepth is used for output of a first filter operation, and in output of a second filter operation, INTERNAL_BIT_DEPTH is returned to bitDepth. In this case, shift values shift1 and shift2 for adjusting the dynamic ranges of the first and second filters may be set as follows.

shift1=bitDepth$Y$−(INTERNAL_BIT_DEPTH−MC_ACCU)

shift2=$MC$_ACCU(=6)  (Equation A12)

Here, bitDepthY denotes the bit depth of the reference image, INTERNAL_BIT_DEPTH denotes the middle bit depth, and MC_ACCU denotes the accuracy of the motion compensation filter mcFilter. Note that MC_ACCU is not limited to 6, but other values such as 3 to 10 may be used.

In x=0 . . . BLKW−1, y=0 . . . BLKW−1, k=0 . . . TAP−1, and offset1=1<<(shift1−1), the vertical motion compensation filter mcFilterVer derives a temporary image temp[ ][ ] used as intermediate data, as values in which a product sum of the coefficient mcFilter[ ][ ] of the motion compensation filter and the reference image refImg[ ][ ] is adjusted in its range of value (dynamic range) by using the shift value shift1 from the following equations:

temp[x][y]=(Σ$mc$FilterVer[yFrac][k]*refImg[xInt][yInt+k−NTAP/2+1]+offset1)>>shift1 bitDepth(temp[ ][ ])=bitDepth$Y$+$MC$_ACCU−shift1=INTERNAL_BIT_DEPTH(=14)  (Equation A13).

Here, bitDepth (temp[ ][ ]) denotes a bit depth of the temporary image temp[ ][ ]. The bit depth of the temporary image temp[ ][ ] is a value obtained by subtracting, from the sum of bit depth bitDepthY of the reference image and the accuracy MC_ACCU of the motion compensation filter, a right-shift value shift1 in the filtering. Here, this value is referred to as an intermediate bit depth INTERNAL_BIT DEPTH.

On the other hand, in x=0 . . . BLKW−1, y=0 . . . BLKW−1, k=0 . . . TAP−1, and offset2=1<<(shift2−1), the horizontal motion compensation filter mcFilterHor derives the motion compensation image PX[ ][ ] (PX is P0 or P1), as values in which a product sum of the coefficient mcFilter[ ][ ] of the motion compensation filter and the temporary image temp[ ][ ] derived by the vertical motion compensation filter mcFilterVer is adjusted in its range of value by using the shift value shift2 from the following equations:

temp[x][y]=(Σ$mc$FilterVer[yFrac][k]*refImg[xInt][yInt+k−NTAP/2+1]+offset1)>>shift1 bitDepth(temp[ ][ ])=bitDepth$Y$+$MC$_ACCU−shift1=INTERNAL_BIT_DEPTH(=14)  (Equation A14).

A motion compensation filter mcFilter[nFrac][pos] (nFrac=0 . . . 3, pos=0 . . . 7) is illustrated in FIG. 19A, as a specific example of the 8-tap motion compensation filters mcFilterVer and mcFilterHor used in this processing. NPHASES denotes the number of phases, and NTAPS denotes the number of taps. {0, 0, 0, 64, 0, 0, 0, 0} included in the motion compensation filter mcFilter[ ][ ] illustrated in FIG. 19A corresponds to nFrac=0, {−1, 4, −10, 58, 17, −5, 1, 0} corresponds to nFrac=1, {−1, 4, −11, 40, 40, −11, 4, −1} corresponds to yFrac=2, and {0, 1, −5, 17, 58, −10, 4, −1} corresponds to nFrac=3. Here, nFrac corresponds to xFrac or yFra.

Next, a case in which the gradient derivation unit 309112 derives the horizontal gradient images lx0 and lx1 will be described.

The integer position (xInt, yInt) and phase (xFrac, yFrac) of the reference image in the block coordinates (x, y) of the upper left block coordinates (xPb, yPb) are obtained by above-described Equation A11. The motion compensation unit 3091 derives the horizontal gradient images lx0 and lx1 by using above-described Equation A12.

Here, in x=0 . . . BLKW−1, y=0 . . . BLKW−1, k=0 . . . TAP−1, and offset1=1<<(shift1−1), the vertical motion compensation filter mcFilterVer derives a temporary image temp[ ][ ] by above-described Equation A13.

On the other hand, in x=0 . . . BLKW−1, y=0 . . . BLKW−1, k=0 . . . TAP−1, and offset2=1<<(shift2−1), the horizontal gradient compensation filter gradFilterHor derives the horizontal gradient image lxX[ ][ ] (lxX is lx0 or lx1), as values in which a product sum of the coefficient gradFilter[ ][ ] of the gradient filter and the temporary image temp[ ][ ] derived by the vertical motion compensation filter mcFilterVer is adjusted in its range of value by using the shift value shift2 from the following equations:

lxX[x][y]=(ΣgradFilter[xFrac][k]*temp[x+k−NTAP/2+1][y]+offset2)>>shift2 bitDepth(lxX[ ][ ])=INTERNAL_BIT DEPTH+GRAD_ACCU−shift2=INTERNAL_BIT_DEPTH  (Equation A15).

Here, bitDepth (PX[ ][ ]) denotes a bit depth of the filter-processing image temp[ ][ ]. The bit depth of the filter-processing image temp[ ][ ] is a value obtained by subtracting, from the sum of bit depth bitDepthY of the reference image and the accuracy MC_ACCU of the motion compensation filter, a right-shift value shift1 in the filtering.

Here, the bit depth of the temporary filter-processing image is referred to as an intermediate bit depth INTERNAL_BIT DEPTH. GRAD_ACCU indicates the accuracy of the gradient derivation filter gradFilter. A gradient compensation filter gradFilter [NPHASES][NTAPS] is illustrated in FIG. 19B, as a specific example of the 8-tap gradient compensation filter gradFilter configured in this way.

Next, a case in which the gradient derivation unit 309112 derives the vertical gradient images ly0 and ly1 will be described.

The gradient derivation unit 309112 applies a vertical gradient compensation filter (gradFilterVer) with reference to the L0 reference image refImgL0 and the L1 reference image refImgL1, and after that, applies the horizontal motion compensation filter (mcFilterHor), to thereby derive the vertical gradient images ly0 and ly1.

The integer position (xInt, yInt) and phase (xFrac, yFrac) of the reference image in the block coordinates (x, y) of the upper left block coordinates (xPb, yPb) are obtained by above-described Equation A11. The motion compensation unit 3091 derives the vertical gradient images ly0 and ly1 by using above-described Equation A12.

In x=0 ... BLKW−1, y=0 ... BLKW−1, i=0 ... TAP−1, and offset1=1<<(shift1−1), the vertical gradient compensation filter gradFilterVer derives a temporary image temp[ ][ ], as values in which a product sum of the coefficient mcFilter[ ][ ] of the motion compensation filter and the reference image refImg[ ][ ] is adjusted in its range of value by using the shift value shift1 from the following equations:

temp[$x$][$y$]=(ΣgradFilter[$y$Frac][$i$]*refImg[$x$Int][$y$Int+$i$−NTAP/2+1]+offset1)>>shift1 bitDepth(temp[ ][ ])=bitDepth$Y$+GRAD_ACCU−shift1=INTERNAL_BIT DEPTH(=14)  (Equation A16).

On the other hand, in x=0 ... BLKW−1, y=0 ... BLKW−1, i=0 ... TAP−1, and offset2=1<<(shift2−1), a horizontal motion compensation filter fracFilterHor derives the vertical gradient image lyX[ ][ ] (lyX is ly0 or ly1), as values in which a product sum of the coefficient mcFilter[ ][ ] of the motion compensation filter and the temporary image temp[ ][ ] derived by the vertical motion compensation filter mcFilterVer is adjusted in its range of value by using the shift value shift2 from the following equations:

lxX[$x$][$y$]=(ΣfracFilterHor[$x$Frac][$i$]*temp[$x$+$i$−NTAP/2+1][$y$]+offset2)>>shift2 bitDepth($PX$[ ][ ])=INTERNAL_BIT_DEPTH+GRAD_ACCU−shift2=INTERNAL_BIT_DEPTH  (Equation A17).

(Details of STEP 2)

A gradient correction coefficient unit 30912 may derive the correction weight vector (u, v) by which the value obtained by above-described Equation A7 or Equation A8 is the minimum, by using a least-squares method. This derivation will be described with reference to FIGS. 20A and 20B. FIGS. 20A and 20B are drawings for describing a method of deriving the correction weight vector (u, v) by using a least-squares method.

The gradient product derivation unit 309121 derives the intermediate parameters s1 to s6 (gradient products). Equation 6 (above-described Equation A8) in FIG. 20A can be expressed as Equation 7 when expressed in the matrix form. Next, assume that the intermediate parameters s1 to s6 (which may be referred to as "gradient product s1", and the like below) satisfies:

$s1=\Sigma(t2*t2)$ $s2=s4=\Sigma(t2*t3)$ $s3=\Sigma(-t1*t2)$ $s5=\Sigma(t3*t3)$ $s6=\Sigma(-t1*t3)$  (Equation A18), then Equation 7 can be simplified to be Equation 8. When Equation 8 is solved for u and v, the correction weight vector (u, v) can be derived as illustrated by Equation 9. Here, when defining that det=s1s5−s2s4, det1=s3s5−s2s6, and det2=s1s6−s3s4, the correction weight vector can be expressed as (u, v)=(det1/det, det2/det).

Note that t1=(P0−P1)=t1, t2=(lx0+lx1)=t2, and t3=(ly0+ly1) are satisfied, respective intermediate parameters s1 to s6 take values obtained by Equations illustrated in FIG. 20B.

The gradient correction coefficient derivation unit 309122 may derive the correction weight vector (u, v) as a simple solution, which will be described below, for deriving the correction weight vectors u and v from s to s6.

From the determinant of Equation 8 illustrated in FIG. 20A, and s4=s2, following equations can be obtained:

$s1*u+s2*v=s3$ $s2*u+s5*v=s6$  (Equation A19)

Here, assume that s2*v=0, from the above-described equation, the correction weight vector (u, v) can be obtained as:

$u=s3/s1$ $v=(s6-s2*u)/s5$  (Equation A20)

Actually, the gradient correction coefficient derivation unit 309122 may perform integer operation, instead of obtaining the correction weight vector (u, v) which requires the operation in decimal point accuracy, by using, for example, uh which is an integer value obtained by shiftBIO bit shift to the left on u (i.e., uh=u<<shiftBIO), and vh which is an integer value obtained by shiftBIO bit shift to the left on v (i.e., vh=v<<shiftBIO). In the case of shiftBIO=5, the accuracy is 1/32. Note that the above-described uh is derived not in a manner that a value u in decimal accuracy are derived and then a value in integer accuracy by bit shift to the left only by the prescribed number shiftBIO, but derived directly in the integer operation with the magnitude corresponding to u<<shiftBIO. Therefore, uh and vh are obtained as:

$uh=(s3<<5)/s1$ $vh=((s6<<5)-s2*uh)/s5$  (Equation A21).

v and u may be derived by:

$v=s6/s5$ $u=(s3-s2*v)/s1$  (Equation A22).

In a case of deriving the intermediate parameters s1 to s6 illustrated in FIG. 20B, the gradient correction coefficient derivation unit 309122 may further insert a regularization term regcost (normalization cost) which provides the effect of bringing the value of the above-described gradient correction term modBIO to zero or close to zero. Specifically, the gradient correction coefficient derivation unit 309122 introduces the regularization term regcost to derive the intermediate parameters s1 and s5 as follows:

$$s1 = s1 + \text{regcost}$$

$$s5 = s5 + \text{regcost} \quad \text{(Equation A23)}.$$

Here, the regularization term regcost may be derived, for example, as regcost=(1<<2*INTERNAL_BIT_DEPTH)>>regshiftBIO(=5).

The motion compensation unit 3091 may derive, instead of using the correction weight vector (u, v), uh and vh that are the values obtained by the shift to the left on u and v, respectively, only by shiftBIO for an integer operation, specifically by using:

$$uh = (s3 << \text{shiftBIO})/s1$$

$$vh = (s6 << \text{shiftBIO}) - s2*u/s5 \quad \text{(Equation A24)}$$

to perform an integer operation.

At the last of STEP 2, the gradient correction coefficient derivation unit 309122 performs clip processing on uh and vh to be within a prescribed range (−rangeBIO to rangeBIO). Specifically, the gradient correction coefficient derivation unit 309122 performs the clip processing expressed by the equations:

$$\text{rangeBIO} = (1 << \text{shiftBIO})*\text{MVTH}$$

$$uh = \text{clip3}(-\text{rangeBIO}, \text{rangeBIO}, uh)$$

$$vh = \text{clip3}(-\text{rangeBIO}, \text{rangeBIO}, vh) \quad \text{(Equation A25)}.$$

Note that MVTH is, for example, 2/3 pel.

(Details of STEP 3)

The gradient correction bi-prediction derivation unit 30913 substitutes for Equation A3 the correction weight vector (u, v) derived in STEP 2 to derive the gradient correction term modBIO, and derives the pixel value Pred of the prediction image by using above-described Equation A9. Note that the gradient correction term modBIO may be weakened to one half, and above-described Equation A10 may be used Equation A10.

The gradient correction bi-prediction derivation unit 30913 derives, in the integer operation, the pixel value Pred of the prediction image by using the prediction equation illustrating in above-described Equation A2. The gradient correction bi-prediction derivation unit 30913 derives the gradient correction term modBIO by using following equations:

$$\text{shiftPred} = \text{INTERNAL\_BIT\_DEPTH} - \text{bitDepthY} + 1$$

$$\text{modBIO} = \{(lx0-lx1)*uh + (ly0-ly1)*vh\} >> \text{shiftBIO2} \quad \text{(Equation A26)}.$$

Here, it is satisfied that:

$$\text{shiftBIO2} = \text{shiftBIO} + \text{bitDepth}(m\text{cImg}) - \text{bitDepth}(\text{gradImg}) + 1 \quad \text{(Equation A27)}.$$

Here, bitDepth(mcImg) is the bit depth of the motion compensation image, and corresponds to above-described bitDepth(PX[ ][ ]). bitDepth (gradImg) is the bit depth of the gradient image, and corresponds to above-described bitDepth(lxX[ ][ ]) and bitDepth(lxX[ ][ ]). Therefore, above described above, each bit depth satisfies:

$$\text{bitDepth}(m\text{cImg}) = \quad \text{(Equation A28)}$$
$$\text{bitDepth} + 2*\text{MC\_ACCU} - (\text{shift1} + \text{shift2})$$

$$\text{bitDepth}(\text{gradImg}) = \text{bitDepth} +$$
$$2*(\text{MC\_ACCU} + \text{GRAD\_ACCU}) - (\text{shift1} + \text{shift2}).$$

In a case that the accuracy MV_ACCU of the motion compensation filter is equal to the accuracy GRAD_ACCU of the gradient compensation filter, it is satisfied that $\text{bitDepth}(m\text{cImg}) =$ $\text{bitDepth}(\text{gradImg})$, and thus Equation (A27) is simplified to be shiftBIO2 = shiftBIO + 1 (Equation A29).

(Configuration Example of Motion Compensation Unit 3091)

Figure 22:
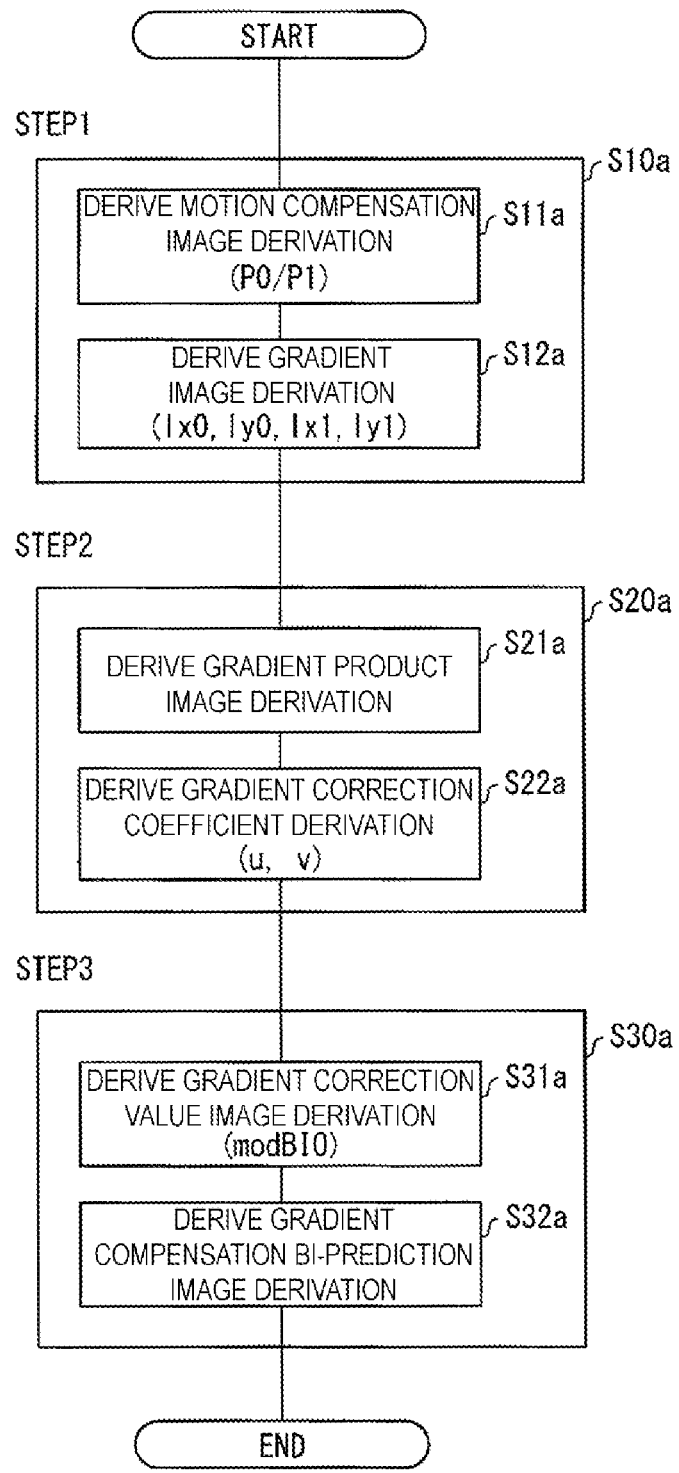
FIG. 22 is a flowchart illustrating an example of a flow of processing of the BIO prediction performed by the motion compensation unit.
Figure 23:
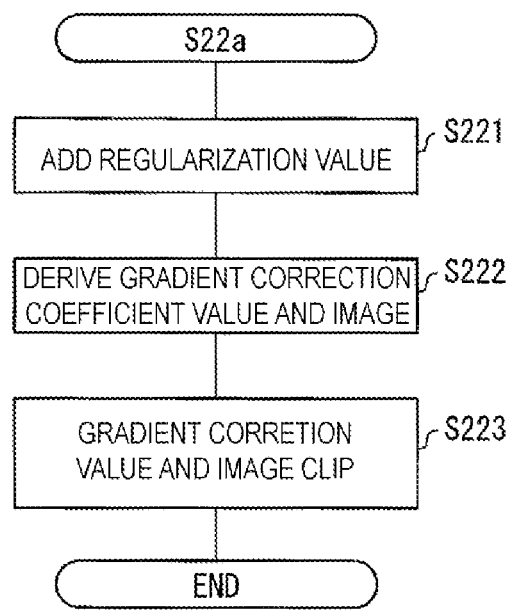
FIG. 23 is a flowchart illustrating an example of the process of S22a in FIG. 22.

Here, the configuration of the motion compensation unit 3091 which performs processing of above-described STEP 1 and STEP 2 will be described using FIG. 21 and with reference to FIG. 22 and FIG. 23. FIG. 21 is a block diagram illustrating an example of the configuration of the motion compensation unit 3091. FIG. 22 is a flowchart illustrating an example of the processes of the BIO prediction performed by the motion compensation unit 3091. FIG. 23 is a flowchart illustrating an example of the process of S22a in FIG. 22.

The motion compensation unit 3091 (prediction image generation apparatus, prediction image generation unit) illustrated in FIG. 21 includes a motion compensation gradient unit 30911 and the gradient correction coefficient unit 30912. The motion compensation gradient unit 30911 includes the motion compensation derivation unit 309111 and the gradient derivation unit 309112 (first switching unit), while the gradient correction coefficient unit 30912 includes the gradient product derivation unit 309121 and the gradient correction coefficient derivation unit 309122 (second switching unit, clip unit).

In STEP 1, the motion compensation derivation unit 309111 reads the L0 reference image refImgL0[ ][ ] and the L reference image refImgL1 [ ][ ] to be used as reference images from the reference picture memory 306, and derives the motion compensation images P0 and P1 (S11a in FIG. 22).

Next, the gradient derivation unit 309112 derives, for the motion compensation images P0 (P0[ ][ ]) and P1 (P1[ ][ ]) derived by the motion compensation derivation unit 309111, the horizontal gradient images lx0 (lx0[ ][ ]) and lx1 (lx1[ ][ ]) and the vertical gradient images ly0 (ly0[ ][ ]) and ly1 (ly1[ ][ ]) (S12a in FIG. 22).

A filter set (a gradient correction filter, a gradient filter, filter coefficients) used for deriving the gradient images lx0, lx1, ly0, and ly1 by the gradient derivation unit 309112 may be configured to switch multiple filter sets having different resolution from each other. For example, the motion compensation unit 3091 may include the gradient derivation unit 309112 (first switching unit) configured to select a certain filter set from a group of a prescribed filter set (for example, a high-resolution filter and a low-resolution filter) to switch the filter set.

Subsequently, in STEP 2, the gradient product derivation unit 309121 derives the above-described intermediate parameters s1 to s6 (gradient products) (S21a in FIG. 22).

Next, the gradient correction coefficient derivation unit 309122 derives the elements u[ ][ ] and v[ ][ ] of the correction weight vector (u[ ][ ], v[ ][ ]) (gradient correction coefficients and, in the integer operation, uh[ ] and vh[ ][ ]) by using the intermediate parameters s1 (s1[ ][ ]) to s6 (s6[ ][ ]) (gradient product) derived by the gradient product derivation unit 309121 (S22a of FIG. 22). Here, in a case that the picture configuration is random access, the gradient correction coefficient derivation unit 309122 assumes that a distance (T0) (inter-picture distance) of the target image Cur and the L0 reference image refImgL0 is equal to a distance (T1) (inter-picture distance) of the target image Cur and the L1 reference image refImgL1.

Finally, in STEP 3, the gradient correction bi-prediction derivation unit 30913 uses the correction weight vector (u, v) derived in STEP 2 as the weight coefficients to be multiplied by the motion displacement image predSamplesLX (see Equation A3 and Equation A26) to derive the gradient correction term modBIO[ ][ ] (S31a of FIG. 22). The gradient correction bi-prediction derivation unit 30913 derives the pixel values Pred of the gradient correction bi-prediction image (the prediction image, the corrected prediction image) (S32a of FIG. 22).

Moreover, description can be provided as follows for the modification of processing of S22a in FIG. 22, with reference to FIG. 23. The gradient correction coefficient derivation unit 309122 adds the regularization term regcost to the intermediate parameters s1 to s6 (gradient product) derived by the gradient product derivation unit 309121 (S221a). Next, the gradient correction coefficient derivation unit 309122 derives uh and vh (gradient correction coefficients) which are the values obtained by shifting u and v, instead of the correction weight vector (u, v), by only shiftBIO for integer operation to the left (S222a). The gradient correction coefficient derivation unit 309122 (clip unit) performs clip processing for restraining the derived gradient correction coefficients uh and vh (each of weight coefficients) within a prescribed range (S223a).

Figure 25:
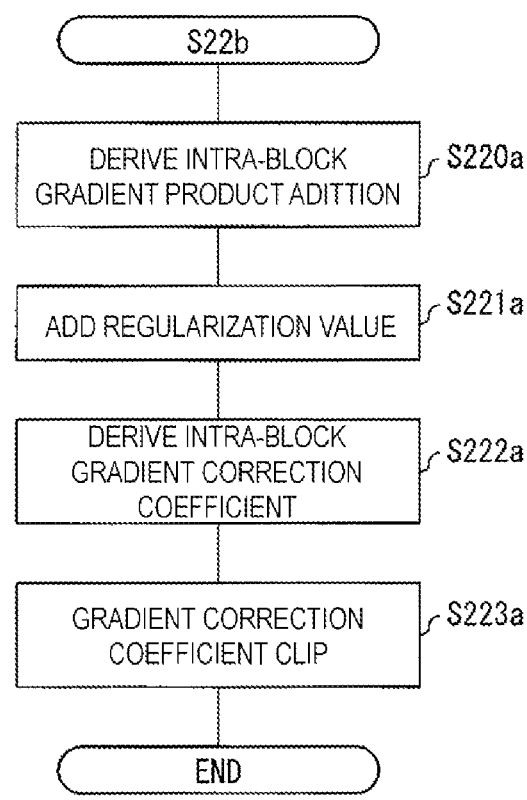
FIG. 25 is a flowchart illustrating another example of the process of S22a in FIG. 22.
Figure 26:
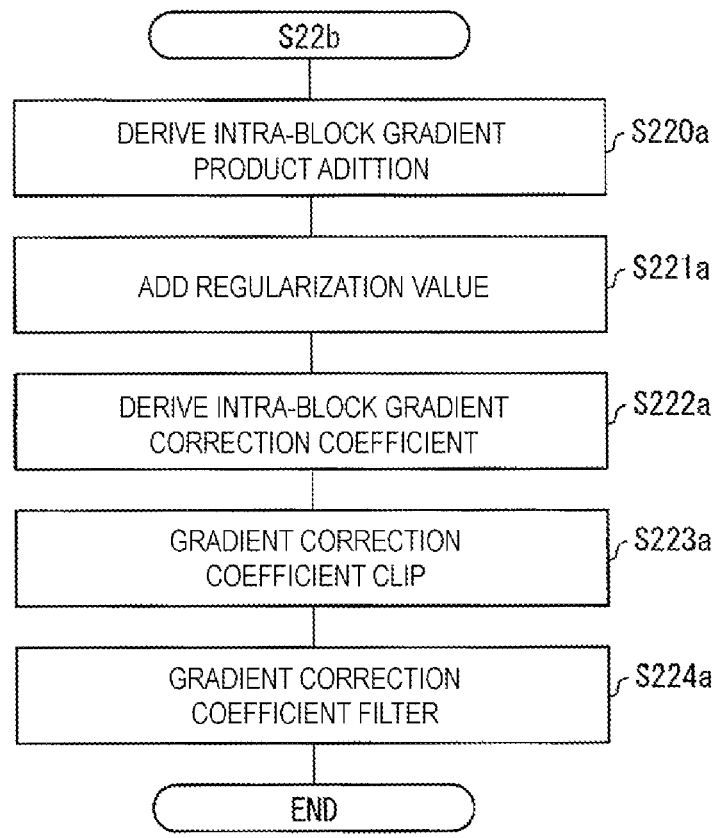
FIG. 26 is a flowchart illustrating still another example of the process of S22a in FIG. 22.

Note that the steps of FIG. 22 is not limited to the above, but as illustrated in FIG. 25 and FIG. 26, S22a may be processing including step S220a of deriving the intermediate parameters s1 to s6 (gradient product) for each block, or including step S225a of applying a filter to the gradient correction coefficients uh and vh (each of weight coefficients). Note that an example of deriving the gradient correction coefficients uh and vh (each of weight coefficients) according to the flow of processing illustrated in FIG. 25 and FIG. 26 will be described later.

(Another Configuration Example of Motion Compensation Unit 3091)

Note that according to the configuration of the motion compensation unit 3091 illustrated in FIG. 21, the elements u[ ][ ] and v[ ][ ] (gradient correction coefficients) of the correction weight vector (u[ ][ ], v[ ][ ]) are derived by using the intermediate parameters s1 (s1[ ][ ]) to s6 (s6[ ][ ]) (gradient product) derived by the gradient product derivation unit 309121 (STEP 3), but it is not limited to this.

Figure 24:
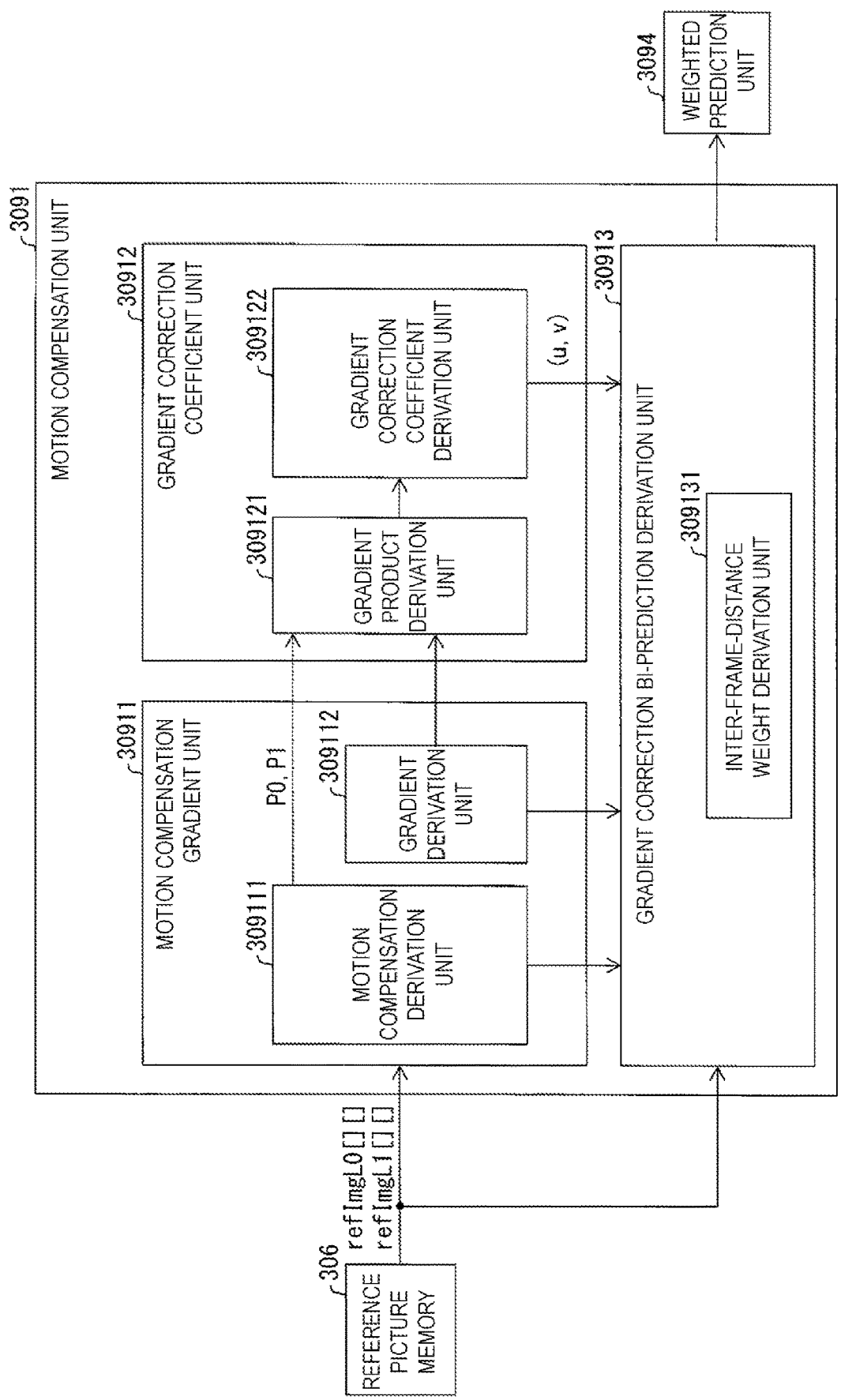
FIG. 24 is a block diagram illustrating another example of the configuration of the motion compensation unit.

For example, as illustrated in FIG. 24, the gradient correction bi-prediction derivation unit 30913 included in the motion compensation unit 3091 may be configured to include the inter-frame-distance weight derivation unit 309131. The inter-frame-distance weight derivation unit 309131 may be configured to acquire the picture interval T0 (first picture interval) between the target image Cur and the reference image P0, and the picture interval T1 (second picture interval) between the target image Cur and the reference image P1 from the inter-prediction parameter decoding unit 303, derive the gradient correction term modBIO[ ][ ] by using the intervals (see Equation A40 and Equation A44 mentioned below or the like), and derive the pixel values Pred of the gradient correction bi-prediction image (prediction image). Note that the inter-frame-distance weight derivation unit 309131 is assumed to be a part of the gradient bi-prediction derivation part 30913, but a configuration in which the inter-frame-distance weight derivation unit 309131 is a part of another means may be adopted.

(STEP 1: Generation of Gradient Image)

The gradient derivation unit 309112 derives the horizontal gradient images lx0 and lx1 and the vertical gradient images ly0 and ly1 for the motion compensation images P0 and P1. The gradient compensation filter (gradFilter) used by the gradient derivation unit 309112 for deriving the gradient images lx0, lx1, ly0, and ly1 may include multiple filter sets, such as a high-resolution filter set and a low-resolution filter set. Note that the filter set includes the phases nFrac, filter coefficients gradFilter[nFrac][pos] for positions pos (here, nFrac=0 . . . M-1, pos=0 . . . NTAPS-1). Note that a set of filter coefficients (filter set) may be simply referred to as filter coefficients.

The high-resolution filter refers to a filter used for deriving a comparatively steep gradient, and is sensitive to a noise because of receiving of the influence of a small change in a pixel value. Describing briefly, this filter corresponds to filter coefficients [1−1]/2 for deriving the difference of the pixel values in the unit of one pixel. The low-resolution filter refers to a filter used for deriving a comparatively loose gradient change, and is comparatively robust to a noise. Describing briefly, this filter corresponds to filter coefficients [1, 1, −1, −1]/4 for deriving the difference in the unit of two pixels.

The gradient change (optical flow) is based on the assumption that a gradient at a certain point is constant within a prescribed range. This assumption is comparatively satisfied in a case that the correction vector (u, v) at a pixel position is less than one pixel. In other words, the assumption is satisfied that the gradient is constant within the distance for correcting the pixel position being shorter than one pixel. However, in a case that the correction vector is large, for example two, three pixels or the like, the assumption that the gradient is constant is not satisfied. The high-resolution filter can derive a steep gradient in a pixel unit, for example, and thus is effective within a range in which the correction vector (u, v) for a pixel position is less than one pixel, and in which the assumption that the gradient is constant is satisfied. Here, even in a case that the assumption that the gradient is constant is, strictly speaking, not satisfied in the distance shorter than one pixel, the assumption that the gradient is constant is satisfied from the view of loose change as a whole (it is assumed that a gradient is derived from a curve to which a low pass filter is applied, but not from a curve with a notched change). The low decomposition filter is used for deriving such a comparatively loose change, and is considered to be effective for cases where the correction vector (u, v) for the pixel position exceeds the high decomposition filter and exceeds one pixel, for example.

Here, the low-resolution filter set may be convolution of a high-resolution filter and a low pass filter, and the high-resolution filter set may be a high pass filter. Note that a method may be introduced in which a Gaussian filter is applied to the motion compensation images P0 and P1 instead of a low-resolution filter, and thereafter a prescribed gradient filter is applied. Note that the gradient compensation filter applied after applying a Laplacian filter to the motion compensation images P0 and P1 is preferably a high-resolution filter.

Multiple filter sets switched by the gradient derivation unit 309112 have the following relationship in the difference in resolution. As for a filter set A and a filter set B, the filter set A (e.g., high-resolution filter) having higher resolution than a filter set B corresponds to a case in which, in a case that graphs of the filter coefficients of the filter sets is referred to, a graph for the filter set A is steeper than a graph for the filter set B, and the graph for the filter set B is looser than the graph for the filter set B. Specifically, it corresponds to a case that the filter coefficients of the filter set A and the filter set B satisfy either one of the following relations.

As for the value of the absolute value of the filter coefficients |gradFilter[nFrac][pos]|, the value for the filter set A (high-resolution filter set) is greater than the value for the filter set B (low-resolution filter set). In other words, the maximum of the filter coefficients of the filter set A (high-resolution filter set) is equal to or greater than the maximum of the filter coefficients of the filter set B (low-resolution filter) set (Relationship R1).

Alternatively, as for the maximum value of the absolute values of the differences between the adjacent filter coefficients in gradFilter[nFrac][pos]: |gradFilter[nFrac][pos]−gradFilter[nFrac][pos+1]|, the value for the filter set A (high-resolution filter set) is smaller than the value for the filter set B (low-resolution filter set) (Relationship R2).

In the filter coefficients gradFilter[nFracC][pos] corresponding to the center phase nFracC (nFracC=M/2 in a case of a 1/M pixel accuracy filter), in a case that the filter coefficients gradFilter[n][posC] for the center position posC (posC=TAP/2) and the filter coefficients gradFilter[n][posC+1] for posC+1 adjacent to the center position are referred to, a relationship is established in which two filter coefficients are different from each other in the filter set A (high-resolution filter set), whereas two filter coefficients have the same sign in the filter set B (low-resolution filter set) (Relationship R3).

As for a case where gradFilter[nFrac][pos] is frequency-converted, an amount of the high frequency components of the filter set A is greater than an amount of the high frequency components of the filter set B (Relationship R4).

For example, referring to FIGS. 27A and 27B, it is an 8-tap filter (TAP=8) with ¼ pixel accuracy (M=4), and thus the center of phase nFracC=2 and the center position posC=4 are satisfied. In this case, the filter coefficients of an example filter1 of the filter set A and the filter coefficients of an example filter2 of the filter set B in the center phase nFracC is listed as follows.

{0, −1, 4, −57, 57, −4, 1, 0}>>4 filter set A (filter 1)
(−1, 2, −50, −53, 53, 50, −2, 1)>>5 filter set B (filter 2)

Hereinafter, in the filters of the above-described examples, it will be briefly described that Relationships R1 to R3 are satisfied.

(Relationship R1 test) The absolute value |gradFilter[nFrac][pos]| of the filter coefficient is 53>>5 for the filter set A and 57>>4 for the filter set B, and thus the relationship R1 is satisfied.

(Relationship R2 test) The maximum value of the filter coefficient difference is (57−(−57))>>4 for the filter set A and (53−(−53))>>5 for the filter set B, and thus the relationship R2 is satisfied.

(Relationship R3 test) The values of the center position nPosC and the adjacent position nPOC+1 are 57 and −4, respectively, for the filter set A, and thus have different signs. The values are 53, and 50 for the filter set B, and have the same sign. Therefore, the relationship R3 is satisfied.

As for the filter coefficient gradFilter[nFrac][pos], in a case that the filter operation is performed by the integer operation, in other words, in a case that the filter coefficient is a value obtained by shifting the value of the filter coefficient in the real number by the filter accuracy GRAD_ACCU to the left, the size of the filter coefficient in real value is a value obtained by shifting the filter coefficient gradFilter[nFrac][pos] of the integer value by the filter accuracy GRAD_ACCU to the right. In this case, the determination of the above-mentioned relationships (Relationship R1, Relationship R2) is made after dividing the value of the filter coefficient by 1>>GRAD ACCU to convert into a real value.

For example, the accuracy of the filter coefficient is taken into consideration, and a value obtained by replacing an "absolute value of the filter coefficient |gradFilter[nFrac][pos]|" to "|gradFilter[nFrac][pos]|>>GRAD_ACCU" is used. Moreover, it is preferable to use a value obtained by replacing an "absolute value of the filter coefficient difference |gradFilter[nFrac][pos]−gradFilter[nFrac][pos+1]|" to an "absolute value of the filter coefficient difference |gradFilter[nFrac][pos]−gradFilter[nFrac][pos+1]|>>GRAD_ACCU". Comparison may be made, as a whole, by using values obtained by shifting the coefficients by the accuracy of the filter set A and the accuracy of the filter set B GRAD_ACCU_A+GRAD_ACCU_B to the left.

Here, in a case that the filter accuracy of the high-resolution filter set is equal to the filter accuracy of the low-resolution filter set, it is not necessary to take the filter accuracy in particular into consideration, and each of the above-mentioned relationships (Relationship R1, Relationship R2) may be used as it is.

FIG. 27A is an example of the high-resolution filter set, and FIG. 27B is an example of the low-resolution filter set. Here, the high-resolution filter set (filter1) with the filter accuracy being 4 (GRAD_ACCU=4), and the low-resolution filter set (filter2) with the filter accuracy being 5 (GRAD_ACCU=5) are illustrated. Note that the low-resolution filter set in FIG. 27B is derived by convolution of the high-resolution filter set and the low pass filter ([1 2 1] filter).

FIGS. 28A to 28D are graphs illustrating values of the filter coefficients gardFitler[nFrac][pos] at the position pos to each phase nFrac (nFrac is xFrac or yFrac) of the high-resolution filter set (filter1 the drawing) and the low-resolution filter set (filter2 in the drawing) illustrated in FIGS. 27A and 27B. FIGS. 28A to 28D correspond to the phases nFrac=0, nFrac=1, nFrac=2, and nFrac=3, respectively. The horizontal axis of each graph corresponds to the position pos, and eight pos of pos=0 . . . 7 are illustrated by using values of 1 . . . 8. It can be understood that there is a tendency for the absolute values of the local maximum or the local minimum to be smaller, in the low-resolution filter set rather than the high-resolution filter set.

Note that the description is made above with reference to the filter sets switched by the gradient derivation unit 309112 with the names of "high-resolution filter set" and the "low-resolution filter set", but the names are not limited to these names in particular. Specifically, the motion compensation unit 3091 may include at least two filter sets different from each other (for example, filter1 and filter2 of FIGS. 27A and 27B), as illustrated in FIGS. 27A and 27B, and the gradient derivation unit 309112 may changes the filter set 1 (filter1) and the filter set 2 (filter2) appropriately. In the following, description is made by using the names of "filter set 1" and "filter set 2" for the filter sets switched by the gradient derivation unit 309112. Moreover, these may not be called filter set, but called filter coefficients, such as "filter coefficients 1" and "filter coefficients 2".

Note that a configuration which switches among three or more filter sets, such as a high-resolution filter set, a middle-resolution filter set, and a low-resolution filter set, may be adopted.

While a parameter X and a prescribed threshold are classified by comparison in a case that the filter set is switched based on the size of the parameter X in the following description, the index idx for identification may be derived directly from the parameter X by division, shift, table reference or the like. For example, methods of deriving the index from division and shift operation as follows are suitable.

$idx = X/TH$ $idx = X \gg shiftTH$

Note that TH and shiftTH are prescribed constants to be used for driving the index idx.

Furthermore, in order to enable the classification of non-regular intervals, the index may be derived by using a table that is for deriving an index from a temporal variable, such as a shift value, as follows.

$idx = idxTransTb1[X/TH]$ $idx = idxTransTb1[X \gg shiftTH]$

As idxTransTb1, a following table can be used, for example. idxTransTb1=[0, 1, 2, 2, 3, 3, 4, 4, 4, 4]

Further, it is also possible to adopt a method of determining the filter set with reference to the table, based on the derived index idx.

For example, used are, as X, resolution (size), block size, frame rate, motion vector, picture interval, quantization step (quantization parameter), a combination thereof or the like. The resolution (size) and the block size may be derived from the product of the width and the height (width*height) or the sum of the width and the height (width+Height).

(STEP 1: Switching of Filter Set Depending on Resolution)

In a case that the resolution of the motion compensation images P0 and P1 is high, the length of the entire motion vector tends to be large, and it is therefore preferable to use the filter set 2 (for example, the low-resolution filter set) capable of capturing the gradient in a relatively wide range.

Figure 29:
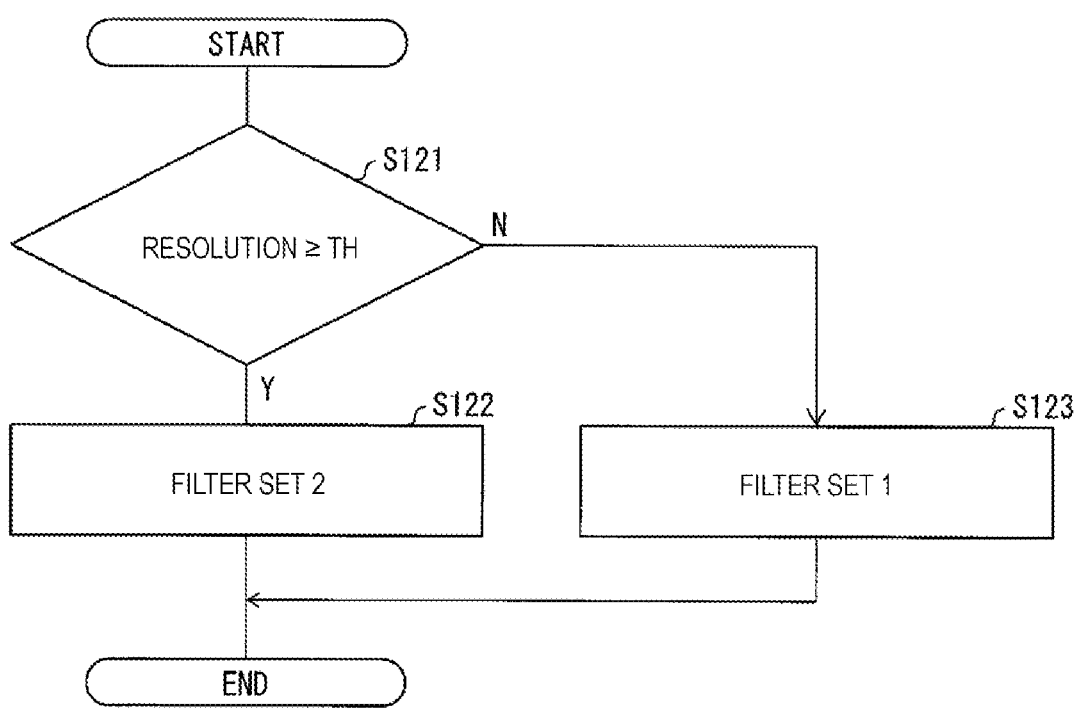
FIG. 29 is a flowchart illustrating an exemplary flow of process of switching the filter set depending on the resolution.

The gradient derivation unit 309112 may be configured to switch the gradient compensation filter gradFilter in accordance with the resolution of the motion compensation images P0 and P1. To be more specific, the gradient derivation unit 309112 may be configured to use a filter set in which the greater the resolution, the lower the resolution to derive the gradient images (lx0, lx1, ly0 and ly1). FIG. 29 is a flowchart of an exemplary flow of process of switching the filter set (filter coefficients) depending on the resolution.

As illustrated in FIG. 29, for example, the gradient derivation unit 309112 may use the filter set 2 (filter coefficients 2) in a case that the resolution (size) of the motion compensation images P0 and P1 is equal to or greater than a predetermined threshold TH (for example, equal to or greater than 1920×1080), and may use the filter set 1 (filter coefficients 1) in a case that the resolution is lower than the predetermined threshold TH (for example, lower than 1920×1080).

(STEP 1: Switching of Filter Set Depending on Block Size)

In a case that the block size of the prediction block including the target pixel or the sub-block obtained by dividing the prediction block is large, the length of the entire motion vector tends to be large, and it is therefore preferable to use the filter set 2 (for example, the low-resolution filter set) capable of capturing the gradient in a relatively wide range.

In view of this, the gradient derivation unit 309112 may be configured to switch the gradient compensation filter gradFilter in accordance with the block size of the block including the target pixel for derivation of the gradient image. To be more specific, the gradient derivation unit 309112 may be configured to use a filter set in which the greater the block size, the lower the resolution to derive the gradient images (lx0, lx1, ly0 and ly1).

For example, the gradient derivation unit 309112 may use the filter set 2 in a case that the block size of the block including the target pixel included in the motion compensation images P0 and P1 is equal to or greater than a predetermined threshold (for example, equal to or greater than 16×16), and may use the filter set 1 in a case that the block size of the block including the target pixel is smaller than the predetermined threshold (for example, smaller than 16×16).

(STEP 1: Switching of Filter Set Depending on Frame Rate)

In a case that the resolution/frame rate of the motion compensation images P0 and P1 is large, the length of the entire motion vector tends to be large, and it is therefore preferable to use the filter set 2 (for example, the low-resolution filter set) capable of capturing the gradient in a relatively wide range.

In view of this, the gradient derivation unit 309112 may be configured to switch the gradient compensation filter gradFilter in accordance with the frame rate FrameRate of the motion compensation images P0 and P1. To be more specific, the gradient derivation unit 309112 may be configured to use a filter set in which the smaller the frame rate, the lower the resolution to derive the gradient images (lx0, lx1, ly0 and ly1).

For example, the gradient derivation unit 309112 may use the filter set 2 in a case that the frame rate is equal to or smaller than a predetermined threshold (for example, FrameRate<=TH, TH=60), and may use the filter set 1 in a case that the frame rate is greater than the predetermined threshold (for example, FrameRate>TH).

Alternatively, the gradient derivation unit 309112 may use the filter set 2 in a case that the resolution/frame rate of the motion compensation images P0 and P1 is greater than a predetermined threshold (for example, Width/FrameRate>TH, TH=1920/60=32), and may use the filter set 1 in a case that the resolution/frame rate is equal to or smaller than the predetermined threshold (for example, Width/FrameRate<=TH).

(STEP 1: Switching of Filter Set Depending on Motion Vector)

In a case that the difference from the motion vector MV of the neighboring block (and the motion vector mvLX) is large, the variation of the motion in the target block tends to be relatively large. It is therefore preferable to use the filter set 2 (for example, the low-resolution filter set) capable of capturing the gradient in a relatively wide range.

In view of this, the gradient derivation unit 309112 may be configured to switch the gradient compensation filter gradFilter in accordance with the difference between the motion vector MV (motion vector, mvLX) of the target block and the prediction vector PMV (prediction motion vector, mvpLX) of the target block. To be more specific, the gradient derivation unit 309112 may be configured to use a filter set in which the greater the difference vector DMV, the motion vector mvLX, and/or the prediction vector mvpLX, the lower the resolution to derive the gradient images (lx0, lx1, ly0 and ly1).

For example, the gradient derivation unit 309112 may use the filter set 2 in a case that the difference vector DMV is equal to or greater than a predetermined threshold, and may use the filter set 1 in a case that the difference vector DMV is smaller than the predetermined threshold.

Here, "the difference between the motion vector MV of the target block and the prediction vector PMV (prediction motion vector) of the target block" may be the difference vector DMV (mvdLX), or an absolute difference vector value absDMV obtained by the following equation.

$$absDMV=|MVx-PMVx|+|MVy-PMVy|$$

In addition, the prediction vector PMV may be a collocate motion vector (that is, the motion vector of the previous picture at the same position), the motion vector of the left block, or the motion vector of the upper block.

Note that the gradient derivation unit 309112 may be configured to switch the gradient compensation filter gradFilter in accordance with "the motion vector mvLX of the target block" instead of "the difference from the motion vector MV of the neighboring block".

(STEP 1: Switching of Filter Set Depending on Nter-Picture Distance)

In a case that the nter-picture distance (in the above-mentioned example, deltaPOC) is large, the length of the entire motion vector tends to be large, and it is therefore preferable to use the filter set 2 (for example, the low-resolution filter set) capable of capturing the gradient in a relatively wide range.

In view of this, the gradient derivation unit 309112 may be configured to switch the filter set in accordance with the nter-picture distance between the target image Cur including the target block, and at least one of the motion compensation images P0 and P1 (or the L0 reference image refImgL0 and the L1 reference image refImgL1). To be more specific, the gradient derivation unit 309112 may be configured to use a filter set in which the greater the nter-picture distance, the lower the resolution to derive the gradient images (lx0, lx1, ly0 and ly1).

For example, the gradient derivation unit 309112 may use the filter set 2 in a case that the nter-picture distance is equal to or greater than a predetermined threshold, and may use the filter set 1 in a case that the nter-picture distance is smaller than the predetermined threshold.

Here, the gradient derivation unit 309112 may perform derivation from the picture order number POC (POC_curr) of the target image Cur including the target block, the picture order number POC (POC_l0) of the L0 reference image refImgL0, and the picture order number POC (POC_l1) of the L1 reference image refImgL1, and in this case, the nter-picture distance is derived as a deltaPOC by the following equation.

$$deltaPOC=|POC\_l0-POC\_curr|+|POC\_l1-POC\_curr|//\text{average and total}$$

$$deltaPOC=\max(|POC\_l0-POC\_curr|,|POC\_l1-POC\_curr|)//\text{maximum value}$$

(STEP 1: Switching of Filter Set Depending on Quantization Step)

In a case that the quantization step of the target block for generation of the target image Cur is large, the reliability of variation in a small region is considered to be low. It is therefore preferable to use the filter set 2 (for example, the low-resolution filter set) capable of capturing the gradient in a relatively wide range. Note that, normally, the greater the quantization parameter, the greater the quantization step, and therefore the quantization parameter may be used in place of the quantization step in the following description.

In view of this, the gradient derivation unit 309112 switches the filter set that is applied to the motion compensation image P0 in accordance with the quantization step of the motion compensation image P0 (or the L0 reference image refImgL0), and switches the filter set that is applied to the motion compensation image P1 in accordance with the quantization step of the motion compensation image P1 (or the L1 reference image refImgL1). To be more specific, the gradient derivation unit 309112 may be configured to use a filter set in which the greater the quantization step, the lower the resolution to derive the gradient images (lx0, lx1, ly0 and ly1).

Further, the filter set may be switched in accordance with the quantized coefficients of the target block of the target image Cur.

That is, the gradient derivation unit 309112 may be configured to switch the filter set in accordance with the quantized coefficients or the quantization step.

For example, the gradient derivation unit 309112 may use the filter set 2 in a case that the quantization step is equal to or greater than a predetermined threshold, and may use the filter set 1 in a case that the quantization step is smaller than the predetermined threshold.

(STEP 1: Switching of Filter Set with Reference to Flag)

The gradient derivation unit 309112 may be configured to switch the filter set with reference to a flag as explicit signaling.

For example, the entropy coding unit 104 codes the filter set index of the filter set to be used in the slice header SH and the picture parameter_set PPS. The gradient derivation unit 309112 may be configured to switch the filter set, based on the filter set index decoded from the slice header SH and the picture parameter_set PPS.

(STEP 2: Gradient Correction Depending on Distance Between Target Image and Reference Image)

In the case where the picture configuration is random access, the motion compensation unit 3091 assumes that the distance (T0) between the target image Cur and the reference image P0 (first reference image) is equal to the distance (T1) between the target image Cur and the reference image P1 (second reference image); however, as in the case where the picture configuration is LowDelayB, the motion compensation unit 3091 may depend on the distance (T0) between the target image Cur and the reference image P0 and the distance (T1) between the target image Cur and the reference image P1 illustrated in FIG. 18 to derive the correction weight vector (u, v). However, the performance of the motion compensation process is not necessarily improved by simply considering the distance (T0) between the target image Cur and the reference image P0 and the distance (T1) between the target image Cur and the reference image P1.

In view of this, the motion compensation unit 3091 may perform the motion compensation process by use of weight coefficients depending on the picture interval (inter-picture distance).

The motion compensation unit 3091 (inter-frame-distance weight derivation unit 309131) derives T0 and T1 by the following Equation.

$$T0 = POC\_L0 - POC\_Curr$$

$$T1 = POC\_curr - POC\_L1$$

Note that derivation of T0 and T1 may be achieved by the following equation.

$$T0 = POC\_curr - POC\_L0$$

$$T1 = POC\_L1 - POC\_Curr$$

To be more specific, the gradient product derivation unit 309121 derives u and v with which the value obtained by Equation A30 is smallest (which corresponds to Equation A7).

$$\Sigma |l0-l1|^2 = \Sigma |(P0-P1)+(T0*lx0+T1*lx1)*u+(T0*ly0+T1*ly1)*v|^2 \quad \text{(Equation A30)}.$$

To derive such u and v, the gradient product derivation unit 309121 derives intermediate parameters s1 (s1[ ][ ]) to s6 (s6[ ][ ]) that satisfy Equation A31 (which corresponds to Equation A18).

$$s1 = \Sigma(T0*lx0+T1*lx1)^2$$

$$s2 = s4 = \Sigma(T0*lx0+T1*lx1)(T0*ly0+T1*ly1)$$

$$s3 = -\Sigma(P0+P1)*(T0*lx0+T1*lx1)$$

$$s5 = \Sigma(T0*ly0+T1*ly1)^2$$

$$s6 = -\Sigma(P0-P1)*(T0*ly0+T1*ly1) \quad \text{(Equation A31)}$$

Note that Equation A31 corresponds to a case in which t1=(P0−P1), t2=(T0*lx0+T1*lx1), and t3=(T0*ly0+T1*ly1) that are derived in consideration of the picture interval are applied in Equation A18.

Here, from the pixel value l0 of the point l0 on the L0 reference image refImgL0 and the pixel value l1 of the point l1 on the L1 reference image refImgL1, the prediction equation of the pixel value I at the point I on the target image Cur, which is a prediction target image, can be expressed as Equation A32 (which corresponds to Equation A6).

$$I = (l0 + l1) \gg 1 \quad \text{(Equation A32)}$$

$$= \{P0 + P1 + (T0*lx0 + T1*lx1)*u + (T0*ly0 + T1*ly1)*v\} \gg 1$$

In addition, the gradient bi-prediction derivation unit 30913 introduces a first weight coefficient according to the picture interval T0 (first picture interval) between the target image Cur and the reference image P0, and a second weight coefficient according to the picture interval T1 (second picture interval) between the target image Cur and the reference image P1 to derive the gradient correction term modBIO[ ][ ]. That is, the gradient bi-prediction derivation unit 30913 uses the prediction equation of Equation A2 to derive the pixel value Pred of the prediction image. Note that, in Equation A2, shiftPred=INTERNAL_BIT_DEPTH−bitDepthY+1, and modBIO is a gradient correction term that is derived by Equation A33 (which corresponds to Equation A26).

$$modBIO = \{(T0*lx0-T1*lx1)*uh+(T0*ly0-T1*ly1)*vh\} \gg shiftBIO2 \quad \text{(Equation A33)}$$

That is, the gradient bi-prediction derivation unit 30913 derives the gradient correction term modBIO with reference to the pixel values of the horizontal gradient images lx0 and lx1 and the vertical gradient images ly0 and ly1, and may be determined in accordance with the picture interval T0 between the target image Cur and the reference image P0, and the picture interval T1 between that target image Cur and the reference image P1. Here, the picture intervals T0 and T1 may be referred to as weight coefficients for multiplying the pixel values of the horizontal gradient images lx0 and lx1 and the vertical gradient images ly0 and ly1.

(STEP 2: Gradient Correction Depending on Distance Between Target Image and Reference Image)

The gradient product derivation unit 309121 may derive the pixel value Pred of the prediction image by introducing the first weight coefficient W0 according to the picture interval T0 between the target image Cur and the reference image P0, and the second weight coefficient W according to the picture interval T1 between that target image Cur and the reference image P1. That is, the pixel value Pred of the prediction image may be derived in consideration of the time weight shiftWeight by multiplying the pixel value of each pixel of the reference image P0 by the first weight coefficient W1, and by multiplying the pixel value of each pixel of the reference image P1 by the second weight coefficient. In this case, the prediction equation is expressed as Equation 34 (which corresponds to Equation A2).

$$Pred = \{(W0*P0+W1*P1)+modBIO+shiftOffset\} \gg shiftWeight \; Pred \quad \text{(Equation 34)}.$$

The gradient product derivation unit 309121 uses this prediction equation to derive the pixel value Pred of the prediction image. Note that modBIO is a gradient correction term derived by Equation A35 (which corresponds to Equation A26).

$$modBIO = \{(lx0-lx1)*uh+(ly0-ly1)*vh\} \gg (shiftBIO2+shiftWeight) \quad \text{(Equation A35)}.$$

Here, a pixel value shiftWeightPred of the prediction image in consideration of the time weight is obtained by "shiftWeightPred=shiftPred+shiftWeight", and the time weight shiftWeight is, for example, 8.

The gradient product derivation unit 309121 may derive the first weight coefficient W0 and the second weight coefficient W1 as in Equation A36 or Equation A37.

$$W0 = (T1 \ll shiftWeight)/|T0+T1|$$

$$W1 = (1 \ll shiftWeight) - W0 \quad \text{(Equation A36)}$$

$$W1 = (T0 \ll shiftWeight)/|T0+T1|$$

$$W0 = (1 \ll shiftWeight) - W1 \quad \text{(Equation A37)}$$

Alternatively, the gradient product derivation unit 309121 may use Equation A38 based on information POC representing an output order of a picture to derive the first weight coefficient W0 and the second weight coefficient W1 as in Equation A39 (which corresponds to Equation 37).

$$td = POC(refImgL1) - POC(refImgL0)$$

$$tb = POC(currPic) - POC(refImgL0) \quad \text{(Equation A38)}$$

$W0=(1<<\text{shiftWeight})-W1$ $W1=(tb<<\text{shiftWeight})/td$ (Equation A39)

Further, the gradient product derivation unit 309121 may perform the motion compensation process by using a weight coefficient depending on the picture interval in addition to the introduction of the first weight coefficient W0 according to the picture interval T0 between the target image Cur and the reference image P0 and the second weight coefficient W1 according to the picture interval T1 between that target image Cur and the reference image P1.

In this case, the prediction equation is identical to Equation 34, and the inter-frame-distance weight derivation unit 309131 uses this prediction equation to derive the pixel value Pred of the prediction image. Note that modBIO is a gradient correction term derived by Equation A40 (which corresponds to Equation A35):

$\text{modBIO}=\{(T0*lx0-T1*lx1)*uh+(T0*ly0-T1*ly1)\\ *vh>>(\text{shiftBIO2}+\text{shiftWeight})$ (Equation A40).

Here, the pixel value shiftWeightPred of the prediction image in consideration of the time weight is obtained by "shiftPred+shiftWeight", and the time weight shiftWeight is, for example, 8.

(STEP 2: Correction of Distance Between Target Image and Reference Image)

Alternatively, in a case that the ratio of the picture interval T0 between the target image Cur and the reference image P0 to the picture interval T1 between that target image Cur and the reference image P1 falls outside a prescribed range, the gradient product derivation unit 309121 may perform a prescribed process on the picture interval T0 and the picture interval T1 such that the ratio of the picture interval T0 to the picture interval T1 falls within the prescribed range, and may determine the weight coefficients for multiplying the pixel values of the gradient images lx0, lx1, ly0, and ly1 in accordance with the picture interval T0 and the picture interval T1 on which the prescribed process has been performed.

For example, in a case that the ratio of the picture interval T0 between the target image Cur and the reference image P0 to the picture interval T1 between that target image Cur and the reference image P1 is large (for example, T0:T1=1:5 or the like) in the gradient correction process using the weight coefficients depending on the picture intervals by the gradient product derivation unit 309121, the motion compensation might not be appropriately performed due to the excessively heavy weight coefficients.

In view of this, in a case that the ratio of the picture interval T0 between the target image Cur and the reference image P0 to the picture interval T1 between that target image Cur and the reference image P1 is large, the gradient product derivation unit 309121 may perform a prescribed process such that the ratio is not too different from T0:T1=1:1.

Exemplary correction (a prescribed process) performed by the gradient product derivation unit 309121 in which the preliminarily set range (the prescribed range) of T0:T1 is 2:1 to 1:2 is described. In this case, when T0:T1=1:5 (outside the prescribed range), the gradient product derivation unit 309121 performs clip processing such that the picture interval T1 is twice the picture interval T0 to obtain T0:T1 falling within the prescribed range (for example, T0:T1=1:2) instead of using the weight coefficient of the ratio of T0:T1 as it is, thereby determining the weight coefficients for multiplying the pixel values of the gradient images lx0, lx1, ly0, and ly1.

To be more specific, in the case where the preliminarily set range (the prescribed range) of T0:T1 is 2:1 to 1:2, in a case that the absolute value abs (T0) of the picture interval T0 is more than twice the absolute value abs (T1) of the picture interval T1, the gradient product derivation unit 309121 performs clip processing of doubling the picture interval T0. Conversely, in the case where the absolute value abs (T1) of the picture interval T1 is more than twice the absolute value abs (T0) of the picture interval T0, the gradient product derivation unit 309121 performs clip processing of doubling the picture interval T1. That is, the clip processes are performed as follows.

if $(\text{abs}(T0)>2*\text{abs}(T1))T0=sgN(T0)*2*\text{abs}(T1)$ if $(\text{abs}(T1)>2*\text{abs}(T0))T1=sgN(T1)*2*\text{abs}(T0)$ (Equation A41)

Alternatively, in a case that the absolute value abs (T0) of the picture interval T0 is greater than a value obtained by multiplying the absolute value abs (T1) of the picture interval T1 by nm/md, the gradient product derivation unit 309121 performs clip processing of multiplying the picture interval T0 by mn/md. Conversely, in a case that the absolute value abs (T1) of the picture interval T1 is greater than a value obtained by multiplying the absolute value abs (T0) of the picture interval T0 by mn/md, the gradient product derivation unit 309121 may perform clip processing of multiplying the picture interval T1 by mn/md. That is, the clip process may be performed as follows.

if $(md*\text{abs}(T0)>mn*\text{abs}(T1))T0=sgN(T0)*mn*\text{abs}(T1)/md$ if $(md*\text{abs}(T1)>mn*\text{abs}(T0))T1=sgN(T1)*mn*\text{abs}(T0)/md$ (Equation A42)

where sgN (X) is a function for obtaining the sign of X. SgN (X) returns 1 in a case that X is 0 or greater and returns −1 in a case that X is smaller than 0.

Note that Equation A43 is used in a case that md is a power of 2.

if $(md*\text{abs}(T0)>mn*\text{abs}(T1))T0=sgN(T0)*mn*\text{abs}(T1)>>\log 2(md)$ if $(md*\text{abs}(T1)>mn*\text{abs}(T0))T1=sgN(T1)*mn*\text{abs}(T0)>>\log 2(md)$ (Equation A43)

where mn represents a numerator of a fraction, and md represents a denominator of a fraction. Examples of mn and md include, but not limited to, mn=2, md=1 (two times), and mn=3, md=2 (1.5 times).

(STEP 2: Flag Indicating Presence/Absence of Gradient Correction Depending on Distance Between Target Image and Reference Image)

The gradient product derivation unit 309121 may determine whether to perform the gradient correction depending on the distance between the target image and the reference image in accordance with the picture-distance-dependent gradient flag bio_pic_disT (a prescribed flag) included the in coded data.

That is, in a case that the picture-distance-dependent gradient flag bio_pic_dist is 1 (first value), the gradient product derivation unit 309121 determines the weight coefficients for multiplying the pixel values of the gradient images lx0, lx1, ly0, and ly1 in accordance with the picture interval T0 between the target image Cur and the reference image P0, and the picture interval T1 between that target image Cur and the reference image P1. In a case that the picture-distance-dependent gradient flag bio_pic_dist is 0 (second value), the weight coefficients for multiplying the pixel values of the gradient images lx0, lx1, ly0, and ly1 may be equal to each other. For example, T0=T1=1 may be set.

To be more specific, in a case that the picture-distance-dependent gradient flag bio_pic_dist is 1 (first value), the gradient product derivation unit 309121 derives intermediate parameters s1 (s1[ ][ ]) to s6 (s6[ ][ ]) that satisfy Equation A31 (which corresponds to Equation A18). In this case, modBIO is a gradient correction term that is derived by Equation A44 (which corresponds to Equation A33).

$$\mathrm{modBIO} = \{(T0*lx0 - T1*lx1)*uh + (T0*ly0 - T1*ly1)*vh\} >> \mathrm{shiftBIO2} \quad \text{(Equation A44)}$$

On the other hand, in a case that the picture-distance-dependent gradient flag bio_pic_dist is 0 (second value), intermediate parameters s1 (s1[ ][ ]) to s6 (s6[ ][ ]) that satisfy the equation illustrated in FIG. 20B are derived. In this case, modBIO is a gradient correction term that is derived by Equation A26.

(STEP 2: Determination of Weight Coefficient for Each Block)

The gradient product derivation unit 309121 may be configured to determine the weight coefficients for multiplying the pixel values of the gradient images lx0, lx1, ly0, and ly1 for each block. For example, the gradient product derivation unit 309121 may derive intermediate parameters s1 (s1[ ][ ]) to s6 (s6[ ][ ]) that satisfy Equation A31 for each fixed (for example, 4×4) block.

The gradient correction coefficient derivation unit 309122 derives the correction weight vector (u, v) by use of the derived intermediate parameters s1 (s1[ ][ ]) to s6 (s6[ ][ ]).

By deriving the intermediate parameters s1 (s1[ ][ ]) to s6 (s6[ ][ ]) for each block in the above-mentioned manner, an effect of reduction in variation of the intermediate parameters s1 (s1[ ][ ]) to s6 (s6[ ][ ]), and in turn, noise reduction, can be expected. In addition, the process of STEP 2 can be performed by performing a single computation for each block (for example, a block including 16 pixels), and thus the computation amount required for the process of STEP 2 can be reduced.

In addition to the above-mentioned determination of the correction weight vector (u, v) for each block (for example, 4×4 block), the gradient product derivation unit 309121 may derive the correction weight vector (u, v) of a certain pixel by applying a filter (for example, an interpolation filter) to the derived correction weight vector (u, v).

For example, the correction weight vector (u, v) of a certain pixel may be derived by weighted averaging of the correction weight vector (u, v) of N×N block unit as follows:

$$u(x,y) = (w00*u(x,y) + w10*u(x+N,y) + w01*u(x,y+N) + w11*u(x+N,y+N)) >> n$$

$$v(x,y) = (w00*v(x,y) + w10*v(x+N,y) + w01*v(x,y+N) + w11*v(x+N,y+N)) >> n \quad \text{(Equation A45)}.$$

As the weight coefficient of linear prediction, the weight may be as follows, for example.

$$n = \log 2(N) + 1$$

$$w1x = x \& (N-1)$$

$$w0x = N - w1$$

$$w1y = x \& (N-1)$$

$$w0y = N - w1$$

$$w00 = w0x*w0y, w10 = w1x*w0y, w01 = w0x*w1y, w11 = w1x*w1y$$

In addition, in a case that the correction weight vector (u, v) of N×N block unit is compressed by 1/N and stored, the derivation may be performed by Equation A46 with the correction vector thereof set to (u0, v0).

$$u(x,y) = (w00*u0(x,y) + w10*u0(x+1,y) + w01*u0(x,y+1) + w11*u0(x+1,y+1)) >> n$$

$$v(x,y) = (w00*v0(x,y) + w10*v0(x+1,y) + w01*v0(x,y+1) + w11*v0(x+1,y+1)) >> n \quad \text{(Equation A46)}$$

While the two-dimensional weighted averaging is performed by a single process in Equation A45 and Equation A46, the two-dimensional weighted averaging may be performed by a two-stage process. That is, the two-dimensional weighted averaging may be achieved in such a manner that a temporary image is generated by a vertical weighted averaging and then a horizontal weighted averaging is performed on the generated temporary image. Alternatively, the horizontal weighted averaging and the vertical weighted averaging may be performed in this order.

Further, the gradient product derivation unit 309121 may derive the correction weight vector (u, v) of each pixel by applying a prescribed filter to the correction weight vector (u, v)(weight coefficient) determined for each block (for example, 4×4 block). Examples of the prescribed filter include a lowpass filter (for example, a smoothing filter).

For example, the correction weight vector (u, v) of a certain pixel is derived as follows.

$$u\mathrm{temp}(x,y) = (u(x,y-1) + 2*u(x,y) + u(x,y+1))$$

$$u(x,y) = (u\mathrm{temp}(x-1,y) + 2*u\mathrm{temp}(x,y) + u\mathrm{temp}(x+1,y)) >> 4$$

$$v\mathrm{temp}(x,y) = (v(x,y-1) + 2*v(x,y) + v(x,y+1))$$

$$v(x,y) = (v\mathrm{temp}(x-1,y) + 2*v\mathrm{temp}(x,y) + v\mathrm{temp}(x+1,y)) >> 4 \quad \text{(Equation A47)}$$

In this manner, by applying a prescribed filter to the correction weight vector (u, v)(weight coefficient) determined for each block (for example, 4×4 block) after the noise of the intermediate parameters s1 (s1[ ][ ]) to s6 (s6[ ][ ]) derived for each block is reduced, motion compensation that is applicable also to small motion can be performed.

(STEP 2: Adaptive Clip Processing of Gradient Correction Coefficient)

As described above, the gradient correction coefficient derivation unit 309122 performs clip processing on gradient correction coefficients uh and vh (weight coefficients) for multiplying the pixel values of the gradient images lx0, lx1, ly0, and ly1. The gradient correction coefficient derivation unit 309122 may switch the range (value range) (−rangeBIO to rangeBIO) of the clip processing to be performed on the derived gradient correction coefficients uh and vh between the case where the above-mentioned filter set 1 is applied in STEP 1 and the case where the above-mentioned filter set 2 is applied in STEP 1, from among multiple candidate ranges. In addition, the range may be derived in accordance with the parameter.

The optical flow (gradient variation) is a technique based on the assumption that approximation can be achieved by using a first order differential (i.e. gradient) with respect to variation in a local region. Accordingly, it can be said that, essentially, the optical flow (gradient variation) is a technique that is applicable only to the case where the correction weight vector (u, v) (and, gradient correction coefficients uh and vh) is small. In view of this, a process of clipping the correction weight vector (u, v) in a relatively small range is appropriate.

However, when the filter set 2 (for example, a low-resolution filter) is applied in STEP 1, a gradient in a relatively wide range, that is, a relatively large correction weight vector (u, v) can be detected. Therefore, when the filter set 2 is applied, the range of the clip processing to be performed on the gradient correction coefficients uh and vh may be widened in comparison with the case where the filter set 1 that assumes detection of a relatively small correction weight vector (u, v) is applied.

The motion compensation unit 3091 includes the gradient derivation unit 309112 (first switching unit) that switches the gradient filter for deriving the gradient images lx0, lx1, ly0, and ly1, and further, the gradient correction coefficient derivation unit 309122 (clip unit) may switch the range of the clip processing in accordance with gradient filter selected by the gradient derivation unit 309112.

Figure 31A:
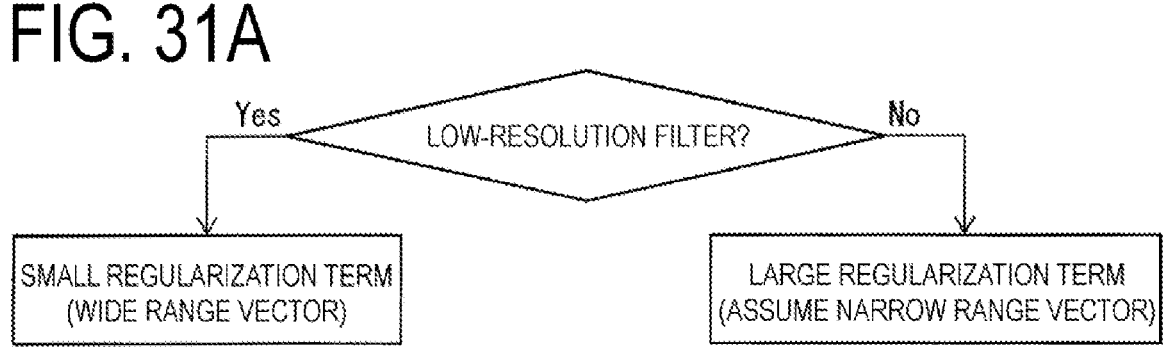
FIG. 31A is a drawing illustrating an example of switching a regularization term depending on a filter set.
Figure 31B:
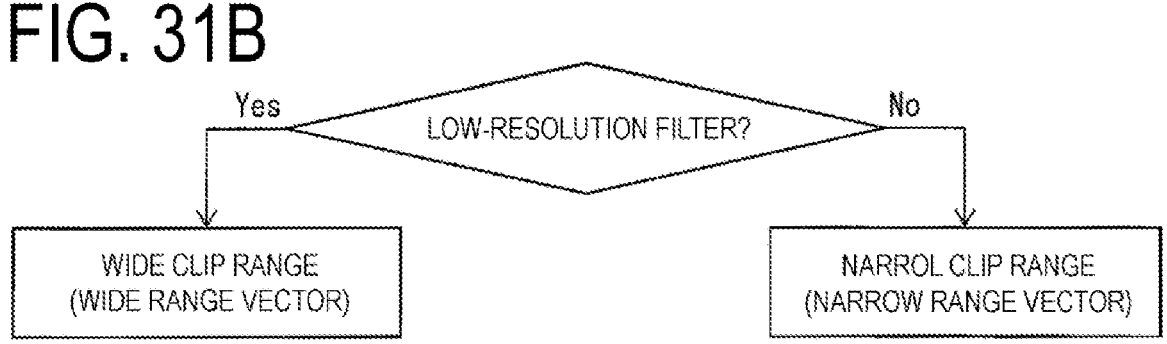
FIG. 31B is a drawing illustrating an example of switching unit a range of clip processing depending on the filter set.

That is, as illustrated in FIG. 31B, in the gradient correction coefficient derivation unit 309122 configured to be capable of switching multiple filter sets, the range of the clip processing to be performed on the gradient correction coefficients uh and vh can be changed based on the selected filter set.

While the range of the clip processing is switched between two ranges in the following example, three or more ranges of the clip processing, for example, a large range, a middle range, and a small range may be switched by setting the number of classifications to three or more.

While a parameter X and a prescribed threshold are classified by comparison in a case that the range of the clip processing is switched based on the size of the parameter X in the following description, the index idx for identification may be derived directly from the parameter X by division, shift, table reference or the like. Further, it is also possible to adopt a method of determining the range of the clip processing with reference to the table based on the derived index idx. For example, used are, as X, resolution, block size, frame rate, motion vector, picture interval, quantization step (quantization parameter), a combination thereof or the like. Note that the specific examples of the process are already described in the description of the configuration of switching the filter sets, and therefore the description thereof is omitted.

(STEP 2: Switching of Range of Clip Processing Depending on Resolution)

In a case that the resolution of the motion compensation images P0 and P1 is high, the length of the entire motion vector tends to be large, and it is therefore preferable to apply clip processing set to a relatively wide range. On the other hand, in a case that the resolution of the motion compensation images P0 and P1 is low, it is preferable to apply clip processing set to a relatively narrow range.

In view of this, the gradient correction coefficient derivation unit 309122 may be configured to derive the range of the clip processing in accordance with the resolution of the motion compensation images P0 and P1. To be more specific, the gradient correction coefficient derivation unit 309122 may be configured to use a clip having a relationship in which the greater the resolution, the greater the range of the clip processing. Note that, regarding the configuration in which the greater the X, greater the Y, it is only necessary that Y1≥Y0 be satisfied wherein Y0 and Y1 respectively correspond to X0 and X1 that satisfy X1>X0. Accordingly, the same Y (Y0=Y1) can be used even with two Xs (X0, X1) of the relationship in which X is large (X0>X1). It should be noted that Y of at least two values is required to be used in the range of X.

For example, the gradient correction coefficient derivation unit 309122 may set the range of the clip processing to −MVTH0 to MVTH0 (for example, MVTH0=2) in a case that the resolution of the motion compensation images P0 and P1 is equal to or greater than a prescribed threshold TH (for example, 1920×1080 or greater), and may set the range of the clip processing to −MVTH1 to MVTH1 (for example, MVTH1=⅓) in a case that the resolution is equal to or lower than the prescribed threshold TH (for example, lower than 1920×1080).

(STEP 2: Switching of Range of Clip Processing Depending on Block Size)

In a case that the size of the block including the target pixel is large, the length of the entire motion vector tends to be large, and it is therefore preferable to apply clip processing set to a relatively wide range. On the other hand, in a case that the size of the block including the target pixel is small, it is preferable to apply clip processing set to a relatively narrow range.

In view of this, the gradient correction coefficient derivation unit 309122 may be configured to switch the range of the clip processing in accordance with the size of the block including the target pixel for derivation of the gradient image. To be more specific, the gradient correction coefficient derivation unit 309122 may be configured to use a clip having a relationship in which the greater the block size, the greater the range of the clip processing.

For example, the gradient correction coefficient derivation unit 309122 may set the range of the clip processing to −2 to 2 or the like in a case that the block size of the block including the target pixel included in the motion compensation images P0 and P1 is equal to or greater than a prescribed threshold (for example, 16×16 or greater), and may set the range of the clip processing to −⅔ to ⅔ or the like in a case that the block size of the block including the target pixel is smaller than the prescribed threshold (for example, smaller than 16×16).

(STEP 2: Switching of Range of Clip Processing Depending on Frame Rate)

In a case that the frame rate of the motion compensation images P0 and P1 is small, and the resolution/frame rate is large, the length of the entire motion vector tends to be large, and it is therefore preferable to apply clip processing set to a relatively wide range.

In view of this, the gradient correction coefficient derivation unit 309122 may be configured to switch the range of the clip processing in accordance with the frame rate FrameRate of the motion compensation images P0 and P1. To be more specific, the gradient correction coefficient derivation unit 309122 may be configured to use a clip having a relationship in which the smaller the frame rate FrameRate (the greater the resolution/frame rate), the greater the range of the clip processing.

For example, the gradient correction coefficient derivation unit 309122 may set the range of the clip processing to −2 to 2 or the like in a case that the frame rate is equal to or smaller than a prescribed threshold (for example, FrameRate<=TH, TH=60), and may set the range of the clip processing to −⅔ to ⅔ or the like in a case that the frame rate is greater than the prescribed threshold (for example, FrameRate>TH).

Alternatively, the range of the clip processing may be set to −2 to 2 in a case that the resolution/frame rate of the motion compensation images P0 and P1 is greater than the prescribed threshold (for example, Width/FrameRate>TH, TH=1920/60=32), and the range of the clip processing may be set to −⅔ to ⅔ in a case that the resolution/frame rate is equal to or smaller than the prescribed threshold (for example, Width/FrameRate<=TH).

(STEP 2: Switching of Range of Clip Processing Depending on Motion Vector)

In the case where the difference from the motion vector MV of the neighboring block (and motion vector mvLX) is large, variation of the motion vector in the target block tends to be relatively large. Therefore, in this case, the range of the clip processing may be widened so as to capture the gradient in the relatively wide range.

In view of this, the gradient correction coefficient derivation unit 309122 may be configured to switch the range of the clip processing in accordance with the difference between the motion vector MV (mvLX) of the target block and the prediction vector PMV (prediction motion vector, mvpLX) of the target block. To be more specific, the gradient correction coefficient derivation unit 309122 may be configured to use a clip having a relationship in which the greater the difference vector DMV, the greater the range of the clip processing.

For example, the gradient correction coefficient derivation unit 309122 may set the range of the clip processing to −2 to 2 or the like in a case that the difference vector DMV is equal to or greater than a prescribed threshold, and may set the range of the clip processing to −⅔ to ⅔ or the like in a case that the difference vector DMV is smaller than the prescribed threshold.

The "the difference between the motion vector MV (mvLX) of the target block and the prediction vector PMV (prediction motion vector, mvpLX) of the target block" may be a difference vector DMV (mvdLX), or a difference absolute value absDMV obtained by the following Equation.

absDMV=|MVx−PMVx|+|MVy−PMVy|

In addition, the prediction vector PMV may be a collocate motion vector (that is, the motion vector of the previous picture at the same position), the motion vector of the left block, or the motion vector of the upper block.

Note that the gradient correction coefficient derivation unit 309122 may be configured to switch the range of the clip processing in accordance with the "motion vector mvLX of the target block" instead of "the difference from the motion vector MV of the neighboring block". To be more specific, the gradient correction coefficient derivation unit 309122 may be configured to use a clip having a relationship in which the greater the motion vector mvLX, the greater the range of the clip processing.

(STEP 2: Switching of Range of Clip Processing Depending on Inter-Picture Distance)

In a case that the inter-picture distance deltaPOC is large, the length of the entire motion vector tends to be large, and therefore the range of the clip processing may be widened so as to capture the gradient in the relatively wide range.

In view of this, the gradient correction coefficient derivation unit 309122 may be configured to switch the range of the clip processing in accordance with the inter-picture distance between the target image Cur including the target block, and at least one of the motion compensation images P0 and P1 (or, the L0 reference image refImgL0 and the L1 reference image refImgL1). To be more specific, the gradient correction coefficient derivation unit 309122 may be configured to use a clip having a relationship in which the greater the inter-picture distance, the greater the range of the clip processing.

For example, the gradient correction coefficient derivation unit 309122 may set the range of the clip processing to −2 to 2 or the like in a case that the inter-picture distance is equal to or greater than a prescribed threshold, and may set the range of the clip processing to −⅔ to ⅔ or the like in a case that the inter-picture distance is smaller than the prescribed threshold.

(STEP 2: Switching of Range of Clip Processing Depending on Quantization Step)

In a case that the quantization step of the target block for generation of the target image Cur is large, the reliability of variation in a small region is considered to be low. Therefore, in this case, the range of the clip processing may be widened so as to capture the gradient in the relatively wide range.

In view of this, the gradient correction coefficient derivation unit 309122 may switch the range of the clip processing in accordance with the quantization step of the motion compensation image P0 (or the L0 reference image refImgL0), and the quantization step of the motion compensation image P1 (or the L1 reference image refImgL1).

Further, the range of the clip processing may be switched in accordance with the quantized coefficients of the target block of the target image Cur.

That is, the gradient correction coefficient derivation unit 309122 may be configured to switch the range of the clip processing in accordance with the quantized coefficients or the quantization step. To be more specific, the gradient correction coefficient derivation unit 309122 may be configured to use a clip having a relationship in which the greater the quantization step, the greater the range of the clip processing.

For example, the gradient correction coefficient derivation unit 309122 may set the range of the clip processing to −2 to 2 or the like in a case that the quantization step is equal to or greater than a prescribed threshold, and may set the range of the clip processing to −⅔ to ⅔ or the like in a case that the quantization step is smaller than the prescribed threshold.

(STEP 2: Switching of Range of Clip Processing with Reference to Flag)

The gradient correction coefficient derivation unit 309122 may be configured to switch the range of the clip processing with reference to a flag as explicit signaling.

For example, the entropy reference coding unit 104 codes the filter set index of the filter set to be used in the slice header SH and the picture parameter set PPS. The gradient correction coefficient derivation unit 309122 may be configured to switch the range of the clip processing based on the filter set index decoded from the slice header SH and the picture parameter set PPS.

(STEP 2: Adaptive Switching of Regularization Term)

As described above, the gradient correction coefficient derivation unit 309122 adds the regularization term regcost to the intermediate parameters s1 to s6 derived by the gradient product derivation unit 309121. The gradient correction coefficient derivation unit 309122 may switch the value of the regularization term regcost to be added to intermediate parameters s1 to s6 between the case where the above-mentioned filter set 1 is applied in STEP 1 and the case where the above-mentioned filter set 2 is applied in STEP 1 as follows.

The regularization term regcost is added to the intermediate parameters s1 to s6 to suppress the size of the correction weight vector (u, v) (to bring it closer to 0). When the filter set 2 (for example, a low-resolution filter) is applied in STEP 1, a gradient in a relatively wide range, that is, a relatively large correction weight vector (u, v) can be detected, and therefore, when the filter set 2 is applied, the correction weight vector (u, v) to be derived may be set to a wide range by setting the value of the regularization term regcost to be added to the intermediate parameters s1 to s6 to a small value. Conversely, when the filter set 1 is applied, the correction weight vector (u, v) to be derived may be set to a small range by setting the value of the regularization term regcost to be added to the intermediate parameters s1 to s6 to a large value. Note that regularization with the value of the regularization term regcost set to a large value is called "strong regularization", and regularization with the value of the regularization term regcost set to a small value is called "weak regularization".

That is, in the gradient correction coefficient derivation unit 309122 configured to be capable of switching multiple filter sets, the value of the regularization term regcost may be changed based on the selected filter set as illustrated in FIG. 31A. To be more specific, the gradient correction coefficient derivation unit 309122 uses regularization having a relationship in which the lower the accuracy of the filter set, the smaller the regularization term.

The motion compensation unit 3091 includes the gradient derivation unit 309112 (first switching unit) that switches the gradient filter used for deriving the gradient images lx0, lx1, ly0, and ly1, and further, the gradient correction coefficient derivation unit 309122 (second switching unit) may switch the value of the regularization term regcost in accordance with the gradient filter selected by gradient derivation unit 309112.

That is, similarly to the configuration of the above-described gradient correction coefficient derivation unit 309122 that switches the range of the clip processing, the gradient correction coefficient derivation unit 309122 may be configured to switch the value of the regularization term regcost.

While two regularization terms are switched in the following example, three or more regularization terms, for example, a large regularization term, a middle regularization term, a small regularization term may be switched by setting the number of the classifications to three or more.

While X and a prescribed threshold are classified by comparison in a case that the regularization term is switched based on the size of the parameter X in the following description, the index idx for identification may be derived directly from the parameter X by division, shift, table reference or the like. Further, it is also possible to adopt a method of determining the regularization term with reference to the table based on the derived index idx. For example, used are, as X, resolution, block size, frame rate, motion vector, picture interval, quantization step (quantization parameter), a combination thereof or the like. Note that the specific examples of the process are already described in the description of the configuration of switching the filter sets, and therefore the description thereof is omitted.

(STEP 2: Switching of Regularization Term Depending on Resolution)

The gradient correction coefficient derivation unit 309122 may be configured to switch the regularization term in accordance with the resolution of the motion compensation images P0 and P1. To be more specific, the gradient correction coefficient derivation unit 309122 may be configured to use regularization having a relationship in which the higher the resolution, the smaller the regularization term.

For example, as illustrated in of FIG. 31A, the gradient correction coefficient derivation unit 309122 may set the regularization term regcost to a small value and perform weak regularization such that a relatively large correction weight vector (u, v) can be derived in a case that the resolution of the motion compensation images P0 and P1 is high, that is, equal to or greater than a prescribed threshold TH (for example, 1920×1080 or greater). The gradient correction coefficient derivation unit 309122 may set the regularization term regcost to a value greater than that of the case where the resolution is high and perform strong regularization in a case that the resolution is low, that is, lower than the prescribed threshold TH (for example, lower than 1920×1080).

(STEP 2: Switching of Regularization Term Depending on Block Size)

The gradient correction coefficient derivation unit 309122 may be configured to switch the regularization term in accordance with the size of the block including the target pixel for derivation of the gradient image. To be more specific, the gradient correction coefficient derivation unit 309122 may be configured to use regularization having a relationship in which the greater the block size, the smaller the regularization term.

For example, the gradient correction coefficient derivation unit 309122 may set the regularization term regcost to a small value and perform weak regularization such that a relatively large correction weight vector (u, v) can be derived in a case that the block size of the block including the target pixel included in the motion compensation images P0 and P1 is equal to or greater than a prescribed threshold (for example, 16×16 or greater). The gradient correction coefficient derivation unit 309122 may set the regularization term regcost to a large value and perform strong regularization in a case that the block size of the block including the target pixel is smaller than the prescribed threshold (for example, smaller than 16×16).

(STEP 2: Switching of Regularization Term Depending on Frame Rate)

The gradient correction coefficient derivation unit 309122 may be configured to switch the regularization term in accordance with the frame rate FrameRate of the motion compensation images P0 and P1. To be more specific, the gradient correction coefficient derivation unit 309122 may be configured to use regularization having a relationship in which the smaller the frame rate, the smaller the regularization term.

For example, the gradient correction coefficient derivation unit 309122 may set the regularization term regcost to a relatively small value and perform weak regularization such that a relatively large correction weight vector (u, v) can be derived in a case that the frame rate is equal to or smaller than a prescribed threshold (for example, FrameRate<=TH, TH=60). The gradient correction coefficient derivation unit 309122 may set the regularization term regcost to a large value and perform strong regularization in a case that the frame rate is greater than the prescribed threshold (for example, FrameRate>TH).

(STEP 2: Switching of Regularization Term Depending on Motion Vector)

The gradient correction coefficient derivation unit 309122 may be configured to switch the regularization term in accordance with the difference between the motion vector MV (mvLX) of the target block and the prediction vector PMV (prediction motion vector, mvpLX) of the target block. To be more specific, the gradient correction coefficient derivation unit 309122 may be configured to use regularization having a relationship in which the greater the difference vector, the smaller the regularization term.

For example, the gradient correction coefficient derivation unit 309122 may set the regularization term regcost to a small value and perform weak regularization such that a relatively large correction weight vector (u, v) can be derived in a case that the difference vector DMV is equal to or greater than a prescribed threshold. The gradient correction coefficient derivation unit 309122 may set the regularization term regcost to a large value and perform strong regularization in a case that the difference vector DMV is smaller than the prescribed threshold.

Note that the gradient correction coefficient derivation unit 309122 may be configured to switch the regularization term in accordance with the motion vector mvLX of the target block.

(STEP 2: Switching of Regularization Term Depending on Inter-Picture Distance)

The gradient correction coefficient derivation unit 309122 may be configured to switch the regularization term in accordance with the inter-picture distance between the target image Cur including the target block and at least one of the motion compensation images P0 and P1 (or, the L0 reference image refImgL0 and the L1 reference image refImgL1). To be more specific, the gradient correction coefficient derivation unit 309122 may be configured to use regularization having a relationship in which the greater the picture interval, the smaller the regularization term.

For example, the gradient correction coefficient derivation unit 309122 may set the regularization term regcost to a small value and perform weak regularization such that a relatively large correction weight vector (u, v) can be derived in a case that the inter-picture distance is equal to or greater than a prescribed threshold. The gradient correction coefficient derivation unit 309122 may set the regularization term regcost to a large value and perform strong regularization in a case that the inter-picture distance is smaller than the prescribed threshold.

(STEP 2: Switching of Regularization Term Depending on Quantization Step)

The gradient correction coefficient derivation unit 309122 may switch the regularization term in accordance with the quantization step of the motion compensation image P0 (or the L0 reference image refImgL0), and the quantization step of the motion compensation image P1 (or the L1 reference image refImgL1). To be more specific, the gradient correction coefficient derivation unit 309122 may be configured to use regularization having a relationship in which the greater the quantization step, the smaller the regularization term.

For example, the gradient correction coefficient derivation unit 309122 may set the regularization term regcost to a small value and perform weak regularization such that a relatively large correction weight vector (u, v) can be derived in a case that the quantization step is equal to or greater than a prescribed threshold. The gradient correction coefficient derivation unit 309122 may set the regularization term regcost to a large value and perform strong regularization in a case that the quantization step is smaller than the prescribed threshold.

(STEP 2: Switching of Regularization Term with Reference to Flag)

The gradient correction coefficient derivation unit 309122 may be configured to switch the regularization term with reference to a flag as explicit signaling.

For example, the gradient correction coefficient derivation unit 309122 may be configured to switch the regularization term based on the filter set index decoded from the slice header SH and the picture parameter set PPS.

(Motion Vector Derivation Using Matching Mode)

The inter-prediction parameter decoding control unit 3031 of the inter-prediction parameter decoding unit 303 (prediction vector calculation unit) and the like may be configured to select the prediction mode for deriving the motion vector mvLX from among a merge mode, an AMVP mode, and a matching mode (an FRUC mode, a matching prediction mode) (see FIG. 6). Alternatively, it is possible to adopt a configuration in which a matching prediction parameter derivation unit (not illustrated) that selects the mode used for derivation of the motion vector mvLX by the inter-prediction parameter decoding control unit 3031 is provided separately from the inter-prediction parameter decoding control unit 3031.

Figure 30:
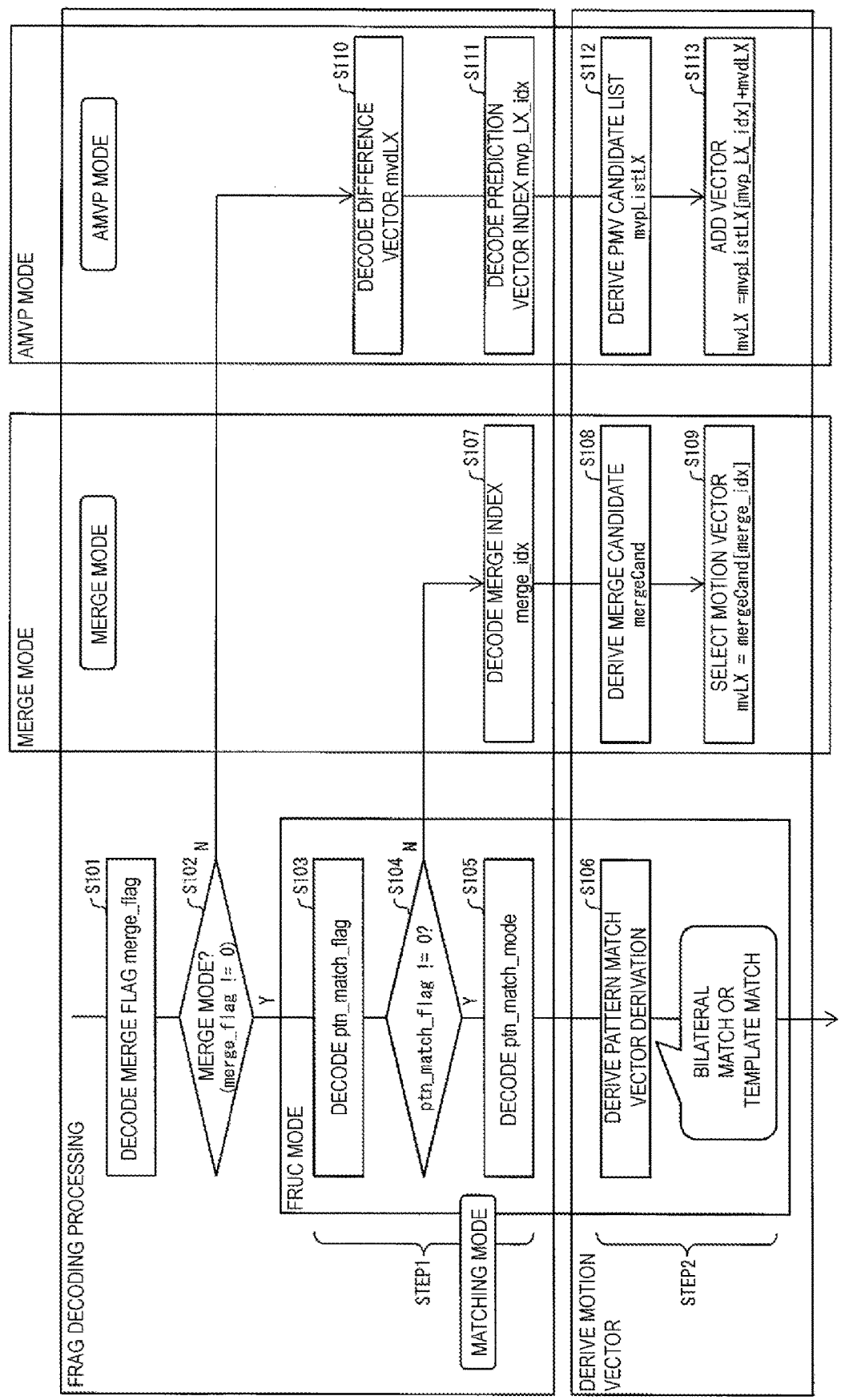
FIG. 30 is a flowchart illustrating a motion vector derivation processing.

A motion vector derivation process of the inter-prediction parameter decoding unit 303 is described with reference to FIG. 30. FIG. 30 is a flowchart illustrating a motion vector derivation processing.

In the following description, processes are performed by the inter-prediction parameter decoding unit 303 unless otherwise noted.

First, the merge flag merge_flag is decoded at step S101, and merge_flag !=0 ? is determined at step S102.

In a case that merge_flag !=0 is true (Y at S102), the flag ptn_match_flag that indicates whether the matching mode (matching prediction mode) is used is decoded at step S103, and ptn_match_flag !=0 is determined at step S104.

In a case that ptn_match_flag !=0 is true (Y at S104), ptn_match_mode that is a syntax indicating the type of the matching mode is decoded at S105. Subsequently, at step S106, the matching mode designated by ptn_match_mode is executed. In ptn_match_mode==1, the bi-prediction matching is selected, and in ptn_match_mode==2, the template matching is selected. In the matching mode, for example, the motion vector is derived by matching of the blocks in multiple reference images on the assumption that the object performs uniform motion. For example, it is assumed that, regarding the object, the block BLK0 of the L0 reference image and the block BLK1 of the L1 reference image pass through the target block BLKCUR. In this case, on the assumption that the trajectory connecting the block BLK0 of the L0 reference image and the block BLK1 of the L1 reference image passes through the target block BLKCUR, comparison (matching) between the block BLK0 of the L0 reference image and the block BLK1 of the L1 reference image is performed, and the block where the difference therebetween is small is searched and selected. In this case, the motion vector of the target block with respect to the L0 reference image is derived from the positional relationship between the block BLK0 of the L0 reference image and the target block, and the motion vector of the target block with respect to the L1 reference image is derived from the positional relationship between the block BLK1 of the L1 reference image and the target block. The above-mentioned matching mode is referred to as "bi-prediction matching". In addition, as well as "bi-prediction matching", "template matching" may be used as the matching mode. In the template matching, on the assumption that the motion of the object does not change at the block boundary, the difference (matching) between a neighbor region (for example, a template region having an inverted L-shape with the upper line and the left line of the target block) of the target block on the target image, and the template region (=region having an inverted L-shape) on the reference image is obtained, and a motion vector indicated by the block where the difference is smallest is searched. On the assumption that the motion vector in the neighbor region (template region) of the target block obtained by the search coincides with the motion vector of the target block, the derived motion vector is used as the motion vector of the target block.

On the other hand, at step S102, in a case that merge flag !=0 is false (N at S102), an AMVP mode is selected. To be more specific, with the inter-prediction parameter decoding unit 303, the difference vector mvdLX is decoded at S110, and the prediction vector index mvp_LX_idx is decoded at S111. Further, at S112, the PMV candidate list mvpListLX is derived. Subsequently, at S113, the motion vector mvLX is derived by "mvLX=mvpListLX[mvp_LX_idx]+mvdLX".

In addition, at step S104, in a case that ptn_match_flag !=0 is false, the inter-prediction parameter decoding unit 303 decodes the merge index merge_idx at S107. Subsequently the inter-prediction parameter decoding unit 303 derives the merge candidate list mergeCandList at S108, and derives the motion vector mvLX at S109 by "mvLX=mergeCand[merge_idx]".

(STEP 2: Switching of Regularization Term with Reference to Flag)

In the matching prediction, when a small unit (for example, ¼ pixel, ⅛ pixel, or ¹⁄₁₆ pixel) is used as the accuracy of the search of the motion vector, the accuracy of the prediction image is increased, but the amount of the processing is also increased. In a case that the accuracy of the search of the motion vector is set to a low accuracy (for example, 1 pixel or ½ pixel), the amount of the processing can be suppressed but the accuracy of the prediction image is reduced. Incidentally, in a configuration using both the matching prediction and the BIO prediction, specifically, a configuration in which the BIO prediction is performed after the matching prediction, it is considered that the motion compensation image derived by the motion vector obtained by the matching can be corrected by the BIO prediction. It is considered that, in such a configuration, even if the motion vector has a low accuracy in the matching prediction, correction can be achieved in the BIO prediction by the correcting motion vector (=correction weight vector (u, v)) having a high accuracy derived pixel by pixel from the gradient derived pixel by pixel.

In the case where motion compensation by the BIO prediction is introduced in the image decoding device 31 that performs derivation of the motion vector mvLX using (selecting) the matching mode, the motion compensation unit 3091 may set the accuracy of the search for deriving the motion vector MV (motion vector mvLX) in the matching mode to a low accuracy (for example, 1 pixel or ½ pixel) in a case that the BIO prediction is applied. That is, the accuracy of the motion vector used for derivation of the motion compensation image may be changed in accordance with whether the BIO prediction is applied.

FIG. 32 illustrates comparison between prediction accuracies of the BIO prediction mode and the matching mode. As illustrated in FIG. 32, while the range of the motion vector MV to which the BIO prediction is applicable, that is, the correction weight vector (u, v), is, for example, as small as about ⅔ pel at maximum, the unit of the spatial correction (block size) can be set to 1×1 pixel (that is, pixel by pixel). In addition, in the BIO prediction, the accuracy of the correction of the motion vector MV (the accuracy of the motion compensation vector (u, v) and the like) is high, and can be ¹⁄₆₄ with shiftBIO=6, and ¹⁄₂₅₆ with shiftBIO=8, for example.

In the matching mode, while the applicable range of the motion vector MV is, for example, as large as about 4 pel at maximum, a relatively large block is necessary for verification of the matching, and therefore the unit of the spatial correction is about 8×8 pixel (that is, block by block). In addition, in the BIO prediction, it is difficult to increase the accuracy of the correction of the motion vector MV from the view point of the amount of the processing, and as such the accuracy is, for example, about ⅛ at maximum.

In view of this, in the case where both the matching mode and the BIO prediction are used, the accuracy of the vector obtained in the matching mode may be low. That is, the accuracy of the search of the motion vector MV in the matching mode may be lower than the accuracy (for example, ¼ pel) of the motion vector derived in the AMVP mode. That is, in the case where the motion vector used for derivation of the motion compensation image is derived by the AMVP mode in ¼ pixel unit for example, the vector may be derived in ½ pixel unit in the matching prediction that is used together with the BIO prediction (the BIO prediction is performed at the succeeding stage). By setting the accuracy of the search of the motion vector MV in the matching mode to a value lower than the accuracy (for example, ¼ pel) of the motion vector derived in the AMVP mode, the ease of the search of the motion vector in the matching mode is advantageously increased. Note that the portions that do not corrected in the matching mode do not cause problems since the portions are corrected later in the motion compensation using the BIO prediction.

In addition, by preliminarily performing a rough (in unit of 1 pel or ½ pel) correction (adjustment) of the motion vector MV in the matching mode, the correction can be sufficiently achieved even with motion compensation using the BIO prediction, which can correct only small motions, by the combination of the matching mode and the BIO prediction.

Note that the BIO prediction is performed on the assumption that the gradient is constant in a relatively small range, that is, a range in which the correction weight vector (u, v) is small, and therefore does not favorably operate in a case that the assumption does not hold with a large correction weight vector (u, v). However, in the configuration in which the BIO prediction is performed after the matching prediction, by deriving (correcting) the motion vector with a certain search accuracy (for example, 1 pixel or ½ pixel) through the matching, it is expected that the correction weight vector (u, v) is equal to or smaller than the search accuracy.

(Switching of Operation of Matching Mode According to BIO Flag)

In the case where motion compensation by the BIO prediction is introduced in the image decoding device 31 that performs derivation of the motion vector mvLX using the matching mode, the motion compensation unit 3091 may change the accuracy of the search for deriving the motion vector MV (motion vector mvLX) in the matching mode in accordance with whether the BIO prediction is applied.

In a case that the BIO flag decoded by the inter-prediction parameter decoding unit 303 indicates that the motion compensation unit 3091 executes the motion compensation using the BIO prediction (hereafter "BIO-on"), the inter-prediction parameter decoding unit 303 sets the search accuracy of the search of the motion vector in the matching mode to N pel (for example, 1 pel or ½ pel). On the other hand, in a case that the BIO flag indicates that the motion compensation using the BIO prediction is not executed (hereafter "BIO-off"), the inter-prediction parameter decoding unit 303 sets the search accuracy of the search of the motion vector in the matching mode to M pel (for example, ¼ or ⅛ pel). Here, N>M holds.

Alternatively, in the case where motion compensation by the BIO prediction is introduced in the image decoding device 31 that performs derivation of the motion vector mvLX using the matching mode, the motion compensation unit 3091 may change the size of the block for deriving the motion vector MV in the matching mode (motion vector mvLX) in accordance with whether the BIO prediction is applied.

For example, in the case of BIO-on, the inter-prediction parameter decoding unit 303 may have a configuration in which the search accuracy of the search of the motion vector in the matching mode is a relatively large block (prediction unit PU), and the search is not performed in unit of sub-block (for example, 4×4) that is a small block making up the prediction block. On the other hand, in the case of BIO-off, the search of the motion vector in the matching mode may be performed for each sub-block that is a relatively small block.

Note that the BIO flag may be a flag coded for each sequence, a flag coded for each sequence parameter set SPS, a flag coded for each picture parameter set PPS, or a flag coded for each block.

Now the following describes a configuration having multiple modes, for example, the bi-prediction matching mode and the template matching mode, as the above-mentioned matching mode in the case where motion compensation by the BIO prediction is introduced in the image decoding device 31 that performs derivation of the motion vector mvLX using the matching mode. Both the bi-prediction matching mode and the BIO prediction mode assume that the object performs uniform motion through multiple reference pictures (regarding the BIO prediction, the assumption that the time variation, as well as the gradient variation, is constant in a certain range), and accordingly, in the case where the bi-prediction matching mode is used as the matching mode, also the BIO prediction is considered to be effective.

Accordingly, the motion compensation unit 3091 may perform the motion compensation using the BIO prediction based on whether the prediction mode decoded by the inter-prediction parameter decoding unit 303 is the bi-prediction matching. In other words, the motion compensation unit 3091 may perform the motion compensation using the BIO prediction based on whether the prediction mode selected by the inter-prediction parameter decoding unit 303 to derive the motion vector is the bi-prediction matching mode.

That is, the motion compensation unit 3091 may not perform the motion compensation using the BIO prediction (the inter-prediction parameter decoding unit 303 sets a value indicating BIO-off to BIO flag without decoding the BIO flag from the coded data) in a case that the matching mode is the template matching, whereas the motion compensation unit 3091 may perform the motion compensation using the BIO prediction (the inter-prediction parameter decoding unit 303 decodes the BIO flag from the coded data) in a case that the matching mode is the bi-prediction matching.

In addition, the motion compensation unit 3091 may not perform the motion compensation using the BIO prediction (the inter-prediction parameter decoding unit 303 sets a value indicating BIO-off to the BIO flag) in a case that the matching mode is the template matching, whereas the motion compensation unit 3091 may perform the motion compensation using the BIO prediction (the inter-prediction parameter decoding unit 303 derives a value indicating BIO-on as the BIO flag) in a case that the matching mode is the bi-prediction matching.

In the case of the template matching, the motion might not be continuous between the target image Cur and the L0 reference image refImgL0, and the target image Cur and the L1 reference image refImgL1, and as such, even in a case that the motion compensation unit 3091 executes the motion compensation using the BIO prediction, the performance of the motion compensation process is not necessarily improved. In view of this, the motion compensation unit 3091 may be configured not to perform the motion compensation using the BIO prediction in the case of the template matching. With this configuration, the processing amount required for the motion compensation of the BIO prediction executed by the motion compensation unit 3091 can be reduced.

In addition, the accuracy of the matching prediction may be changed in accordance with the matching mode in a configuration having multiple modes, for example, the bi-prediction matching mode and the template matching mode, as the above-mentioned matching mode in the case where motion compensation by the BIO prediction is introduced in the image decoding device 31 that performs derivation of the motion vector mvLX using the matching mode. That is, in the case where the matching mode is the bi-prediction mode, even in a case that the search accuracy of the motion vector is not high, the motion compensation image is corrected by the BIO prediction after the matching mode and thus a highly accurate prediction image is generated. Therefore, the unit of search of the motion vector in the matching mode may be set to a relatively large value (for example, 1 pixel or ½ pixel) in a case that the matching mode is the bi-prediction mode, and the unit of the search of the motion vector may be set to a value smaller than that of the bi-prediction matching (for example, ¼ pixel or ⅛ pixel) in a case that the matching mode is the template matching.

In addition, it is possible to adopt a configuration in which the spatial unit (block size) of the search of the matching prediction is changed in accordance with the matching mode in the case where motion compensation by the BIO prediction is introduced in the image decoding device 31 that performs derivation of the motion vector mvLX using the matching mode. To be more specific, in a case that the matching mode is the bi-prediction mode, the motion compensation image is corrected by the BIO prediction after the matching mode and thus a highly accurate prediction image is generated even in a case that the search accuracy of the motion vector is not high. Accordingly, even in a case that the spatial unit of the motion vector is relatively large, correction is performed pixel by pixel by the BIO prediction. Thus, the search unit (block size) of the motion vector in the matching mode may be relatively large (for example, 8×8 pixel or 16×16 pixel) in a case that the matching mode is the bi-prediction mode, and the spatial unit of the motion vector may be small (for example, the length of one side of a template having an inverted L-shape is 4 to 5 at minimum) in a case that the matching mode is the template matching.

(Configuration of Image Coding Device)

Figure 12:
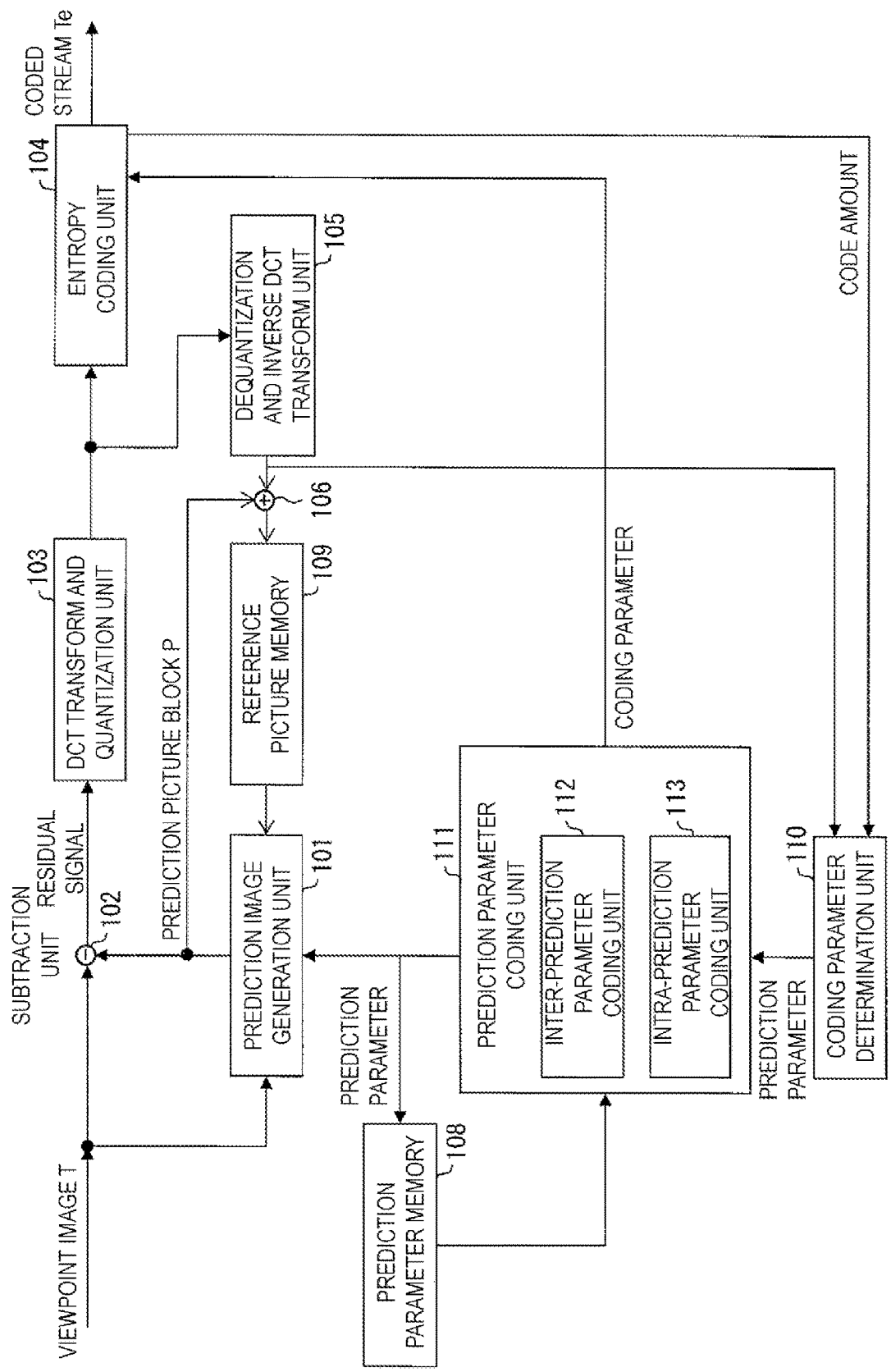
FIG. 12 is a block diagram illustrating a configuration of an image coding device according to the present embodiment.

Next, a configuration of the image coding device 11 according to the present embodiment will be described. FIG. 12 is a block diagram illustrating the configuration of the image coding device 11 according to the present embodiment. The image coding device 11 is configured to include a prediction image generation unit 101, a subtraction unit 102, a DCT and quantization unit 103, an entropy coding unit 104, a dequantization and inverse DCT unit 105, an addition unit 106, a prediction parameter memory (prediction parameter storage unit, frame memory) 108, a reference picture memory (reference image storage unit, frame memory) 109, a coding parameter determination unit 110, and a prediction parameter coding unit 111 (residual recording unit). The prediction parameter coding unit 111 is configured to include an inter-prediction parameter coding unit 112 and an intra-prediction parameter coding unit 113.

The prediction image generation unit 101 generates a prediction picture block P of a picture for each block, the picture being of a layer image T input from outside for each viewpoint, the block being an area obtained by partitioning the picture. Here, the prediction image generation unit 101 reads out a reference picture block, based on a prediction parameter input from the prediction parameter coding unit 111 from the reference picture memory 109. The prediction parameter input from the prediction parameter coding unit 111 is a motion vector or a displacement vector, for example. The prediction image generation unit 101 reads out a reference picture block of a block at a location indicated by a motion vector or displacement vector predicted with a starting point being a coding target block. The prediction image generation unit 101 generates the prediction picture block P for the read out reference picture block by use of one prediction scheme of multiple prediction schemes. The prediction image generation unit 101 outputs the generated prediction picture block P to the subtraction unit 102. The prediction image generation unit 101 operates in the same way as the prediction image generation unit 308 described already, and therefore, a detailed description of generating the prediction picture block P is omitted.

The prediction image generation unit 101, in selecting the prediction scheme, selects a prediction scheme which minimizes an error value based on a difference between a signal value for each pixel in the block included in the image and a signal value for each of corresponding pixels in the prediction picture block P, for example. The method of selecting the prediction scheme is not limited to the above.

Multiple prediction schemes include the intra-prediction, the motion prediction, and the merge prediction. The motion prediction is the prediction between display times among the inter-predictions described above. The merge prediction is prediction using the reference picture block and prediction parameter the same as for a block which is already coded and in a predefined range from the coding target block.

The prediction image generation unit 101, in a case of selecting the intra-prediction, outputs a prediction mode IntrapredMode indicating the intra-prediction mode which has been used in generating the prediction picture block P to the prediction parameter coding unit 111.

The prediction image generation unit 101, in a case of selecting the motion prediction, stores the motion vector mvLX which has been used in generating the prediction picture block P in the prediction parameter memory 108, and outputs the motion vector to the inter-prediction parameter coding unit 112. The motion vector mvLX indicates a vector from a location of the coding target block to a location of the reference picture block in generating the prediction picture block P. Information indicating the motion vector mvLX includes information indicating the reference picture (e.g., reference picture index refIdxLX, picture order count POC), and may indicate the prediction parameter. The prediction image generation unit 101 outputs the prediction mode predMode indicating the inter-prediction mode to the prediction parameter coding unit 111.

The prediction image generation unit 101, in a case of selecting the merge prediction, outputs the merge index merge_idx indicating the selected reference picture block to the inter-prediction parameter coding unit 112. The prediction image generation unit 101 outputs the prediction mode predMode indicating the merge prediction mode to the prediction parameter coding unit 111.

The subtraction unit 102 subtracts for each pixel the signal value of the prediction picture block P input from the prediction image generation unit 101 from the signal value of the corresponding block of the layer image input from outside to generate a residual signal. The subtraction unit 102 outputs the generated residual signal to the DCT and quantization unit 103 and the coding parameter determination unit 110.

The DCT and quantization unit 103 performs DCT on the residual signal input from the subtraction unit 102 to compute DCT coefficients. The DCT and quantization unit 103 quantizes the computed DCT coefficients to find quantized coefficients. The DCT and quantization unit 103 outputs the found quantized coefficients to the entropy coding unit 104 and the dequantization and inverse DCT unit 105.

To the entropy coding unit 104, input are the quantized coefficients from the DCT and quantization unit 103 and coding parameters from the coding parameter determination unit 110. Examples of the input coding parameters include the codes such as the reference picture index refIdxLX, the prediction vector index mvp_LX_idx, the difference vector mvdLX, the prediction mode predMode, and the merge index merge_idx.

The entropy coding unit 104 performs entropy coding on the input quantized coefficients and coding parameters to generate a coded stream Te, and outputs, to outside, the generated coded stream Te.

The dequantization and inverse DCT unit 105 dequantizes the quantized coefficients input from the DCT and quantization unit 103 to find DCT coefficients. The dequantization and inverse DCT unit 105 performs inverse DCT on the found DCT coefficients to compute a decoded residual signal. The dequantization and inverse DCT unit 105 outputs the computed decoded residual signal to the addition unit 106.

The addition unit 106 adds for each pixel a signal value of the prediction picture block P input from the prediction image generation unit 101 and a signal value of the decoded residual signal input from the dequantization and inverse DCT unit 105 to generate a reference picture block. The addition unit 106 store the generated reference picture block in the reference picture memory 109.

The prediction parameter memory 108 stores the prediction parameter generated by the prediction parameter coding unit 111 in a predefined location for each coding target picture and block.

The reference picture memory 109 stores the reference picture block generated by the addition unit 106 in a predefined location for each coding target picture and block.

The coding parameter determination unit 110 selects one set from among multiple sets coding parameters. The coding parameters are the prediction parameters described above or parameters to be predicted that are generated in association with the prediction parameters. The prediction image generation unit 101 uses each of these sets of coding parameters to generate the prediction picture block P.

The coding parameter determination unit 110 computes a cost value indicating a size of an amount of information and a coding error for each of multiple sets. The cost value is a sum of a code amount and a value obtained by multiplying a square error by a coefficient X, for example. The code amount is an amount of information of the coded stream Te obtained by performing entropy coding on the quantization error and the coding parameters. The square error is a sum of squares of residual error values of the residual signals computed by the subtraction unit 102 for respective pixels. The coefficient λ is a preconfigured real number greater than zero. The coding parameter determination unit 110 selects a set of coding parameters for which the computed cost value is minimum. This allows the entropy coding unit 104 to output, to outside, the selected set of coding parameters as the coded stream Te and not to output the not selected set of coding parameters.

The prediction parameter coding unit 111 derives a prediction parameter used for generating the prediction picture, based on the parameter input from the prediction image generation unit 101 and codes the derived prediction parameter to generate a set of coding parameters. The prediction parameter coding unit 111 outputs the generated set of coding parameters to the entropy coding unit 104.

The prediction parameter coding unit 111 stores the prediction parameter corresponding to the set selected by the coding parameter determination unit 110 among the generated set of coding parameters in the prediction parameter memory 108.

In a case that the prediction mode predMode input from the prediction image generation unit 101 specifies the inter-prediction mode, the prediction parameter coding unit 111 makes the inter-prediction parameter coding unit 112 operate. In a case that the prediction mode predMode specifies the intra-prediction mode, the prediction parameter coding unit 111 makes the intra-prediction parameter coding unit 113 operate.

The inter-prediction parameter coding unit 112 derives an inter-prediction parameter, based on the prediction parameter input from the coding parameter determination unit 110. The inter-prediction parameter coding unit 112 has, as a configuration for deriving the inter-prediction parameter, a configuration the same as the configuration in which the inter-prediction parameter decoding unit 303 (see FIG. 5, or the like) derives the inter-prediction parameter. The configuration of the inter-prediction parameter coding unit 112 is described below.

The intra-prediction parameter coding unit 113 defines, as a set of inter-prediction parameters, the intra-prediction mode IntraPredMode which is specified by the prediction mode predMode input from the coding parameter determination unit 110.

(Configuration of Inter-Prediction Parameter Coding Unit)

Next, a description is given of the configuration of the inter-prediction parameter coding unit 112. The inter-prediction parameter coding unit 112 is means corresponding to the inter-prediction parameter decoding unit 303.

Figure 13:
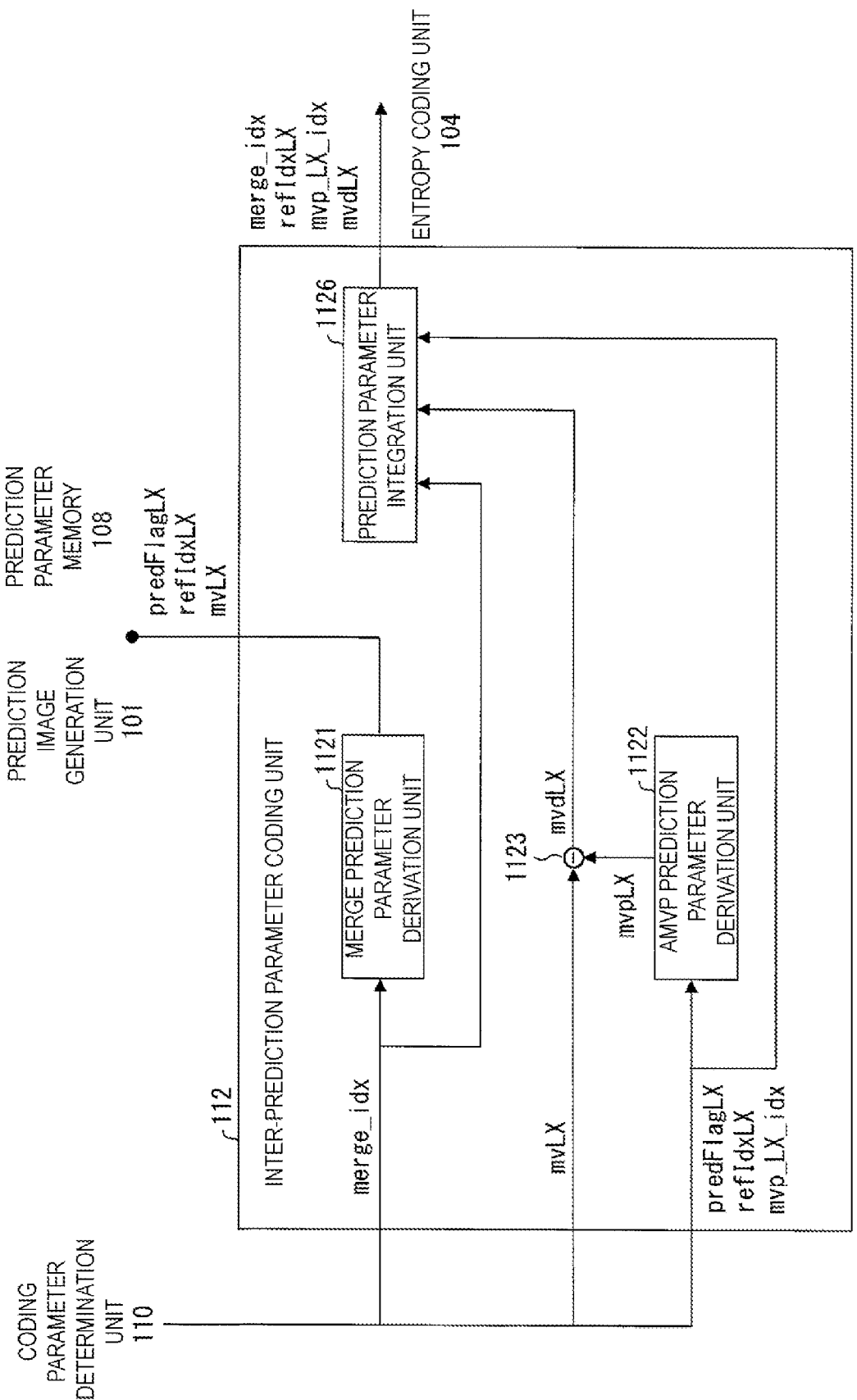
FIG. 13 is a schematic diagram illustrating a configuration of an inter-prediction parameter coding unit according to the present embodiment.

FIG. 13 is a schematic diagram illustrating the configuration of the inter-prediction parameter coding unit 112 according to the present embodiment.

The inter-prediction parameter coding unit 112 is configured to include a merge prediction parameter derivation unit 1121, an AMVP prediction parameter derivation unit 1122, a subtraction unit 1123, and a prediction parameter integration unit 1126.

The merge prediction parameter derivation unit 1121 has a configuration similar to the merge prediction parameter derivation unit 3036 described above (see FIG. 7) and the AMVP prediction parameter derivation unit 1122 has a configuration similar to the AMVP prediction parameter derivation unit 3032 described above (see FIG. 8).

The inter-prediction parameter coding control unit 1031 instructs the entropy coding unit 104 to decode the code (syntax element) associated with the inter-prediction to code the code (syntax element) included in the coding data, for example, the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

The inter-prediction parameter coding control unit 1031 is configured to include, as illustrated in FIG. 10, a merge index coding unit 10312, a vector candidate index coding unit 10313, and not illustrated partition mode coding unit, merge flag coding unit, inter-prediction flag coding unit, reference picture index coding unit and vector difference coding unit. The partition mode coding unit, the merge flag coding unit, the merge index coding unit, the inter-prediction flag coding unit, the reference picture index coding unit, the vector candidate index coding unit 10313, and the vector difference coding unit code respectively the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

In a case that prediction mode predMode input from the prediction image generation unit 101 specifies the merge prediction mode, the merge index merge_idx is input from the coding parameter determination unit 110 to the merge prediction parameter derivation unit 1121. The merge index merge_idx is output to the prediction parameter integration unit 1126. The merge prediction parameter derivation unit 1121 reads out a reference picture index refIdxLX and motion vector mvLX of a reference block indicated by the merge index merge_idx among the merge candidates from the prediction parameter memory 108. The merge candidate is a reference block in a predefined range from the coding target block to be coded (e.g., among a reference block in contact with a lower left end, upper left end, or upper right end of coding target block), is a reference block on which the coding processing is completed.

The AMVP prediction parameter derivation unit 1122 has a configuration similar to the AMVP prediction parameter derivation unit 3032 described above (see FIG. 8).

In a case that the prediction mode predMode input from the prediction image generation unit 101 specifies the inter-prediction mode, the motion vector mvLX is input from the coding parameter determination unit 110 to the AMVP prediction parameter derivation unit 1122. The AMVP prediction parameter derivation unit 1122 derives a prediction vector mvpLX, based on the input motion vector mvLX. The AMVP prediction parameter derivation unit 1122 outputs the derived prediction vector mvpLX to the subtraction unit 1123. The reference picture index refIdx and the prediction vector index mvp_LX_idx are output to the prediction parameter integration unit 1126.

The subtraction unit 1123 subtracts the prediction vector mvpLX input from the AMVP prediction parameter derivation unit 1122 from the motion vector mvLX input from the coding parameter determination unit 110 to generate a difference vector mvdLX. The difference vector mvdLX is output to the prediction parameter integration unit 1126.

In a case that prediction mode predMode input from the prediction image generation unit 101 specifies the merge prediction mode, the prediction parameter integration unit 1126 outputs the merge index merge_idx input from the coding parameter determination unit 110 to the entropy coding unit 104.

In a case that the prediction mode predMode input from the prediction image generation unit 101 specifies the inter-prediction mode, the prediction parameter integration unit 1126 performs the processing below.

The prediction parameter integration unit 1126 integrates the reference picture index refIdxLX and prediction vector index mvp_LX_idx input from the coding parameter determination unit 110 and the difference vector mvdLX input from the subtraction unit 1123. The prediction parameter integration unit 1126 outputs the integrated code to the entropy coding unit 104.

The inter-prediction parameter coding control unit 112 may include an inter-prediction parameter coding control unit (not illustrated) which instructs the entropy coding unit 104 to decode the code (syntax element) associated with the inter-prediction to decode the code (decode the syntax element) included in the coded data, for example, the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

In this case, an inter-prediction parameter coding control unit is configured to include an additional prediction flag coding unit configured to code an intensity compensation flag ic_enable_flag for indicating whether an additional prediction is performed (see FIG. 10), and include, in addition, a vector candidate index coding unit (see FIG. 10), a partition mode coding unit, a merge flag coding unit, an inter-prediction flag coding unit, a reference picture index coding unit, a vector difference coding unit, and the like. The partition mode coding unit, the merge flag coding unit, the merge index coding unit, the inter-prediction flag coding unit, the reference picture index coding unit, the vector candidate index coding unit, and the vector difference coding unit code respectively the partition mode part_mode, the merge flag merge_flag, the merge index merge_idx, the inter-prediction flag inter_pred_idc, the reference picture index refIdxLX, the prediction vector index mvp_LX_idx, and the difference vector mvdLX.

A part of the image coding device 11 and the image decoding device 31 in the embodiment described above, for example, the entropy decoding unit 301, the prediction parameter decoding unit 302, the prediction image generation unit 101, the DCT and quantization unit 103, the entropy coding unit 104, the dequantization and inverse DCT unit 105, the coding parameter determination unit 110, the prediction parameter coding unit 111, the entropy decoding unit 301, the prediction parameter decoding unit 302, the prediction image generation unit 308, and the dequantization and inverse DCT unit 311 may be implemented by a computer. In this case, this configuration may be realized by recording a program for realizing such control functions on a computer-readable recording medium and causing a computer system to read the program recorded on the recording medium for execution. Note that it is assumed that the "computer system" herein refers to a computer system built into any of the image coding devices 11 to 11h, the image decoding devices 31 to 31h, and the computer system includes an OS and hardware components such as a peripheral device. Furthermore, the "computer-readable recording medium" refers to a portable medium such as a flexible disk, a magneto-optical disk, a ROM, and a CD-ROM, and a storage device such as a hard disk built into the computer system. Moreover, the "computer-readable recording medium" may include a medium that dynamically retains the program for a short period of time, such as a communication line that is used to transmit the program over a network such as the Internet or over a communication line such as a telephone line, and a medium that retains, in that case, the program for a fixed period of time, such as a volatile memory within the computer system which functions as a server or a client. Furthermore, the program may be configured to realize some of the functions described above, and also may be configured to be capable of realizing the functions described above in combination with a program already recorded in the computer system.

The image coding device 11 and image decoding device 31 in the present embodiment described above may be partially or completely realized as an integrated circuit such as a Large Scale Integration (LSI) circuit. The functional blocks of the image coding device 11 and the image decoding device 31 may be individually realized as processors, or may be partially or completely integrated into a processor. The circuit integration technique is not limited to LSI, and the integrated circuits for the functional blocks may be realized as dedicated circuits or a multi-purpose processor. Furthermore, in a case where with advances in semiconductor technology, a circuit integration technology with which an LSI is replaced appears, an integrated circuit based on the technology may be used.

The embodiment of the disclosure has been described in detail above referring to the drawings, but the specific configuration is not limited to the above embodiments and various amendments can be made to a design that fall within the scope that does not depart from the gist of the disclosure.

Application Example

The image coding device 11 and the image decoding device 31 described above can be used in a state of being equipped on various devices for transmitting, receiving, recording, and reproducing a moving image. The moving image may be a natural moving image imaged by a camera or the like, or an artificial moving image (including CG and GUI) generated by using a computer or the like.

Figure 33A:
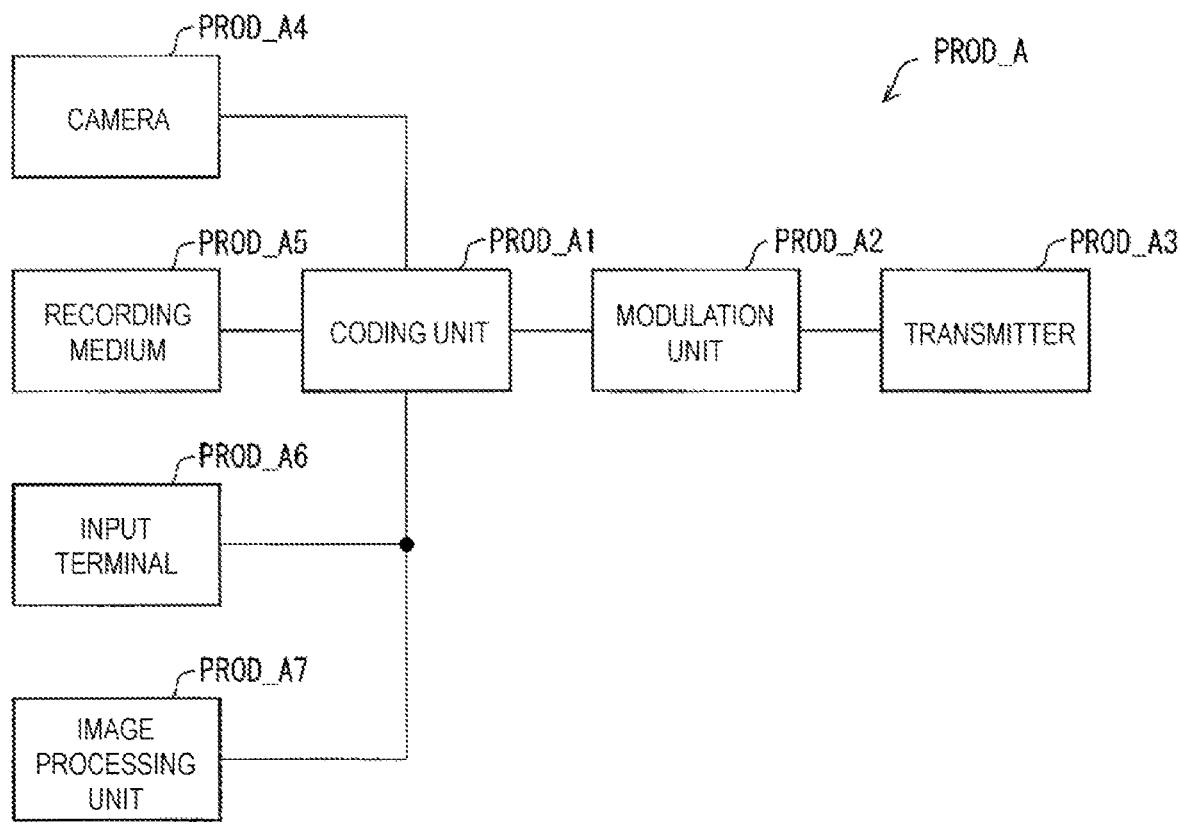
FIGS. 33A and 33B are diagrams illustrating configurations of a transmission device equipped with the above image coding device and a reception device equipped with the above image decoding device.
Figure 33B:
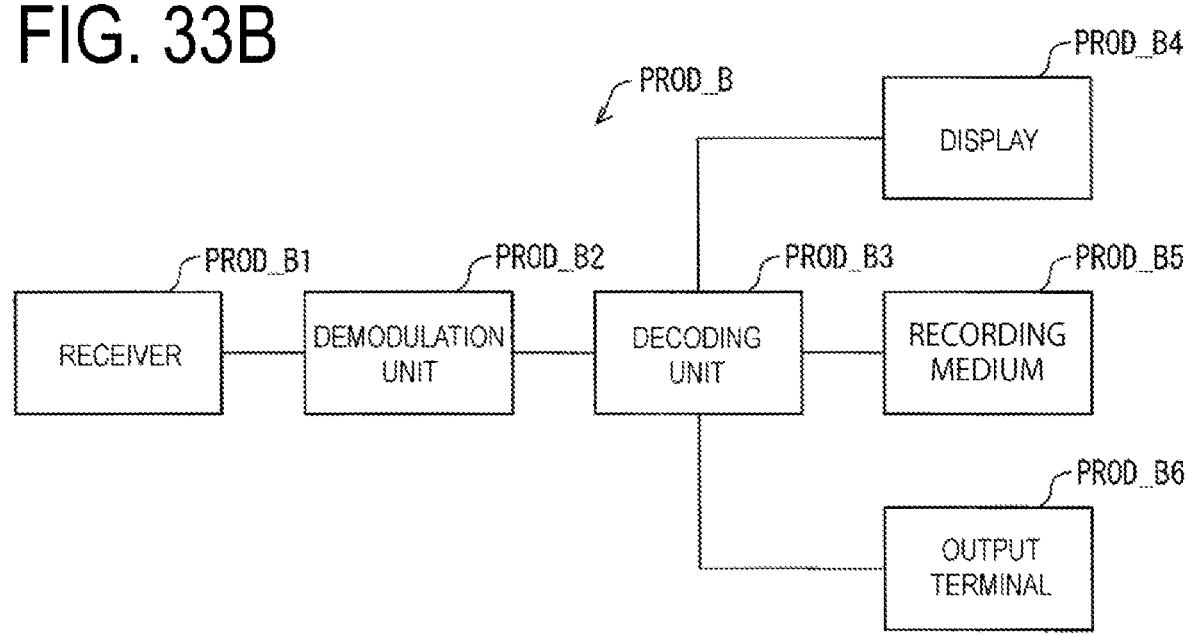

First, a description is given of that the image coding device 11 and the image decoding device 31 described above can be used to receive and transmit the moving image with reference to FIGS. 33A and 33B.

FIG. 33A is a block diagram illustrating a configuration of a transmission device PROD_A equipped with the image coding device 11. As illustrated in FIG. 33A, the transmission device PROD_A includes a coding unit PROD_A1 that codes a moving image to acquire coded data, a modulation unit PROD_A2 that modulates a carrier wave by using the coded data acquired by the coding unit PROD_A1 to acquire a modulated signal, and a transmitter PROD_A3 that transmits the modulated signal acquired by the modulation unit PROD_A2. The image coding device 11 described above is used as the coding unit PROD_A1.

The transmission device PROD_A may further include, as resources for supplying a moving image input to the coding unit PROD_A1, a camera PROD_A4 that images a moving image, a recording medium PROD_A5 that records a moving image therein, an input terminal PROD_A6 that inputs a moving image from outside, and an image processing unit A7 that generates or processes an image. FIG. 33A illustrates the configuration in which the transmission device PROD_A includes all of the above components, but some of these may be omitted.

The recording medium PROD_A5 may recode the moving image not coded, or the moving image coded using a coding scheme for recording different from the coding scheme for transmission. In the latter case, a decoding unit (not illustrated) which decodes the coded data read out from the recording medium PROD_A5 in accordance with the coding scheme for recording may be provided between the recording medium PROD_A5 and the coding unit PROD_A1.

FIG. 33B is a block diagram illustrating a configuration of a reception device PROD_B equipped with the image decoding device 31. As illustrated in FIG. 33B, the reception device PROD_B includes a receiver PROD_B1 that receives a modulated signal, a demodulation unit PROD_B2 that demodulate the modulated signal received by the receiver PROD_B1 to acquire coded data, and a decoding unit PROD_B3 that decodes the coded data acquired by the demodulation unit PROD_B2 to acquire a moving image. The image decoding device 31 described above is used as the decoding unit PROD_B3.

The reception device PROD_B may further include, as supply destinations of the moving image output by the decoding unit PROD_B3, a display PROD_B4 that displays images, a recording medium PROD_B5 that records the moving image, and an output terminal PROD_B6 that outputs the moving image to outside. FIG. 33B illustrates the configuration in which the reception device PROD_B includes all of the above components, but some of these may be omitted.

The recording medium PROD_B5 may be configured to recode the moving image not coded, or the moving image coded using a coding scheme for recording different from the coding scheme for transmission. In the latter case, a coding unit (not illustrated) which codes the moving image acquired from the decoding unit PROD_B3 in accordance with the coding scheme for recording may be provided between the decoding unit PROD_B3 and the recording medium PROD_B5.

A transmission medium for transmitting the modulated signal may be wireless or wired. A transmission aspect of transmitting the modulated signal may be a broadcast (here, referred to a transmission aspect of which transmission destination is not specified in advance), or a communication (here, referred to a transmission aspect of which transmission destination is specified in advance). To be more specific, transmission of the modulated signal may be achieved by any of a radio broadcast, a cable broadcast, a radio communication, and a cable communication.

For example, a broadcast station (such as broadcast facilities)/receiving station (such as a TV set) of digital terrestrial broadcasting is an example of the transmission device PROD_A/reception device PROD_B transmitting and/or receiving the modulated signal on the radio broadcast. A broadcast station (such as broadcast facilities)/receiving station (such as a TV set) of a cable television broadcasting is an example of the transmission device PROD_A/reception device PROD_B transmitting and/or receiving the modulated signal on the cable broadcast.

A server (such as a workstation)/client (such as a TV set, a personal computer, a smartphone) including a Video On Demand (VOD) service or video-sharing service using the Internet is an example of the transmission device PROD_A/reception device PROD_B transmitting and/or receiving the modulated signal on the communication (in general, a wireless or wired transmission medium is used in LAN, and a wired transmission medium is used in WAN). Here, the personal computer includes a desktop PC, laptop PC, and a tablet PC. The smartphone also includes a multifunctional mobile phone terminal.

The video-sharing service client has a function to decode coded data downloaded from the server to display on a display, and a function to code a moving image imaged by a camera to upload to the sever. To be more specific, the video-sharing service client functions as both the transmission device PROD_A and the reception device PROD_B.

Next, a description is given of that the image coding device 11 and the image decoding device 31 described above can be used to record and reproduce the moving image with reference to FIG. 34.

Figure 34A:
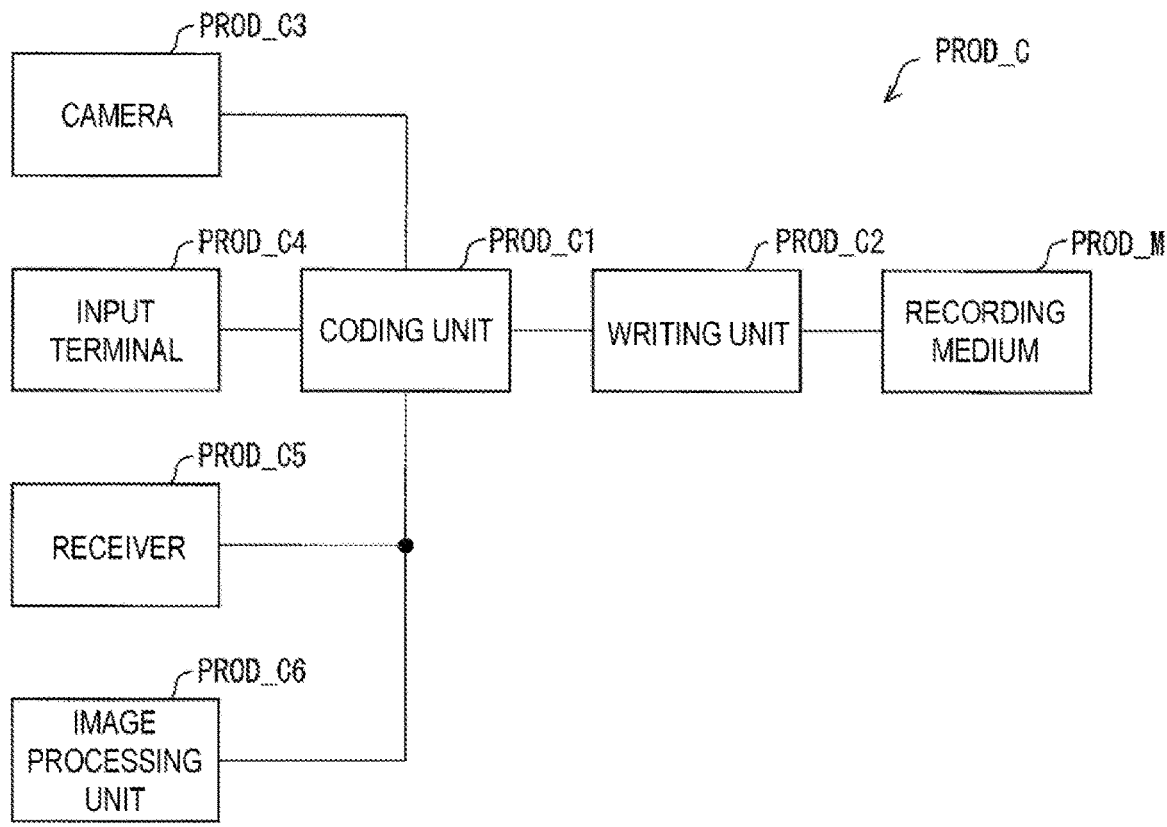
FIGS. 34A and 34B are diagrams illustrating configurations of a recording device equipped with the above image coding device and a reproducing device equipped with the above image decoding device.

FIG. 34A is a block diagram illustrating a configuration of a recording device PROD_C equipped with the image coding device 11 described above. As illustrated in FIG. 34A, the recording device PROD_C includes a coding unit PROD_C1 that codes a moving image to acquire coded data, and a writing unit PROD_C2 that writes the coded data acquired by the coding unit PROD_C1 into a recording medium PROD_M. The image coding device 11 described above is used as the coding unit PROD_C1.

The recording medium PROD_M may be (1) of a type that is built in the recording device PROD_C such as a Hard Disk Drive (HDD) and a Solid State Drive (SSD), (2) of a type that is connected with the recording device PROD_C such as an SD memory card and a Universal Serial Bus (USB) flash memory, or (3) of a type that is loaded into a drive device (not illustrated) built in the recording device PROD_C such as a Digital Versatile Disc (DVD) and a Blu-ray Disc (registered trademark) (BD).

The recording device PROD_C may further include, as resources for supplying a moving image input to the coding unit PROD_C1, a camera PROD_C3 that images a moving image, an input terminal PROD_C4 that inputs a moving image from outside, a receiver PROD_C5 that receives a moving image, and an image processing unit C6 that generates or processes an image. FIG. 34A illustrates the configuration in which the recording device PROD_C includes all of the above components, but some of these may be omitted.

The receiver PROD_C5 may receive the moving image not coded, or the coded data coded using a coding scheme for transmission different from the coding scheme for recording. In the latter case, a decoding unit for transmission (not illustrated) which decodes the coded data coded using the coding scheme for transmission may be provided between the receiver PROD_C5 and the coding unit PROD_C1.

Examples of the recording device PROD_C like this include a DVD recorder, a BD recorder, and a Hard Disk Drive (HDD) recorder (in this case, the input terminal PROD_C4 or the receiver PROD_C5 is mainly the resource for supplying the moving image). A camcorder (in this case, the camera PROD_C3 is mainly the resource for supplying the moving image), a personal computer (in this case, the receiver PROD_C5 or the image processing unit C6 is mainly the resource for supplying the moving image), and a smartphone (in this case, the camera PROD_C3 or the receiver PROD_C5 is mainly the resource for supplying the moving image) are also included in the examples of the recording device PROD_C like this.

Figure 34B:
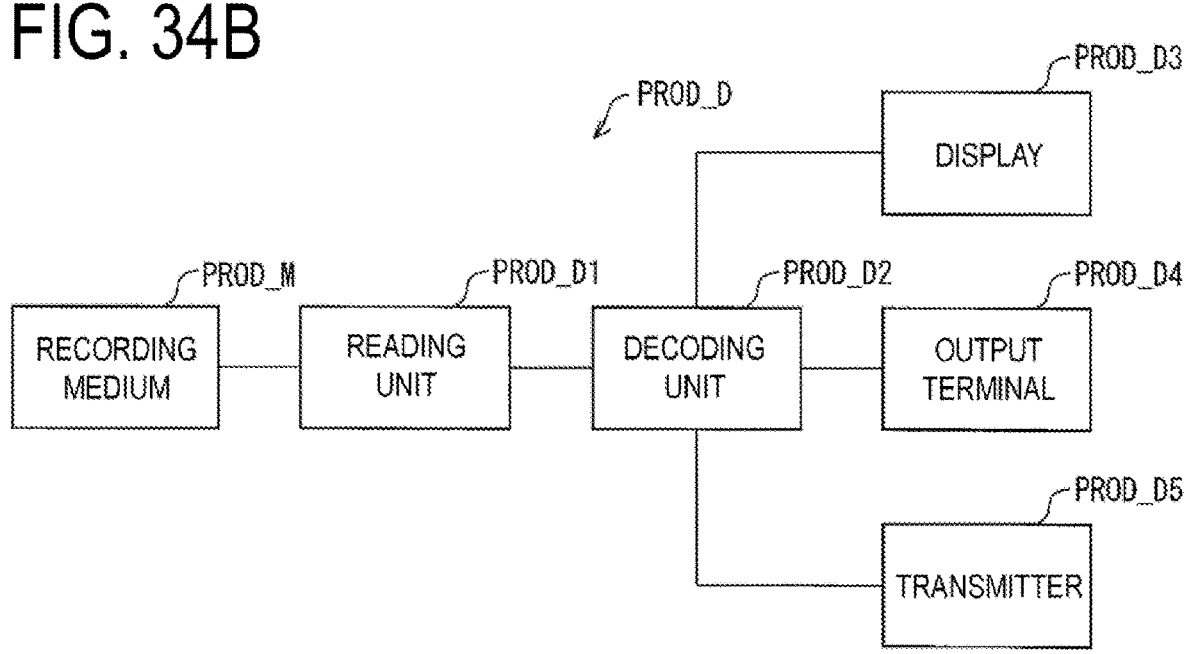

FIG. 34B is a block diagram illustrating a configuration of a reproducing device PROD_D equipped with the image decoding device 31. As illustrated in FIG. 34B, the reproducing device PROD_D includes a reading unit PROD_D1 that reads out coded data written into the recording medium PROD_M, and a decoding unit PROD_D2 that decodes the coded data read out by the reading unit PROD_D1 to acquire a moving image. The image decoding device 31 described above is used as the decoding unit PROD_D2.

The recording medium PROD_M may be (1) of a type that is built in the reproducing device PROD_D such as an HDD and an SSD, (2) of a type that is connected with the reproducing device PROD_D such as an SD memory card and a USB flash memory, or (3) of a type that is loaded into a drive device (not illustrated) built in the reproducing device PROD_D such as a DVD and a BD.

The reproducing device PROD_D may further include, as supply destinations of the moving image output by the decoding unit PROD_D2, a display PROD_D3 that displays the moving image, an output terminal PROD_D4 that outputs the moving image from outside, and a transmitter PROD_D5 that transmits the moving image. FIG. 34B illustrates the configuration in which the reproducing device PROD_D includes all of the above components, but some of these may be omitted.

The transmitter PROD_D5 may transmit the moving image not coded, or the coded data coded using a coding scheme for transmission different from the coding scheme for recording. In the latter case, a coding unit (not illustrated) which codes the moving image using the coding scheme for transmission may be provided between the decoding unit PROD_D2 and the transmitter PROD D5.

Examples of the reproducing device PROD_D like this include a DVD player, a BD player, and an HDD player (in this case, the output terminal PROD_D4 connected with a TV set or the like is mainly the supply destination of the moving image). A TV set (in this case, the display PROD_D3 is mainly the supply destination of the moving image), a digital signage (also referred to as an electronic signage or an electronic bulletin board, and the display PROD_D3 or the transmitter PROD_D5 is mainly the supply destination of the moving image), a desktop PC (in this case, the output terminal PROD_D4 or the transmitter PROD_D5 is mainly the supply destination of the moving image), a laptop or tablet PC (in this case, the display PROD_D3 or the transmitter PROD_D5 is mainly the supply destination of the moving image), and a smartphone (in this case, the display PROD_D3 or the transmitter PROD_D5 is mainly the supply destination of the moving image) are also included in the examples of the reproducing device PROD D like this.

(Hardware Implementation and Software Implementation)

The blocks in the image decoding device 31 and the image coding device 11 described above may be implemented by hardware using a logic circuit formed on an integrated circuit (IC chip), or by software using a Central Processing Unit (CPU).

In the latter case, the above-described devices include a CPU to execute commands of a program for achieving the functions, a Read Only Memory (ROM) to store the program, a Random Access Memory (RAM) to load the program, and a storage device (storage medium) such as a memory to store the program and various types of data. The object of an embodiment of the disclosure can be attained by that software realizing the functions described above that is a program code of a control program for the above respective devices (executable program, intermediate code program, source program) is recoded in a recording medium in a computer-readable manner, the recording medium is supplied to the above respective devices, and the computer (or the CPU or MPU) reads out the program code recorded in the recording medium for execution.

Examples of the above-described recording medium to use include tapes such as a magnetic tape and a cassette tape, disks or discs including a magnetic disk such as a floppy (registered trademark) disk/hard disk or an optical disc such as a Compact Disc Read-Only Memory (CD-ROM)/Magneto-Optical (MO) disc/Mini Disc (MD)/Digital Versatile Disc (DVD)/CD Recordable (CD-R)/Blu-ray Disc (registered trademark), cards such as an IC card (including a memory card)/optical card, semiconductor memories such as a mask ROM/Erasable Programmable Read-Only Memory (EPROM)/Electrically Erasable and Programmable Read-Only Memory (EEPROM: registered trademark)/flash ROM, or logic circuits such as a Programmable logic device (PLD) and a Field Programmable Gate Array (FPGA).

The above-described devices may be configured to be connectable with a communication network to be supplied with the above-described program code through the communication network. This communication network is not specifically limited so long as the program code can be transmitted. For example, the Internet, an intranet, an extranet, a Local Area Network (LAN), an Integrated Services Digital Network (ISDN), a Value-Added Network (VAN), a Community Antenna television/Cable Television (CATV) communication network, a Virtual Private Network, a telephone network, a mobile communication network, a satellite communication network and the like are available. Transmission media constituting this communication network are not limited to a specific configuration or type so long as the program code can be transmitted. For example, a wired medium such as Institute of Electrical and Electronic Engineers (IEEE) 1394, a USB, a power-line carrier, a cable TV line, a telephone line, and an Asymmetric Digital Subscriber Line (ADSL), or a wireless medium such as an infrared-ray including Infrared Data Association (IrDA) and a remote controller, Bluetooth (registered trademark), IEEE 802.11 wireless communication, High Data Rate (HDR), Near Field Communication (NFC), Digital Living Network Alliance (registered trademark) (DLNA), a mobile telephone network, a satellite circuit, and a digital terrestrial network are also available. An aspect of the disclosure may also be implemented in a form of a computer data signal embedded in a carrier wave in which the above-described program code is embodied by electronic transmission.

An embodiment of the disclosure is not limited to the above described embodiments, and can be variously modified within a scope of the claims. To be more specific, embodiments made by combining technical means which are adequately modified within the scope of the claims are also included in the scope of an embodiment of the disclosure.

CROSS-REFERENCE OF RELATED APPLICATION

This application claims priority based on JP 2016-019354 filed in Japan on Feb. 3, 2016, the contents of which are entirely incorporated herein by reference.

INDUSTRIAL APPLICABILITY

An embodiment of the disclosure can be preferably applied to an image decoding device that decodes coded data in which an image data is coded and an image coding device that generates coded data in which an image data is coded. An embodiment of the disclosure can be also preferably applied to a data structure of the coded data which is generated by the image coding device and referred to by the image decoding device.

REFERENCE SIGNS LIST

1 . . . Image transmission system
11 . . . Image coding device (moving image coding device)

101 . . . Prediction image generation unit
102 . . . Subtraction unit
103 . . . DCT and quantization unit
104 . . . Entropy coding unit
105 . . . Dequantization and inverse DCT unit
106 . . . Addition unit
108 . . . Prediction parameter memory (frame memory)
109 . . . Reference picture memory (frame memory)
110 . . . Coding parameter determination unit
111 . . . Prediction parameter coding unit
112 . . . Inter-prediction parameter coding unit
1121 . . . Merge prediction parameter derivation unit
1122 . . . AMVP prediction parameter derivation unit
1123 . . . Subtraction unit
1126 . . . Prediction parameter integration unit
113 . . . Intra-prediction parameter coding unit
21 . . . Network
31 . . . Image decoding device (moving image decoding device)
301 . . . Entropy decoding unit
302 . . . Prediction parameter decoding unit
303 . . . Inter-prediction parameter decoding unit (inter-prediction parameter compute unit)
30312 . . . Merge index decoding unit
30313 . . . Vector candidate index decoding unit
3032 . . . AMVP prediction parameter derivation unit
3033 . . . Vector candidate derivation unit
3035 . . . Addition unit
3036 . . . Merge prediction parameter derivation unit
30361 . . . Merge candidate derivation unit
303611 . . . Merge candidate storage unit
30362 . . . Merge candidate selection unit
304 . . . Intra-prediction parameter decoding unit
306 . . . Reference picture memory (frame memory)
307 . . . Prediction parameter memory (frame memory)
308 . . . Prediction image generation unit
309 . . . Inter-prediction image generation unit
3091 . . . Motion compensation unit (prediction image generation device, prediction image generation unit)
30911 . . . Motion compensation gradient unit
309122 . . . Gradient correction coefficient derivation unit (second switching unit, clip unit)
309112 . . . Gradient derivation unit (first switching unit)
3094 . . . Weighted prediction unit
310 . . . Intra-prediction image generation unit
311 . . . Dequantization and inverse DCT unit
312 . . . Addition unit
41 . . . Image display device

The invention claimed is:

1. A prediction image generating method for generating a prediction image, the prediction image generating method comprising:
generating the prediction image with reference to a first reference image, a second reference image and a gradient correction term, wherein
the gradient correction term is derived with reference to a value of each pixel of
a first gradient image indicating a gradient along a first direction of the first reference image,
a second gradient image indicating a gradient along a second direction of the first reference image,
a third gradient image indicating a gradient along the first direction of the second reference image, and
a fourth gradient image indicating a gradient along the second direction of the second reference image, and
each weight coefficient to be multiplied by the value of the each pixel of the first to fourth gradient images is determined for each block; wherein
each of the weight coefficients is either a first value or a second value, the first value and the second value are different from each other.

* * * * *